United States Patent
Okuno

(10) Patent No.: US 6,947,214 B2
(45) Date of Patent: Sep. 20, 2005

(54) DIFFRACTIVE OPTICAL ELEMENT AND OPTICAL SYSTEM HAVING THE SAME

(75) Inventor: Takeharu Okuno, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/406,713

(22) Filed: Apr. 2, 2003

(65) Prior Publication Data

US 2003/0189755 A1 Oct. 9, 2003

(30) Foreign Application Priority Data

Apr. 4, 2002 (JP) .................................. 2002-102760
Apr. 4, 2002 (JP) .................................. 2002-102762

(51) Int. Cl.$^7$ .............................................. G02B 5/18
(52) U.S. Cl. ................................. 359/569; 359/576
(58) Field of Search ................... 359/566, 569, 359/571, 575, 576

(56) References Cited

U.S. PATENT DOCUMENTS

| | | | |
|---|---|---|---|
| 4,585,307 A | * | 4/1986 | Dammann et al. .......... 359/571 |
| 5,044,706 A | | 9/1991 | Chen |
| 5,790,321 A | | 8/1998 | Goto |
| 5,847,877 A | | 12/1998 | Imamura et al. |
| 6,008,942 A | | 12/1999 | Ogusu et al. |
| 6,064,452 A | | 5/2000 | Ogino |
| 6,157,488 A | | 12/2000 | Ishii |
| 6,473,232 B2 | | 10/2002 | Ogawa |
| 2001/0015845 A1 | | 8/2001 | Nakai |
| 2002/0015231 A1 | | 2/2002 | Ogawa |

FOREIGN PATENT DOCUMENTS

| | | |
|---|---|---|
| EP | 0 965 864 A2 | 12/1999 |
| EP | 1 072 906 A2 | 1/2001 |
| EP | 1 186 914 A2 | 2/2002 |
| EP | 1 186 914 A2 | 3/2002 |
| EP | 1 193 512 A2 | 4/2002 |
| JP | 0 441 206 B1 | 8/1991 |
| JP | 6 324 262 | 11/1994 |
| JP | 9 127 322 | 5/1997 |
| JP | 1 013 3149 | 5/1998 |
| JP | 2001-305323 | 10/2001 |
| JP | 2002-071925 | 3/2002 |

OTHER PUBLICATIONS

European Search Report.
A. P. Wood "Using Hybrid Refractive–Diffractive Elements In Infrared Petzval Objectives" (1990) Int'l. Lens Desing Conf., vol. 1354, pp. 316–323.
A. D. Kathman and S. K. Pitalo "Binary Optics In Lens Design" (1990), Int'l. Lens Design Conf. vol. 1354, p. 297–309.

* cited by examiner

Primary Examiner—Mark A. Robinson
Assistant Examiner—Alessandro Amari
(74) Attorney, Agent, or Firm—Morgan & Finnegan, L.L.P.

(57) ABSTRACT

A diffractive optical element in which eclipse of rays at a grating side surface of a diffraction grating can be reduced is disclosed. In a diffractive optical element comprises a plurality of diffraction gratings made of different materials are laminated, at least one of the plurality of diffraction gratings includes a region in which the grating side surface inclines or a region in which edges thereof are shifted with respect to the edge of another diffraction grating adjacent thereto. The inclination or shift amount is different according to the positions thereof in a surface of the diffractive optical element in accordance with the incident angle or emergent angle of a specified ray such as a ray determined on the basis of an average value, gravity value, maximum value and minimum value obtained from the distribution of incident angle or emergent angle or the like, rays, etc.

20 Claims, 31 Drawing Sheets

DIFFRACTIVE OPTICAL ELEMENT AND OPTICAL SYSTEM HAVING THE SAME

BACKGROUND OF THE INVENTION

1. Field of the Invention

The present invention relates to a diffractive optical element and an optical system using the same, and in particular relates to a so-called lamination (multi-layer) type diffractive optical element in which a plurality of diffraction gratings made of different materials are laminated so that a high diffraction efficiency can be obtained in the entire region of use wavelength band.

2. Description of the Relating Art

A method for combining a plurality of lenses composed of glass materials respectively having different dispersions has been conventionally known as one of the methods for correcting chromatic aberration of a refractive optical system.

Also, as another method, methods for decreasing chromatic aberration by using a diffractive optical element having a diffractive action on a part of a lens surface or an optical system are disclosed in the literature of SPIE Vol. 1354 International Lens Design Conference (1990), Japanese Laid-open Patent Publication Nos. 1992-213421 (corresponding to U.S. Pat. No. 5,044,706) and 1994-324262 (corresponding to U.S. Pat. No. 5,790,321). These methods utilize a physical phenomenon in which chromatic aberration with respect to a certain reference wavelength appears in opposite directions at the refractive portion and diffraction portion in an optical system. Further, such a diffractive optical element is able to have an effect similar to that of an aspherical surface lens by adjusting the period of the periodic structure thereof, and with the diffractive optical element, various aberrations other than the chromatic aberration can be reduced.

Herein, in comparing the refractive action of light with the diffractive action thereof, on a lens surface having a common refractive action, although a single ray of light having a certain wavelength remains to be a single ray after being refracted, a single ray having a certain wavelength is divided into a plurality of rays having different diffraction orders on the diffractive surface.

Therefore, in a case where a diffractive optical element is used in an optical system, it is necessary to determine a grating structure so that a light flux of a use wavelength area is centralized at a specific diffraction order (which may be called a "design order"). In a case where light is centralized at a specific diffraction order, the intensity of light is made small at diffraction orders other than that. If the intensity of light is 0, no light of the diffraction order will exist. Therefore, it is necessary that the diffraction efficiency of the design order is sufficiently high to have the above-described features.

In view of such situations, the present applicant proposed a structure of preventing the diffraction efficiency from being lowered in a wide wavelength region in Japanese Laid-Open Patent Publication No. 1998-133149. The diffractive optical element proposed in the above is a lamination type diffractive optical element in which a diffraction grating 104 and a diffraction grating 105, made of different materials, are laminated on a substrate 102 as shown in FIG. 28. By respectively selecting appropriate values of the refractive indices of materials which compose two diffraction gratings 104 and 105, dispersion characteristics thereof, and grating thickness $d_1$ and $d_2$ thereof, a high diffraction efficiency can be achieved in the entire use wavelength region.

Also, a structure of preventing the diffraction efficiency from being lowered has been proposed in Japanese Laid-Open Patent Publication No. 1997-127322 (corresponding to U.S. Pat. No. 6,157,488). Herein, by optimally selecting three types of different materials and grating thickness $d_1$ and $d_2$ of three diffraction gratings 104, 105 and 106, and laminating them as shown in FIG. 29, a high diffraction efficiency is achieved in the entire visible region.

In the above-described prior art lamination type diffractive optical element, no description is given of the angles of diffraction grating side surfaces 104a and 105a (grating sidewall portions not contributing to image formation) shown in FIG. 28 and FIG. 29, and all of the grating sides 104a and 105a are made perpendicular to a surface Ha where the diffraction gratings are provided.

In a case where a diffractive optical element is used in an actual optical system, for example, an image-pickup optical system used for a silver film camera and digital camera, etc., and a part of an observation optical system such as a telescope, binoculars, microscope, etc., all the effective rays are not always made incident into diffraction gratings at any optional positions in the diffractive surface at the incident angle of 0° or at equal positive or negative angle distribution centering around 0°. Therefore, when the angles of the grating side surfaces at all the diffraction gratings are made perpendicular with respect to a surface where the diffraction gratings are provided, over the entire region in the diffractive surface, or when rays having an incident angle other than 0° or having an incident angle distribution center around an angle other than 0° are made incident, there are cases where the rays are eclipsed by the grating side surfaces, the ratio of rays not passing through an optical path to satisfy conditions for achieving a high diffraction efficiency is increased (in the present specification, these are commonly called "eclipse"), not only the quantity of effective light contributing to image formation is reduced, but also harmful light (light which adversely influences the image quality) which becomes a factor of flare, ghost, etc., is increased.

SUMMARY OF THE INVENTION

It is therefore an object of the invention to realize a diffractive optical element in which the eclipse on such grating side surfaces can be reduced, and high diffraction efficiency can be obtained, wherein occurrence of flare light and ghost light can be reduced as much as possible if the diffractive optical element is used in an optical system.

In order to achieve the above-described object, in the present invention, in a diffractive optical element in which a plurality of diffraction gratings made of different materials are laminated, at least one of the plurality of diffraction gratings is composed so as to have a region in which a side surface of a grating is inclined or a region in which the grating edge one of the diffraction gratings is shifted with respect to the grating edge of another diffraction grating adjacent thereto, and the inclination and shift amount thereof are made different.

Such a diffractive optical element according to the invention may be preferably used in an optical system such as an image-pickup optical system and observation optical system.

A detailed configuration of the diffractive optical element and optical system having the same of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

(Embodiment 1)

Figure 1:
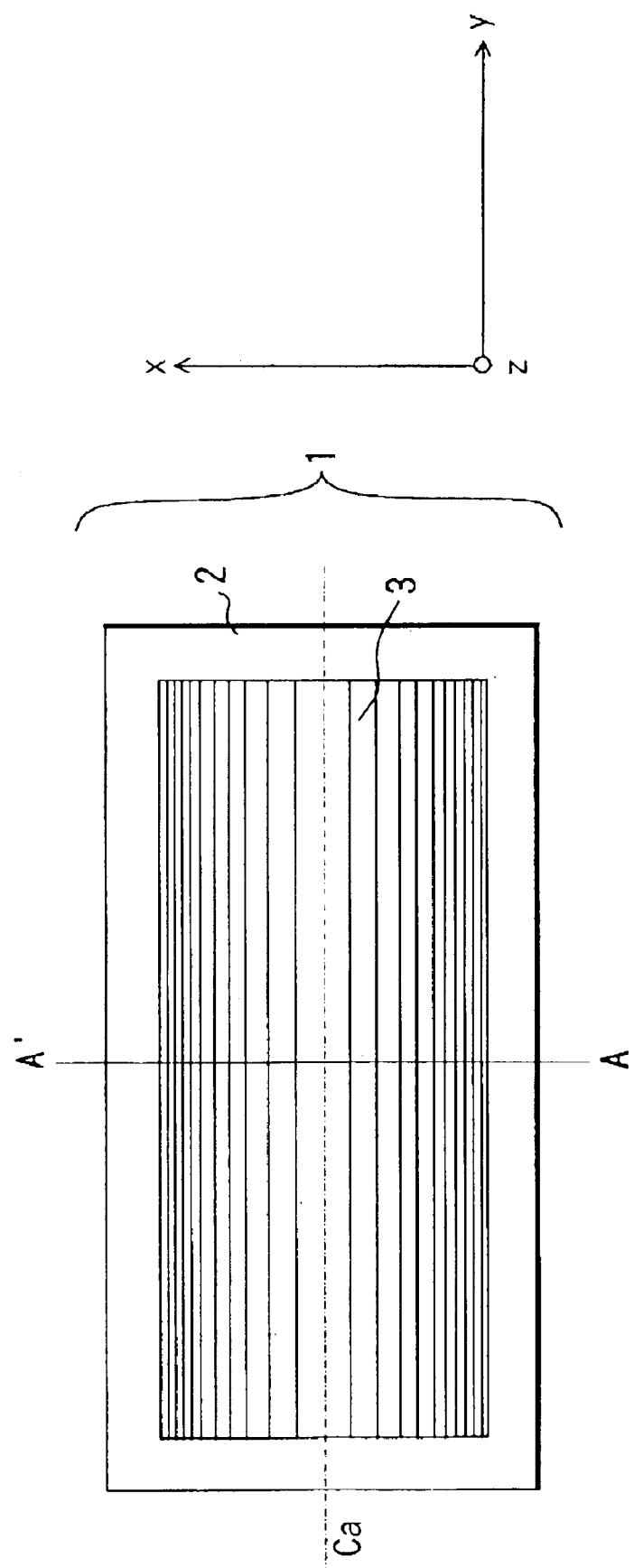
FIG. 1 is a front elevational view of a diffractive optical element according to Embodiment 1.

FIG. 1 is a front elevational view of an Embodiment 1 of a diffractive optical element 1 according to the present invention.

Figure 2:
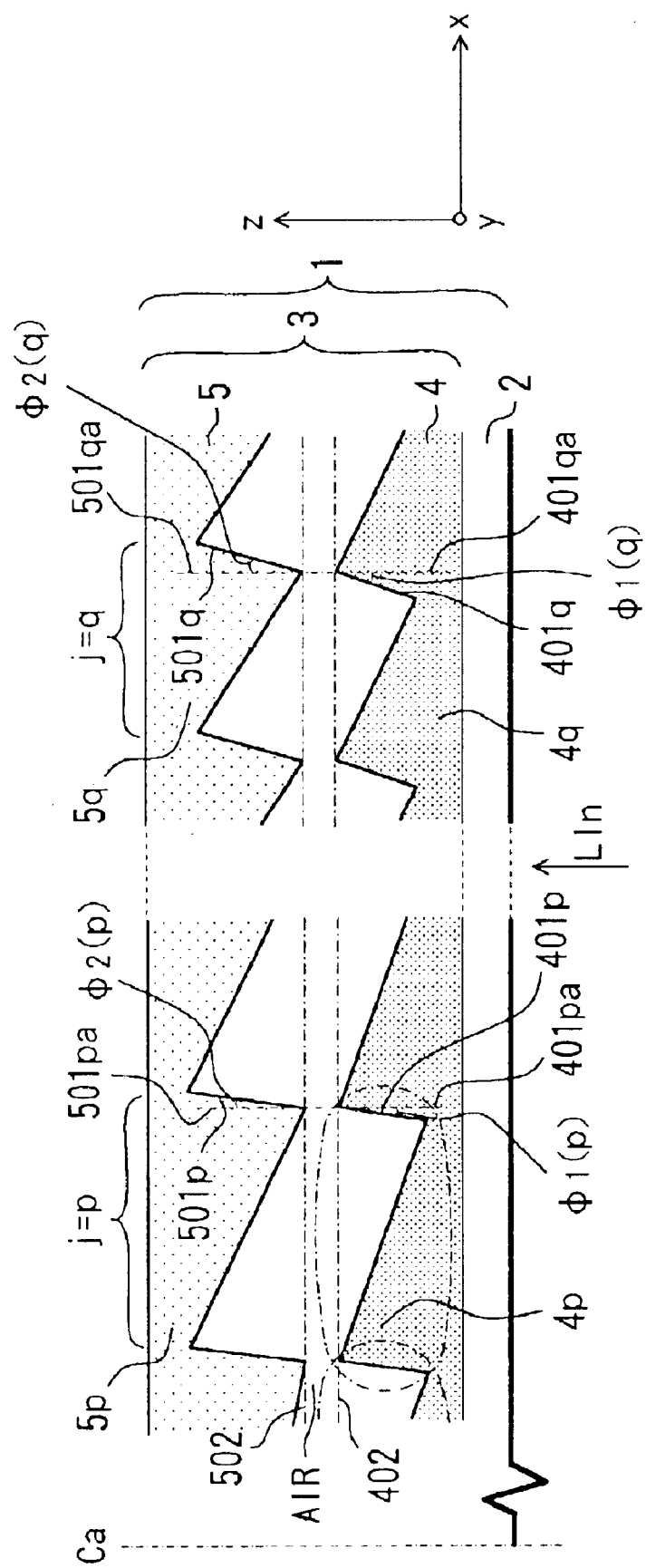
FIG. 2 is a cross-sectional view of the major parts of the diffractive optical element according to Embodiment 1.

FIG. 2 shows a part of a cross-sectional shape of the diffractive optical element 1 in FIG. 1, which is taken along the line A–A' in FIG. 1. For easier understanding, the diffractive optical element 1 is enlarged and deformed in the thickness direction of diffractive gratings (that is, the z direction) in FIG. 2. The same as the above is employed in the other sectional drawings.

In these drawings, the diffractive optical element 1 is composed so that a diffraction portion 3 having a plurality of diffraction gratings respectively made of different materials laminated is disposed on the surface of a substrate 2. The diffraction portion 3 is formed so that a diffraction grating 4 and a diffraction grating 5, each of which is a one-dimensional grating (linear grating) elongating in the y direction, are laminated with an air layer therebetween. The diffraction gratings 4 and 5 have grating periods which gradually become shorter toward the periphery along the x direction from the center (center axis) Ca.

As shown in FIG. 2, the diffraction portion 3 is composed by laminating the diffraction gratings 4 and 5 on the substrate (transparent substrate) 2 with an air layer AIR, not being an optical material, therebetween. The diffraction grating 4 which is the first layer counting from the light incident side LIn is formed of the first ultraviolet ray hardening resin (whose refractive index is $n_d$=1.636 and Abbe number $v_d$ is 22.8), which is one of the energy-hardening materials, and the diffraction grating 5 which is the second layer is formed of the second ultraviolet ray hardening resin (whose refractive index is $n_d$=1.513 and Abbe number $v_d$ is 51.0).

The diffraction grating 4 is formed of a serrated shape in which the grating thickness of the grating portion is decreased from the center to the periphery at one period, and the diffraction grating 5 is also formed of a serrated shape in which the grating thickness of the grating portion is increased from the center toward the periphery at one period, wherein the diffraction gratings 4 and 5 are set to be shaped so as to increase the diffraction efficiency of a diffractive light having a specified order.

Herein, in the present embodiment and other embodiments, a "grating portion" indicates one periodic structure that composes respective diffraction gratings. For example, the "grating portion" is a region which is encircled with a dashed line in FIG. 2. The "one period" is defined as a distance from one side surface of the grating portion to the other side surface thereof. Therefore, one side surface of the j-th grating portion is also the side surface of the (j−1)th grating portion, and the other side surface is also the side surface of the (j+1)th grating portion.

Here, the most characteristic feature of the diffractive optical element 1 according to the present embodiment resides in that the inclinations of the side surfaces (grating side surfaces) of respective grating portions forming a diffraction grating are different from each other, depending on the position in an effective surface in accordance with the incident angle or emergent angle of a specified ray of light described later (that is, having a region where the inclinations of the grating sides are different regions).

A detailed description is made by using FIG. 2. Herein, an angle $\phi_1(p)$ is formed by the normal line 401$pa$ of a surface 402 (corresponding to an emergent surface of the diffraction grating 4) which connects edge lines at the emergent side of the respective grating portions in the diffraction grating 4 and the grating side surface 401$p$ at the peripheral side (right side in the drawing) of the p-th grating portion 4$p$ counting from the center axis Ca.

Further, an angle $\phi_1(q)$ is formed by the normal line 401$qa$ of the same surface 402 and the grating side surface 401$q$ at the peripheral side of the q-th grating portion 4$q$.

And, the angle $\phi_1(p)$ and the angle $\phi_1(q)$ are different from each other in accordance with the incident angle or emergent angle of the specified ray, and change in the direction in which the grating portions are arranged (that is, the periodic direction of the grating, the x direction in the drawing).

Similarly, an angle $\phi_2(p)$ is formed by the normal line 501$pa$ of a surface 502 (corresponding to the incident surface of the diffraction grating 5) which connects edge lines at the incident side of respective grating portions in the diffraction grating 5 and the p-th grating side surface 501$p$ at the peripheral side. Further, an angle $\phi_2(q)$ is formed by the normal line 501$qa$ of the same surface 502 and the grating side surface 501$q$ at the peripheral side of the q-th grating portion 5$q$. And, the angle $\phi_2(p)$ and the angle $\phi_2(q)$ are different from each other in accordance with the incident angle or emergent angle of the specified ray, and change in the direction in which the grating portions are arranged.

The changes in the inclination angles of the grating side surfaces sequentially increases or decreases while being distant from the center axis Ca.

That is, as in achromatism in a common refraction type optical system, by composing a diffractive optical element of a plurality of diffraction gratings in which materials thereof having different dispersion are combined, the wavelength dependence of diffraction efficiency can be lowered, and a high diffraction efficiency can be obtained in the entire use wavelength region. At the same time, taking into consideration the incident and emergent angle distribution of the entire effective rays passing through respective positions of the grating portions, the inclination of the grating side surfaces are changed so that eclipse of rays at the respective grating portions decreases, whereby occurrence of harmful light such as flare and ghost light, etc., which are unnecessary for picking up and observing of an image, is suppressed over the entire field angle.

Figure 30:
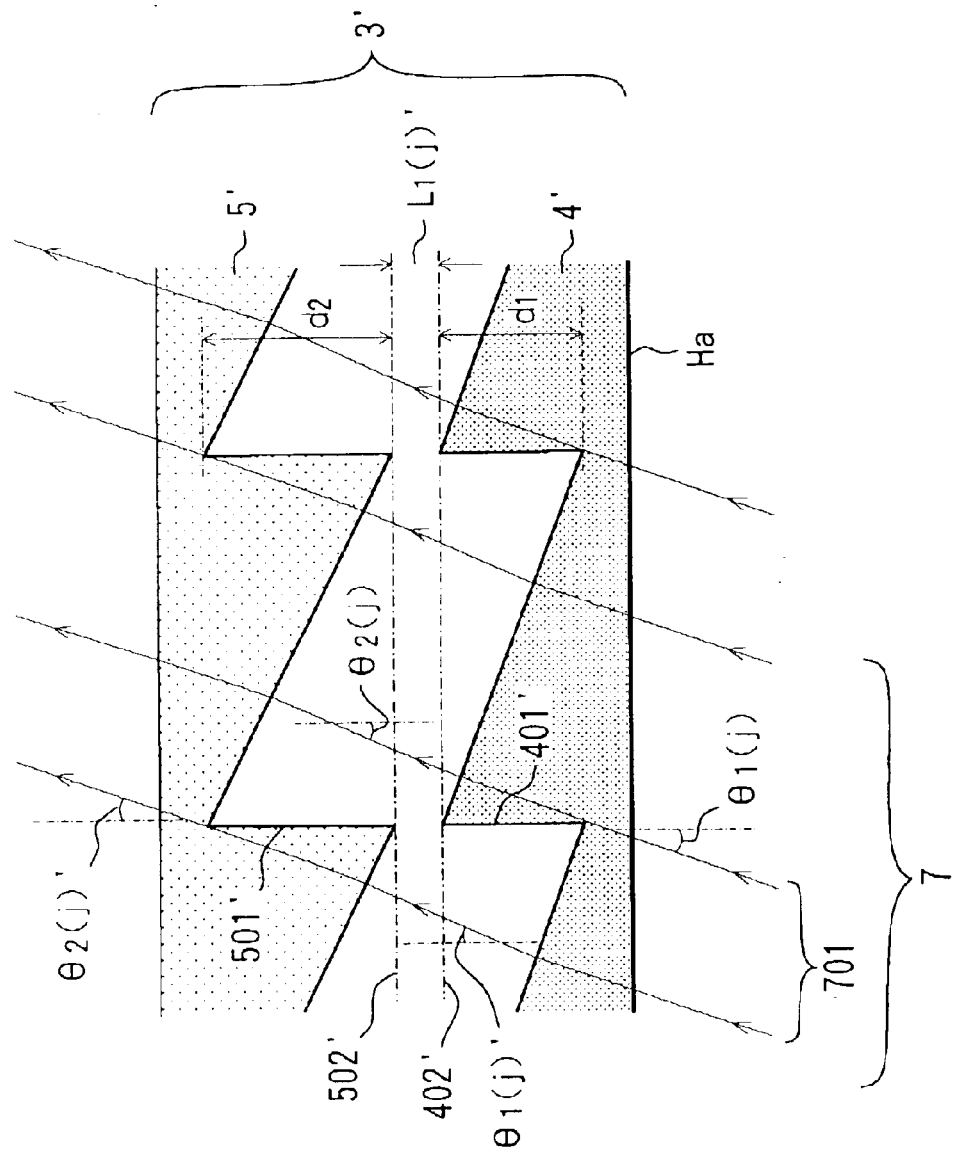
FIG. 30 is a descriptive view of the eclipse of rays in the diffractive optical element (two layers) for comparison.

As a comparative example, FIG. 30 shows a state of rays when the rays (specified rays) having a certain degree of angle are made incident into a diffractive optical grating composed of the same lamination structure as that of Embodiment 1 and having grating side surfaces 401' and 501' of grating portions provided perpendicular to an incident surface Ha (that is, perpendicular to a surfaces 402' and 502') of the diffraction portion 3'. A light flux 701 which is a part of a light flux (specified rays) 7 incident into the grating portion of one period of the diffraction grating is greatly eclipsed by the grating side surfaces 401' and 501', etc., and passes through an optical path that does not satisfy the conditions of achieving a high diffraction efficiency. This light flux 701 does not only not contribute to image formation but also becomes a cause for harmful light to occur.

In a case where the incident angle $\theta_1(j)$ with respect to the incident surface Ha of the specified rays (light flux 701) is 10°, the grating thickness $d_1$ of the first layer diffraction grating 4' is −7.88 µm, the grating thickness $d_2$ of the second layer diffraction grating 5' is −10.95 µm, an interval $L_1(j)$' from the surface 402' connecting edge lines of the first layer diffraction grating 4' to the surface 502' connecting edge lines of the diffraction grating 5' is 1.5 µm, and a grating pitch of the respective diffraction gratings is 80 µm, the ratio of eclipsed light flux 701 of the light flux 7 incident into the grating portion of one period becomes approx. 5.3%.

Herein, it is prescribed that the grating height (grating thickness) $d_i$ is converted to a positive value in a case where a material at the emergent side exists at the side in which the +1st order light (in the present and following embodiments, diffraction light emerging on the side of the center axis Ca (left side in FIG. 2) against the 0th order light is defined as negative order light and diffraction light emerging on the side of the periphery (right side in FIG. 2) is defined as positive order light) emerges against the 0th order light in the grating side surface and is converted to a negative value in a case where a material at the incident side exists at the same side.

Figure 3:
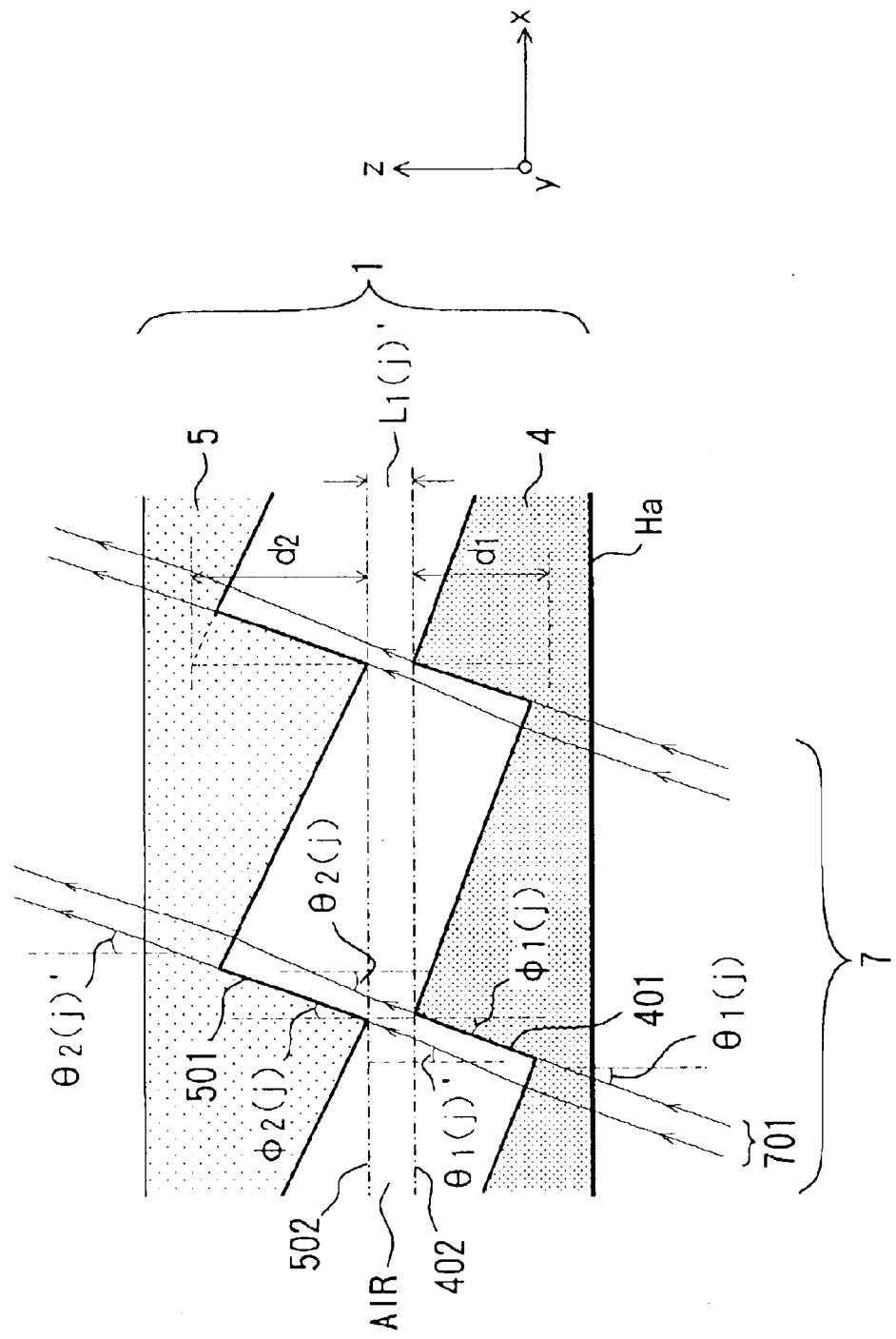
FIG. 3 is a descriptive view of the eclipse of rays in the diffractive optical element according to Embodiment 1.

FIG. 3 is a view describing a state of eclipse of rays when the rays (specified rays) are made incident into the diffractive optical element 1 according to Embodiment 1. In a case where the inclination angle $\phi_i(j)$ of the grating side surfaces of the respective grating portions in the diffraction gratings 4 and 5 is changed according to the position in the surface (xy plane) so that the eclipse of the rays is decreased, the ratio of the eclipsed light flux 701 of the light flux (specified rays) 7 incident into the grating portion of one period is clearly decreased in comparison with the diffractive optical element in FIG. 19.

In the present embodiment, the incident angle $\theta_1(j)$ of the light flux (specified rays) 701 with respect to the incident surface Ha of a diffractive optical element 1 is set to 10°, the grating thickness $d_1$ of the first layer diffraction grating 4 is set to −7.88 µm, the grating thickness $d_2$ of the second layer diffraction grating 5 is set to −10.95 µm, an interval $L_1(j)$' from the surface 402 to the surface 502 is set to 1.5 µm, a grating pitch of the respective diffraction gratings is set to 80 µm, the angle $\phi_i(j)$ of the grating side surface 401 with respect to the normal line of the surface 402 is set to 10°, and the angle $\phi_2(j)$ of the grating side 501 with respect to the normal line of the surface 502 is set to 12.8°, wherein the ratio of the eclipsed light flux 701 of the light flux 7 incident into the grating portion of one period of the diffraction portion 3 becomes approx. 0.9%. In comparison with the structure of the comparative example shown in FIG. 30, the ratio of eclipsed light flux is lowered to approx. one-sixth. By using such a diffractive optical element 1 according to the present embodiment in a part of an optical system, a great effect for suppressing occurrence of harmful light which becomes a factor of flare and ghost, etc., can be obtained.

Herein, although the angle $\phi_1(j)$ of the grating side surface 401 and the angle $\phi_2(j)$ of the grating side surface 501 are, respectively, determined to be 10° and 12.8° on the basis of the incident angles $\theta_1(j)$ and $\theta_2(j)$ of the specified ray incident into the diffraction gratings 4 and 5, either one or both may be determined on the basis of the emergent angles $\theta_1(j)$' and $\theta_2(j)$' of the specified ray from the respective diffraction gratings. Also, even if the angles of the grating side surfaces are set to optional angles from 0.2 times to 2.0 times of the incident angle or the emergent angle without strictly making the angles of the grating side surfaces coincident with the incident angle or the emergent angle of the specified ray, the same effects as those described above can be obtained.

That is, it is preferable that the diffraction gratings disposed at the i-th layer and (i+1)th layer counting from the light incident side of a plurality of diffraction gratings have a region in which, where the incident angle of specified ray passing through the j-th grating portion counting from the center axis Ca is $\theta_i(j)$ and $\theta_{i+1}(j)$ and the emergent angle thereof is $\theta_i(j)'$ and $\theta_{i+1}(j)'$, the inclination angle $\phi_i(j)$ of the grating side surface changes so as to satisfy at least one of $$\phi_i(j) = C_1 \cdot \theta_i(j) \quad (1)$$

$$\phi_i(j) = C_1 \cdot \theta_i(j)' \quad (2)$$

$$\phi_{i+1}(j) = C_1 \cdot \theta_{i+1}(j) \quad (3), \text{ and}$$

$$\phi_{i+1}(j) = C_1 \cdot \theta_{i+1}(j)' \quad (4)$$

where $C_1$ is any optional real number which is 0.2 or more and 2.0 or less ($0.2 = C_1 = 2.0$).

In the present embodiment, with respect to a lamination type diffractive optical element composed of two layers, a case where the inclinations of the grating side surfaces of both layers change is described. However, in a case where the inclination angle changes in only at least one layer, a considerable effect can be obtained. Also, even in a lamination type diffractive optical element composed of diffraction gratings of more than two layers, a considerable effect is obtained when the inclination angle changes in only one or more layers.

Further, in Embodiment 1, as shown in FIG. 1, a case where grating portions that compose respective diffraction gratings are provided to be linear so as to extend in a certain direction is shown. However, the effects which are the same as those in the above can be obtained even in a case where the grating portions are concentrically provided.

(Embodiment 2)

Figure 4:
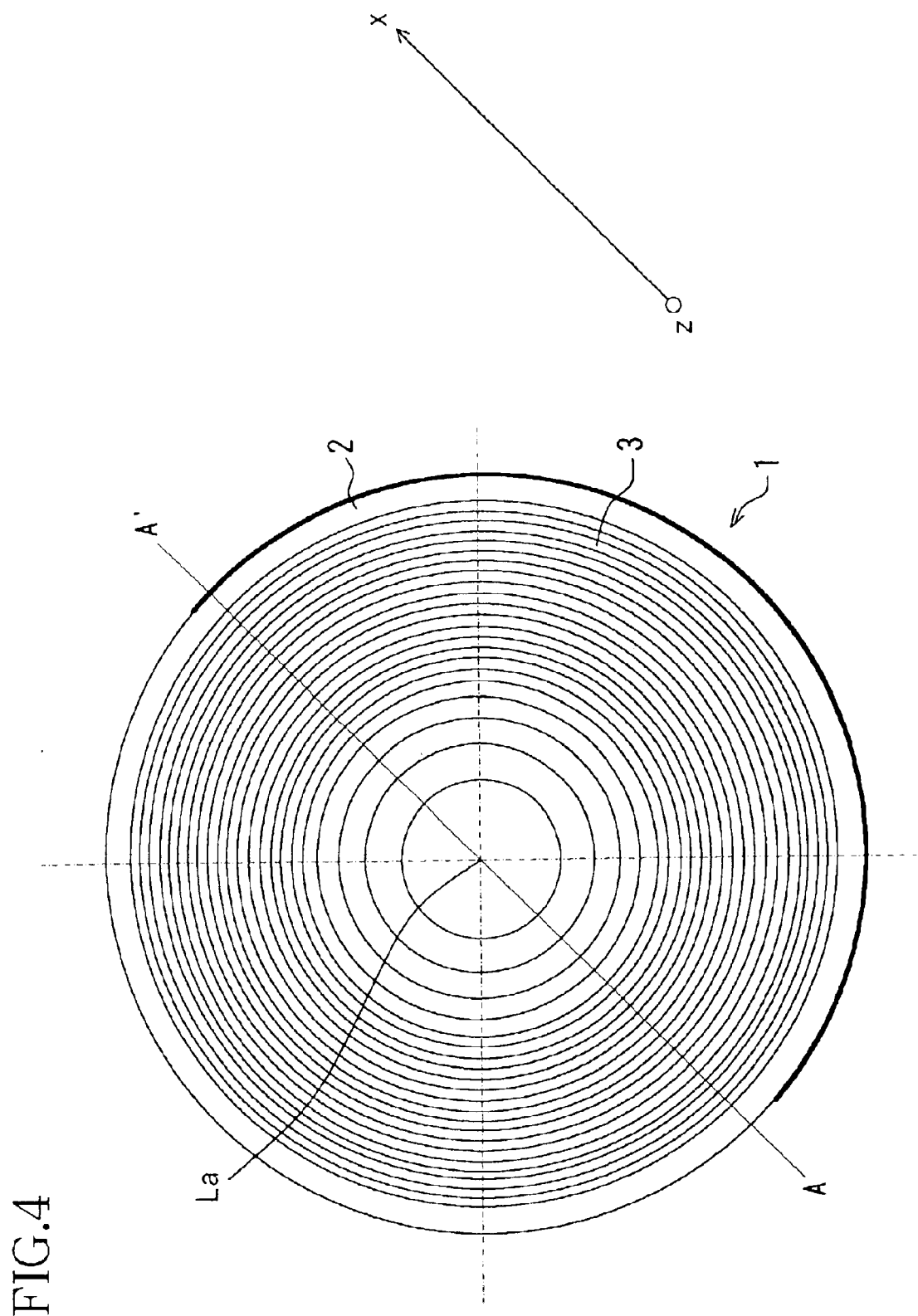
FIG. 4 is a front elevational view of a diffractive optical element according to Embodiment 2.
Figure 5:
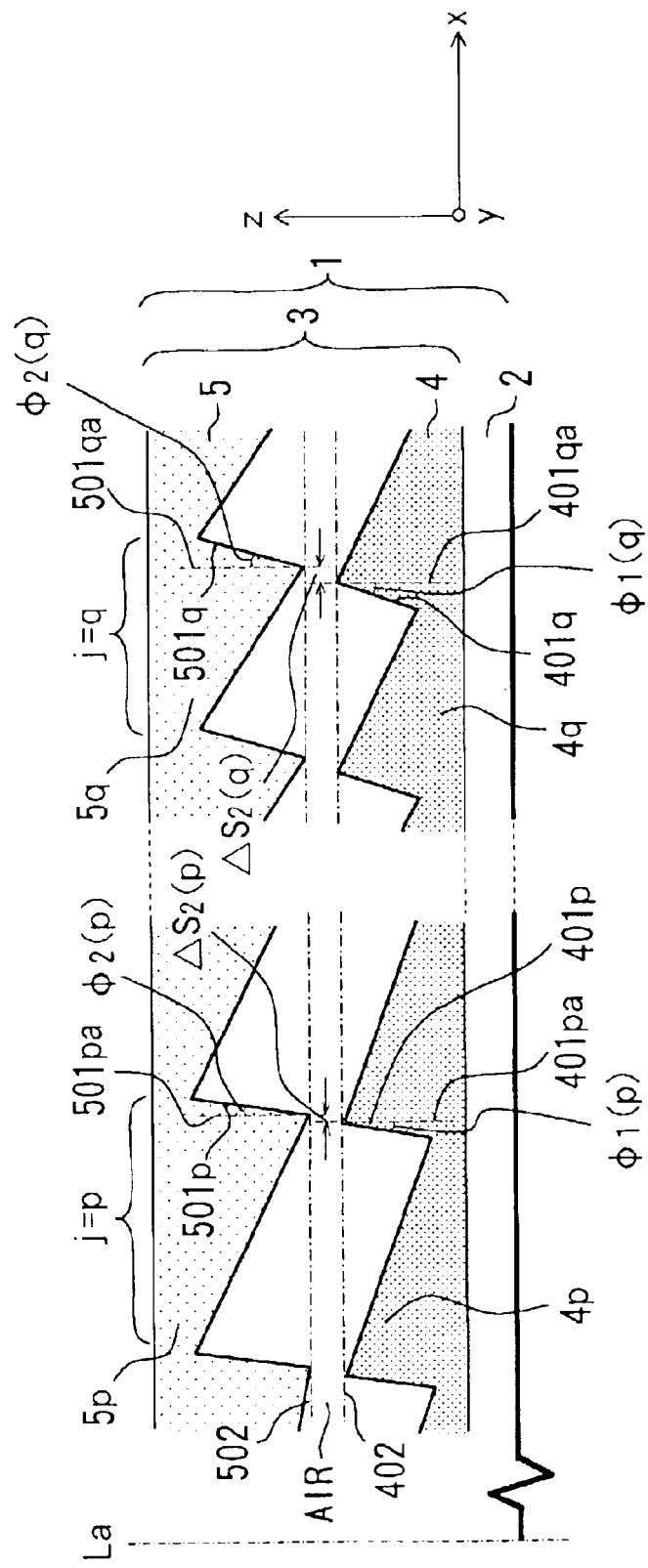
FIG. 5 is a cross-sectional view of the major parts of the diffractive optical element according to Embodiment 2.

FIG. 4 is a front elevational view of a diffractive optical element according to Embodiment 2 of the present invention. FIG. 5 shows a part of a cross-sectional shape of the diffractive optical element 1 according to Embodiment 2, which is taken along the line A–A' in FIG. 4. In these drawings, the diffractive optical element 1 is composed so that a diffraction portion 3 having a plurality of diffraction gratings respectively made of different materials laminated is disposed on the surface of a substrate 2. The diffraction portion 3 is formed so that concentric diffraction gratings 4 and 5 are laminated with an air layer therebetween. In the diffraction gratings 4 and 5, the grating periods gradually decrease from the center La toward the periphery along the x direction. The diffraction grating 4 which is the first layer counting from the incident side is formed of the first ultraviolet ray hardening resin (whose refractive index is $n_d = 1.636$ and Abbe number $v_d$ is 22.8), which is one of the energy-hardening materials, and the diffraction grating 5 which is the second layer is formed of the second ultraviolet ray hardening resin (whose refractive index is $n_d = 1.513$ and Abbe number $v_d$ is 51.0). Reference symbol La is the center of the diffractive optical element 1, that is, an optical axis. The diffraction grating 4 is formed of a serrated shape in which the grating thickness of the grating portion is decreased from the center to the periphery at one period, and the diffraction grating 5 is also formed of a serrated shape in which the grating thickness of the grating portion is increased from the center toward the periphery at one period. The diffraction gratings 4 and 5 are set to be shaped so as to increase the diffraction efficiency of a diffractive light having a specified order.

As in Embodiment 1, in the present embodiment, herein an angle $\phi_1(p)$ is formed by the normal line 401pa of a surface 402 which connects edge lines at the emergent sides of the respective grating portions in the diffraction grating 4 and the grating side surface 401p at the peripheral side of the p-th grating portion 4p counting from the optical axis La. Further, an angle $\phi_1(q)$ is formed by the normal line 401qa of the same surface 402 and the grating side surface 401q at the peripheral side of the q-th grating portion 4q. And, the angle $\phi_1(p)$ and the angle $\phi_2(q)$ are different from each other in accordance with the incident angle or emergent angle of a specified ray of lights, and sequentially change greatly or slightly while being distant from the optical axis La.

Similarly, an angle $\phi_2(p)$ is formed by the normal line 501pa of a surface 502 which connects edge lines at the incident side of respective grating portions in the diffraction grating 5 and the grating side surface 501p at the peripheral side of the p-th grating portion 5p counting from the optical axis La. An angle $\phi_2(q)$ is formed by the normal line 501qa of the same surface 502 and the grating side surface 501q at the peripheral side of the q-th grating portion 5q. And the angle $\phi_2(p)$ and the angle $\phi_2(q)$ are different from each other in accordance with the incident angle or emergent angle of the specified ray.

Further characteristics of the present embodiment resides in that the positions of the edges (edge lines) of the grating portions connecting the respective layer diffraction gratings shifts according to the positions in the x direction in accordance with the incident angle or emergent angle of the specified ray, and changes so that the amount of shift increases or decreases while being distant from the optical axis La.

In detail, a shift amount $\Delta S_2(p)$ of the edge at the peripheral side of the p-th grating portion of the first layer and the edge at the peripheral side of the p-th grating portion of the second layer which is adjacent to the former edge in the x direction, and a shift amount $\Delta S_2(q)$ of the edge at the peripheral side of the q-th grating portion of the first layer and the edge at the peripheral side of the q-th grating portion of the second layer which is adjacent to the former edge in the x direction are different from each other in accordance with the incident angle or emergent angle of the specified ray.

Thus, taking into consideration the incident angle and emergent angle distribution of all effective rays passing through respective positions of the grating portion, the inclination angle of the grating side surface and the edge positions are set to be optimal so that eclipsed rays are reduced at the respective grating portions. Thus, occurrence of harmful light which becomes a factor of flare and ghost, etc., is suppressed over the entire field angle.

Figure 6:
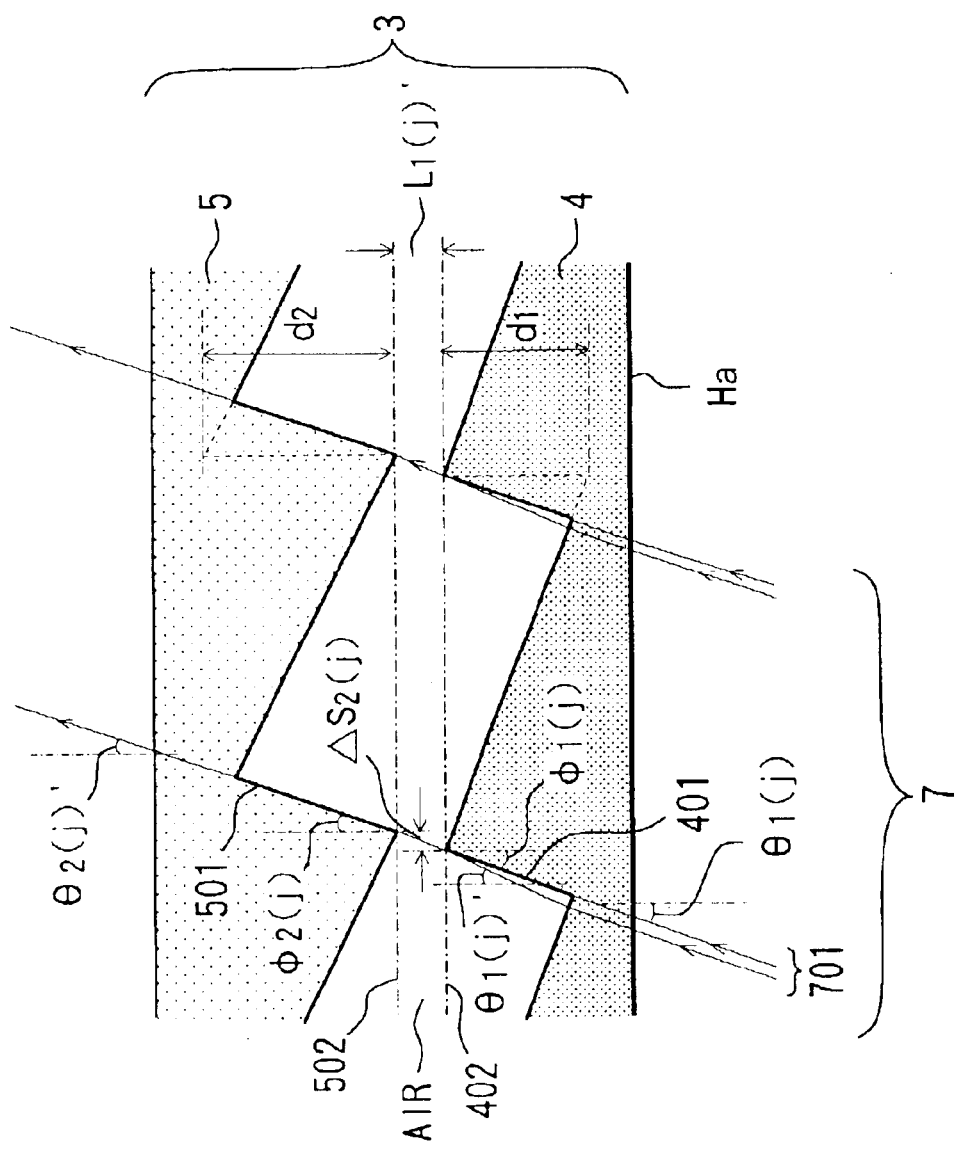
FIG. 6 is a descriptive view of the eclipse of rays in the diffractive optical element according to Embodiment 2.

FIG. 6 is a view describing a state of eclipse of rays when the specified rays are made incident into the diffractive optical element 1 according to Embodiment 2. By varying at least one of the inclination angles of the grating side surfaces and the shift amounts of the edges at the grating portions of respective layers so that the eclipse of the rays is decreased, it is possible to remarkably decrease the ratio of the eclipsed light flux 701 of the light flux 7 incident into the grating portion of one period.

In the present embodiment, the incident angle $\theta_1(j)$ with respect to an incident surface Ha of the specified ray is set to 10°, the grating thickness $d_1$ of the first layer diffraction grating 4 is set to −7.88 μm, the grating thickness $d_2$ of the second layer diffraction grating 5 is set to −10.95 μm, an interval $L_1(j)'$ from the surface 402 to the surface 502 is set to 1.5 μm, a grating pitch of the respective diffraction gratings is set to 80 μm, the inclination angle $\phi_1(j)$ of the grating side surface 401 is set to 10°, and the inclination angle $\phi_2(j)$ of the grating side surface 501 is set to 12.8°, and the shift amount $\Delta S_2(j)$ of the edges is set to 0.34 µm. Thereby, the ratio of the eclipsed light flux 701 of the light flux 7 incident into the grating portion of one period becomes approx. 0.42%. In comparison with the structure shown in FIG. 30, the ratio of the eclipsed light flux 701 is lowered to approx. one-twelfth. When such a diffractive optical element 1 according to the present embodiment is used in a part of an optical system, a great effect for suppressing occurrence of harmful light which becomes a factor of flare and ghost, etc., can be obtained. However, the ratio of the eclipsed light flux shown herein is a ratio in the cross direction where the diffraction grating is considered in view of the cross-sectional shape.

In the present embodiment, although the angles $\phi_1(j)$ and $\phi_2(j)$ are, respectively, determined to be 10° and 12.8° on the basis of the incident angles $\theta_1(j)$ and $\theta_2(j)$ of the specified ray into the diffraction gratings 4 and 5, either one or both may be determined on the basis of the emergent angles $\theta_1(j)'$ and $\theta_2(j)'$ of the specified ray from the respective diffraction gratings. Also, it is not necessary that the inclination angles of the grating side surfaces 401 and 501 are made strictly coincident with the incident or emergent angle of the specified ray, and the inclination angles of the grating side surfaces may be set to optional angles from 0.2 times to 2.0 times of the incident angle or the emergent angle, so that these satisfy at least one of the above-described conditional expressions (1) through (4).

Further, the shift amounts $\Delta S_2(j)$ of the edges of the grating portions of the respective layers is determined to be 0.34 µm from a value obtained by multiplying the interval 1.5 µm by tan 12.8° on the basis of the interval $L_1(j)'$ and the value of 12.8° of the emergent angle $\theta_1(j)'$ of the specified ray from the diffraction grating 4. However, it is not necessary that the shift amount is made strictly coincident with the value thus obtained. It may be optionally set to a value between 0.1 times and 1.5 times of a value obtained by the following expression:

$$L_1(j)' \times \tan \theta_1(j)'$$

In detail, the edge position of the j-th grating portion counting from the center at a diffraction grating disposed at the i-th layer, and the edge portion of the grating portion in the (i+1)th layer diffraction grating adjacent thereto are disposed so as to shift in the direction of arrangement of the grating portions so that eclipse of the specified rays is reduced. The shift amount $\Delta S_{i+1}(j)$ may be changed so that it satisfies:

$$\Delta S_{i+1}(j) = C_2 \cdot L_1(j)' \tan \theta_1(j) \quad (5)$$

where $C_2$ is an optional real number which is 0.1 or more and 1.5 or less ($0.1 = C_2 = 1.5$).

Also, Embodiment 2 shows a case where a diffraction grating is concentrically provided as shown in FIG. 4. However, similar effects can be obtained even in a case where the diffraction grating is linearly provided.

(Embodiment 3)

Figure 7:
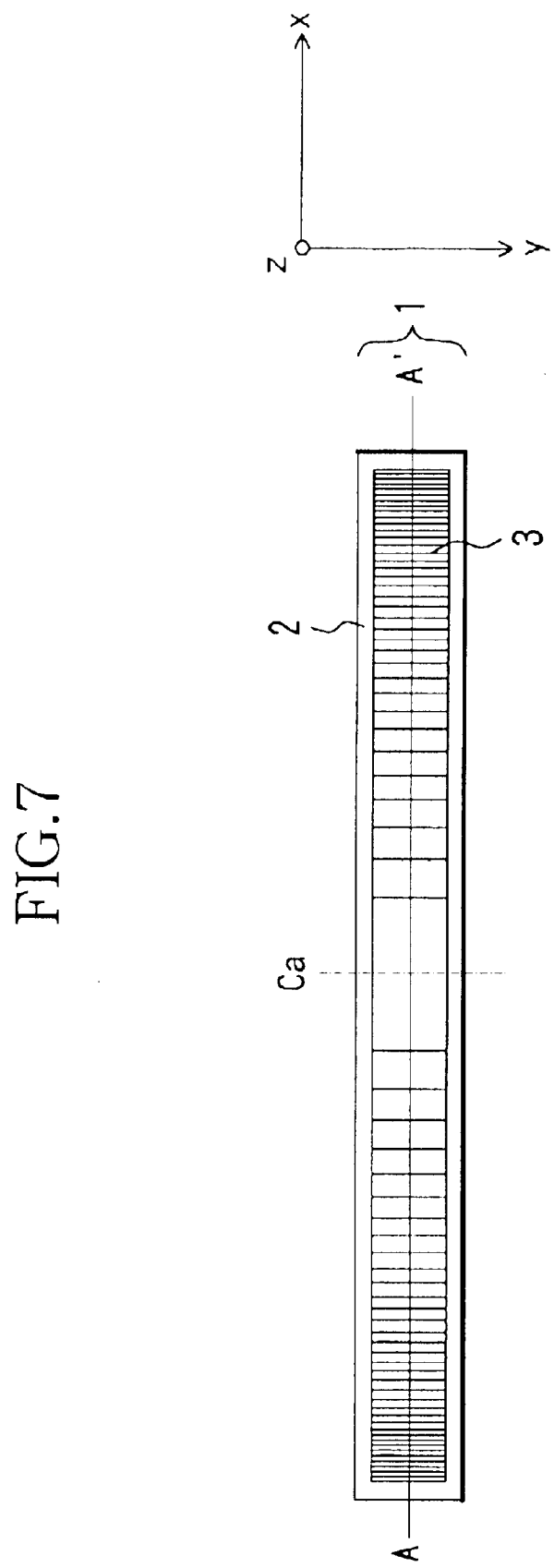
FIG. 7 is a front elevational view of a diffractive optical element according to Embodiment 3.
Figure 8:
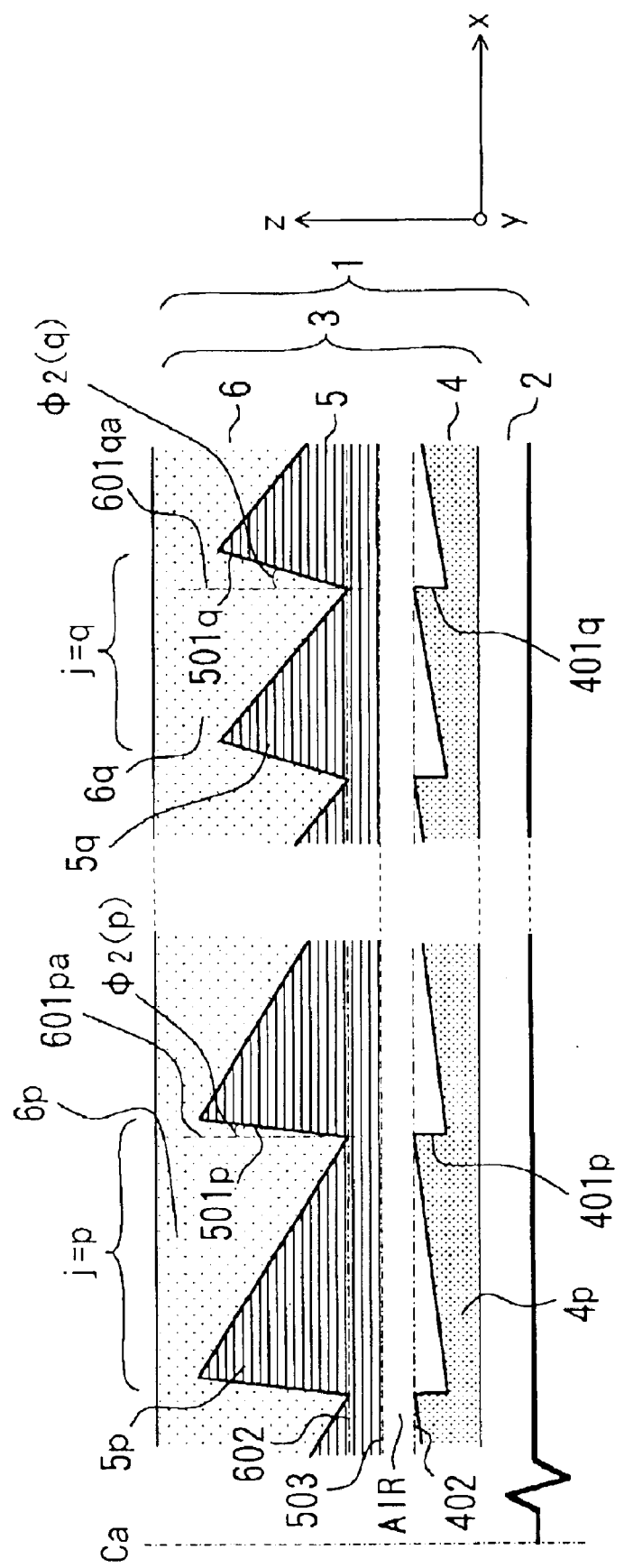
FIG. 8 is a cross-sectional view of the major parts of the diffractive optical element according to Embodiment 3.

FIG. 7 is a front elevational view of a diffractive optical element 1 according to Embodiment 3 of the present invention. FIG. 8 shows a part of the cross-sectional shape of the diffractive optical element 1 according to Embodiment 3, which is taken along the line A–A' in FIG. 7.

In these drawings, the diffractive optical element 1 is composed so that a diffraction portion 3 having a plurality of diffraction gratings respectively made of different materials laminated is disposed on the surface of a substrate 2. The diffraction portion 3 is formed so that a diffraction grating 4 and a diffraction grating 5, each of which is a one-dimensional grating (linear grating) elongating in the y direction, are laminated with an air layer AIR therebetween, and the diffraction grating 5 and a diffraction grating 6 are laminated with no air layer therebetween. The diffraction gratings 4, 5 and 6 have grating periods which gradually become shorter toward the periphery along the x direction from the center axis Ca.

The diffraction grating 4, air layer AIR, diffraction grating 5 and diffraction grating 6 are laminated from the incident side on the substrate 2 in order. The diffraction grating 4 which is the first layer counting from the incident side is formed of the first ultraviolet ray hardening resin (whose refractive index is $n_d=1.636$ and Abbe number $\nu_d$ is 22.8), which is one of the energy-hardening materials, and the diffraction grating 5 which is the second layer is formed of the second ultraviolet ray hardening resin (whose refractive index is $n_d=1.598$ and Abbe number $\nu_d$ is 28.0). The diffraction grating 6 which is the third layer is formed of the third ultraviolet ray hardening resin (whose refractive index is $n_d=1.513$ and Abbe number $\nu_d$ is 51.0). The diffraction grating 4 is formed of a serrated shape in which the grating thickness of the grating portion is increased toward the periphery at one period, the diffraction grating 5 is also formed of a serrated shape in which the grating thickness of the grating portion is decreased toward the periphery at one period, and the diffraction grating 6 is also formed of a serrated shape in which the grating thickness of the grating portion is increased toward the periphery at one period, wherein the diffraction gratings 4, 5 and 6 are set to be shaped so as to increase the diffraction efficiency of a diffractive light having a specified order.

In the diffractive optical element of the present embodiment, the grating side surfaces 401p and 401q of the p-th and q-th grating portions counting from the center axis Ca in the diffraction grating 4 are perpendicular to a surface 402 connecting edge lines at the emergent side of the respective grating portions in the diffraction grating 4. An angle $\phi_2(p)$ is formed by the normal line 601pa of a surface 602 connecting edge lines at the incident side of the respective grating portions in the diffraction grating 6 and the grating side surface 501p at the periphery side of the p-th grating portions 5p and 6p counting from the center Ca in the diffraction gratings 5 and 6 which contact with each other with no air layer therebetween. Further, an angle $\phi_2(q)$ is formed by the normal line 601qa of the same surface 602 and the grating side surface 501q at the periphery side of the q-th grating portions 5q and 6q. And, the angle $\phi_2(p)$ and the angle $\phi_2(q)$ are different from each other in accordance with the incident angle or emergent angle of a specified ray of light and change along the x direction.

Figure 31:
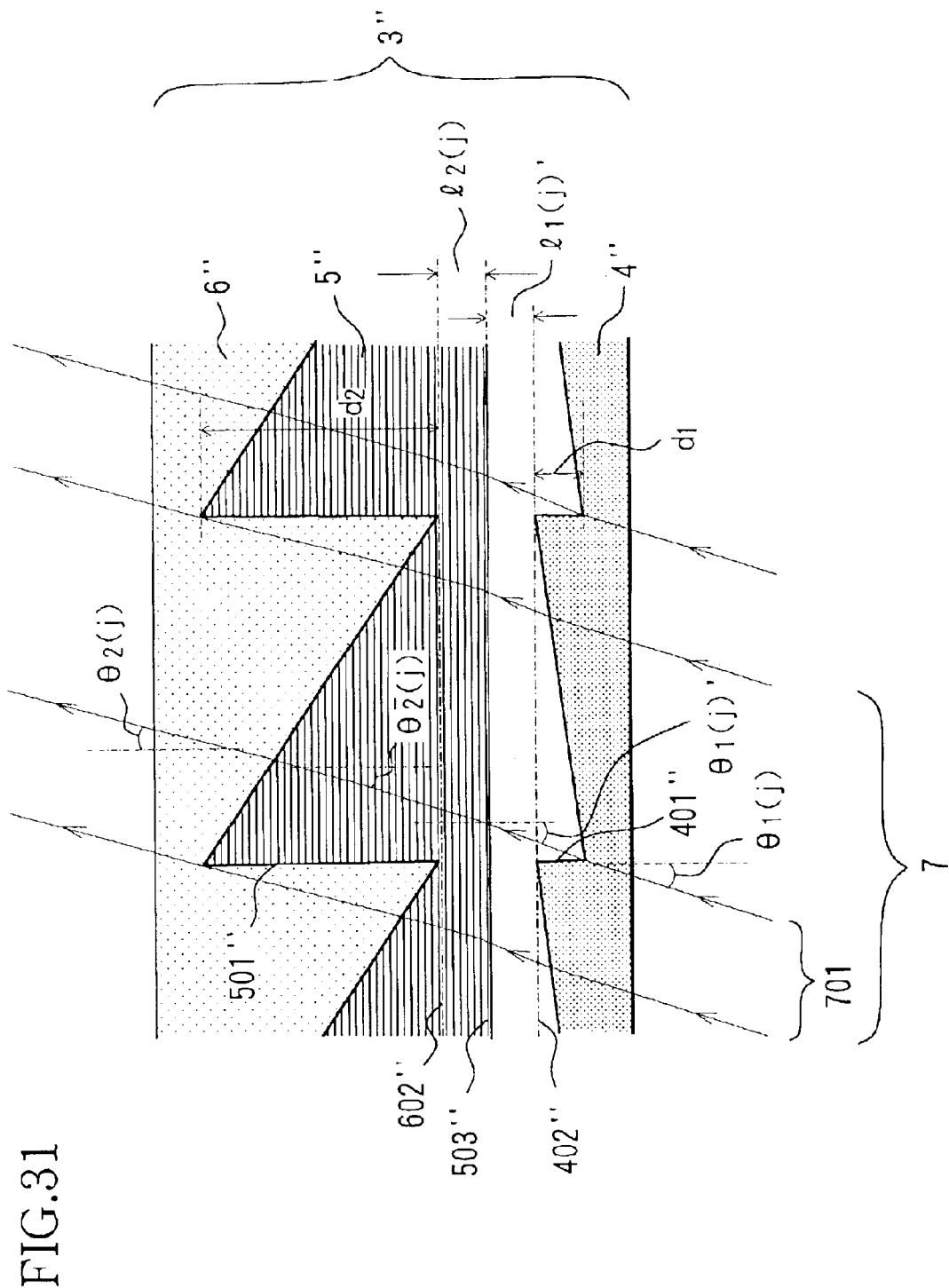
FIG. 31 is a descriptive view of the eclipse of rays in the diffractive optical element (three layers) for comparison.

As a comparative example, FIG. 31 shows a state when specified rays are made incident into a diffractive optical element, which is composed of three layered diffraction gratings as in Embodiment 3, but in which grating side surfaces of grating portions are provided perpendicular to an incident surface Ha of a diffraction portion 3". A light flux 701 which is a part of a light flux (specified rays) 7 incident into the grating portion of one period is greatly eclipsed by the grating side surfaces 401" and 501" and passes through an optical path that does not satisfy the conditions to achieve a high diffraction efficiency. This light flux 701 does not only not contribute to image formation but also become factors in causing harmful light such as flare and ghost light, etc.

For example, in a case where the incident angle $\theta_1(j)$ of the light flux (specified rays) 701 with respect to the incident surface Ha is 10°, the grating thickness $d_1$ of the first layer diffraction grating 4" is 3.54 μm, the grating thickness $d_2$ of the second layer diffraction grating 5" and the grating thickness $d_2$ of the third layer diffraction grating 6" are −19.50 μm, an interval $l_1(j)'$ from a surface 402" connecting edge lines at the emergent side of the first layer diffraction grating 4" to a boundary surface 503" at the incident side at the second layer diffraction grating 5" is 1.5 μm, an interval $l_2(j)$ from the same surface 503" to a surface 602" connecting edge lines at the incident side of the respective grating portions in the diffraction grating 6" is 1.5 μm, and a grating pitch of the respective diffractive gratings is 80 μm, the ratio of the eclipsed light flux 701 of the light flux 7 incident into the grating portion of one period becomes approx. 6.6%.

Figure 9:
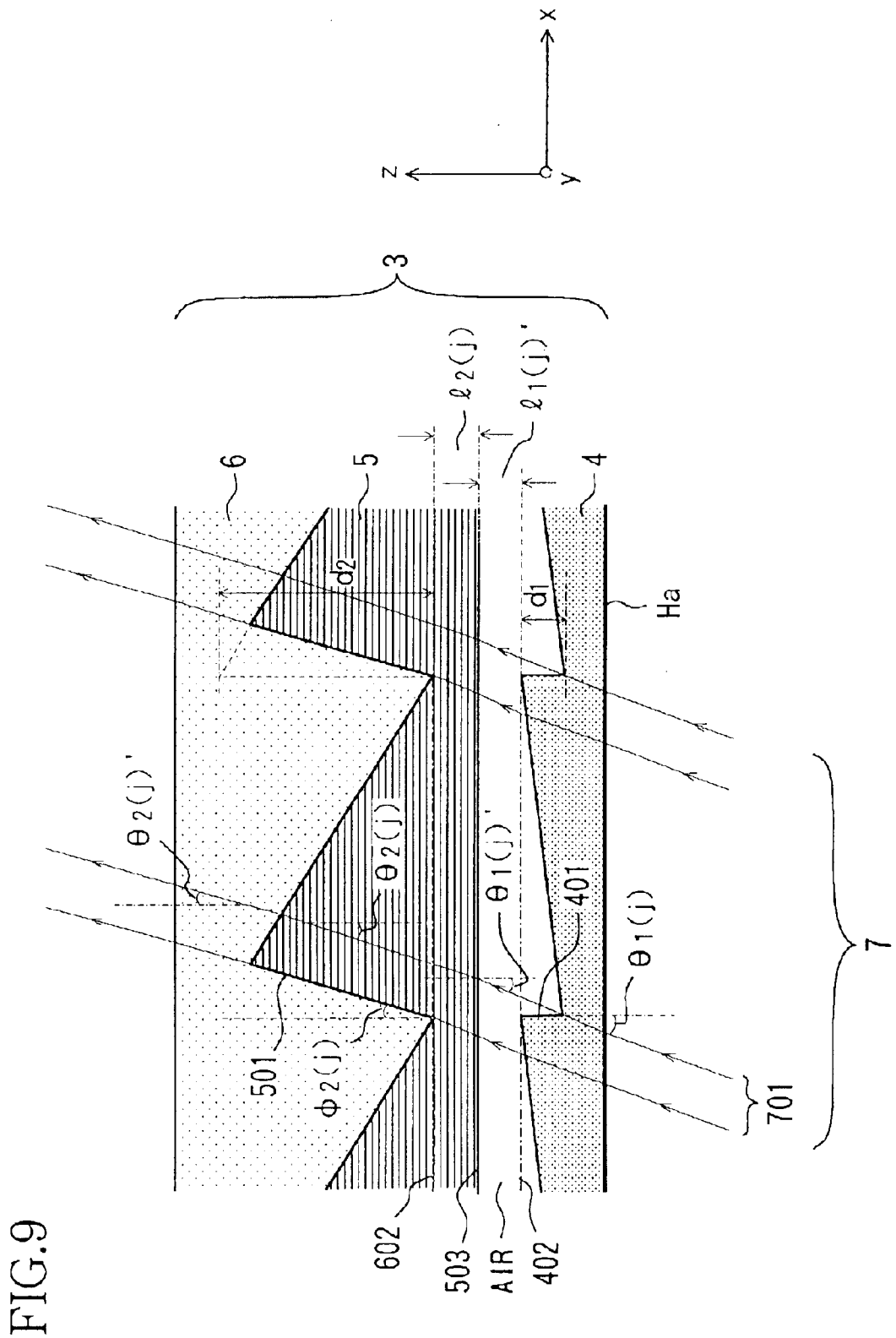
FIG. 9 is a descriptive view of the eclipse of rays in the diffractive optical element according to Embodiment 3.

On the contrary, FIG. 9 is an explanatory view describing an eclipse state of rays (specified rays) when they are made incident into the diffractive optical element 1 according to Embodiment 3. It is understood that by changing the inclination angle $\phi_i(j)$ of the grating side surfaces 501 of the respective grating portions of the diffraction gratings 5 and 6 according to the position in the x direction in the plane (x,y) so that eclipse of rays decreases, the ratio of the eclipsed light flux 701 of the light flux 7 incident into the grating portion of one period is clearly reduced in comparison with the diffractive optical element in FIG. 31.

In the present embodiment, the incident angle $\theta_1(j)$ with respect to an incident surface Ha of the diffractive optical element 1 of the specified ray is 10°, the grating thickness $d_1$ of the first layer diffraction grating 4 is set to 3.54 μm, the grating thickness $d_2$ of the second layer diffraction grating 5 and the grating thickness $d_2$ of the third layer diffraction grating 6 are set to −19.50 μm, an interval $l_1(j)'$ from the surface 402 to a boundary surface 503 at the incident side of the second layer diffraction grating 5 is set to 1.5 μm, an interval $l_2(j)$ from the same surface 503 to the surface 602 is set to 1.5 μm, and a grating pitch of the respective diffraction gratins is 80 μm, the angle $\phi_1(j)$ of the grating side surface 401 with respect to the normal line of the surface 402 is set to 0°, and the angle $\phi_2(j)$ of the grating side surface 601 with the normal line of the side surface 602 is set to 11.2°. Thereby, the ratio of the eclipsed light flux 701 of the light flux 7 incident into the grating portion of one period of the diffraction portion 3 becomes approx. 1.78%, wherein the ratio of the eclipsed light flux can be lowered to approx. one-third in comparison with the structure of the comparative example shown in FIG. 31. If such a diffractive optical element 1 according to the present embodiment is used for a part of an optical system, a great effect for suppressing occurrence of harmful light such as flare and ghost light, etc., can be obtained.

Herein, the angle $\phi_2(j)$ of the grating side surface 601 is determined to be 11.2° which is the same as the emergent angle $\theta_2(j)'$ of the specified ray from the diffraction grating 5. However, it may be determined on the basis of the incident angle $\theta_2(j)$ of the specified ray into the diffraction grating 6. In addition, it is not necessary that the angles of the grating side surfaces are made strictly coincident with the incident angle or the emergent angle of the specified ray, wherein it may be optionally set at an angle between 0.2 times and 2.0 times of the incident angle or the emergent angle, so that it satisfies at least one of the above-described conditional expressions (1) through (4).

Also, in the present embodiment, a case where the inclination angle of the grating side surface of diffraction gratings disposed in the second layer and third layer counting from the incident side is changed in the lamination type diffractive optical element composed of three layers. However, the inclination angle of the grating side surface of the first layer diffraction grating may be further changed. Further, in a case where the inclination angle changes in only at least one layer in the lamination type diffractive optical element, a considerable effect can be obtained.

In addition, as shown in FIG. 7, a case where the grating portions that comprises the respective diffraction gratings are linearly provided is shown in Embodiment 3. However, similar effects can be obtained in a case where the grating portion is concentrically provided.

(Embodiment 4)

Figure 10:
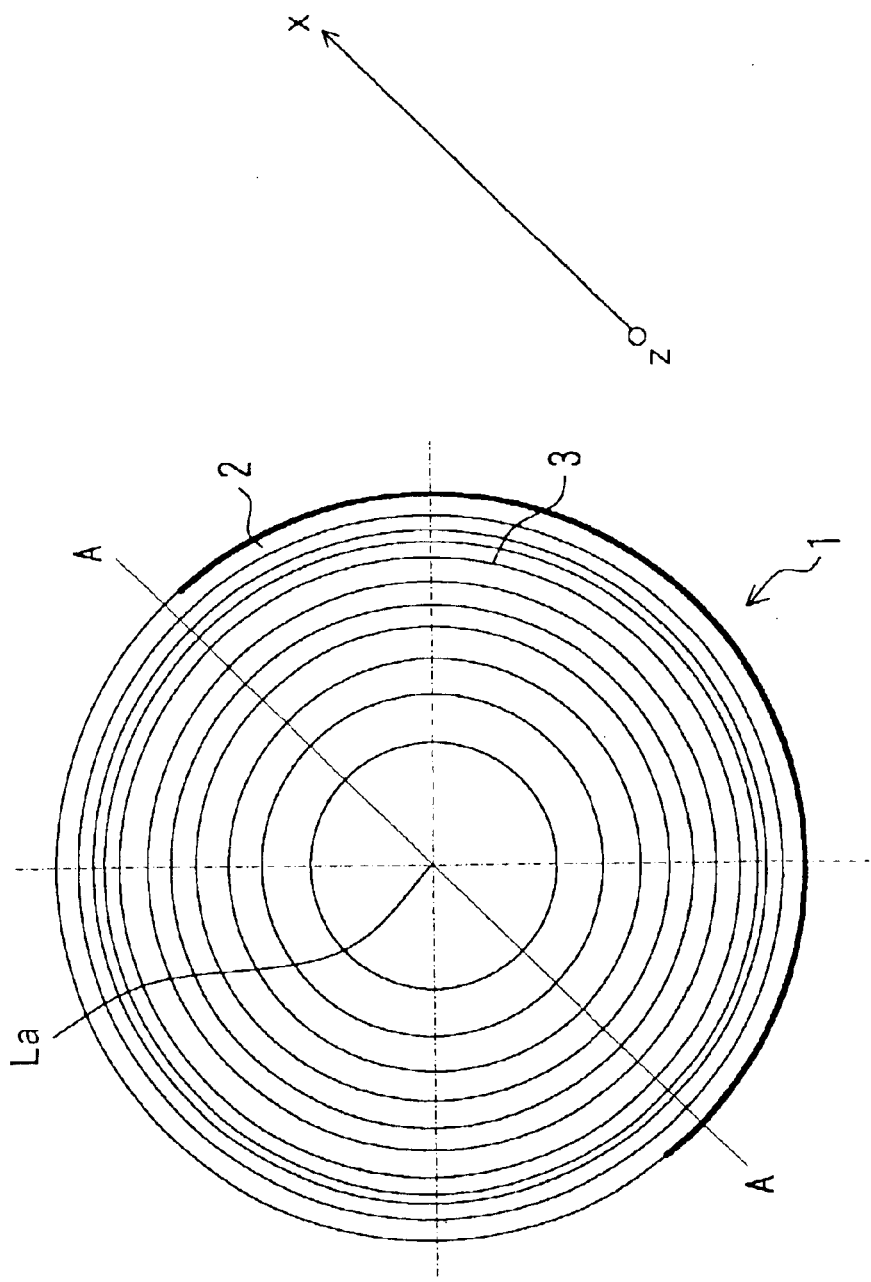
FIG. 10 is a front elevational view of a diffractive optical element according to Embodiment 4.
Figure 11:
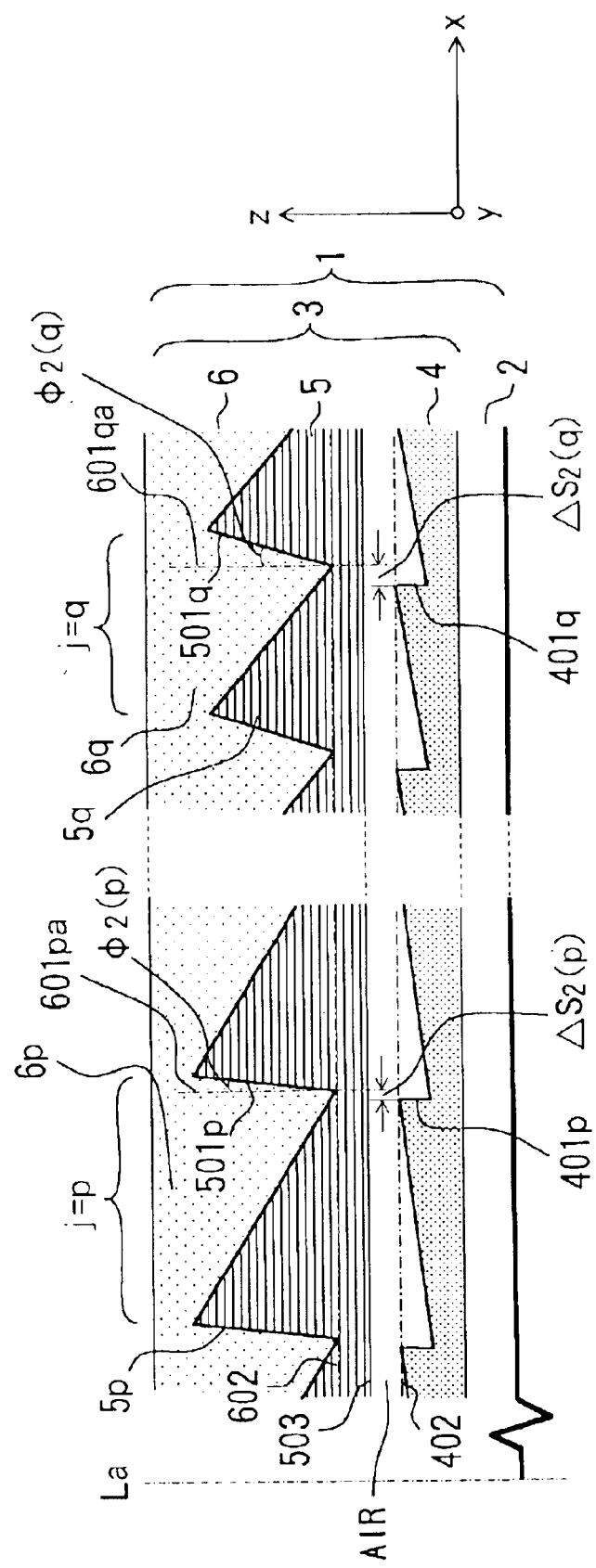
FIG. 11 is a cross-sectional view of the major parts of the diffractive optical element according to Embodiment 4.

FIG. 10 is a front elevational view of a diffractive optical element 1 according to Embodiment 4 of the present invention. FIG. 11 shows a part of a cross-sectional shape of the diffractive optical element 1 according to Embodiment 4, which is taken along the line A–A' in FIG. 10. In these drawings, the diffractive optical element 1 is composed so that a diffraction portion 3 in which diffraction gratings, respectively, made of different materials are laminated on the surface of a substrate 2. Concentric diffraction gratings 4, 5 and 6 are laminated in the diffraction portion 3, wherein the respective diffraction gratings have periods which becomes smaller and smaller from the center toward the periphery along the x direction.

The diffractive optical element 1 is structured by laminating, in order from an incident side, the diffraction gratings 4, 5 and 6 on the substrate 2. An air layer AIR is formed between the diffraction gratings 4 and 5. The diffraction grating 6 contacts with the diffraction grating 5.

And, the first layer diffraction grating 4 counting from the incident side is formed of the first ultraviolet ray hardening resin ($n_d$=1.636 and $v_d$=22.8), which is one of the energy-hardening materials, the second layer diffraction grating 5 is formed of the second ultraviolet ray hardening resin ($n_d$=1.598 and $v_d$=28.0), and the third layer diffraction grating 6 is formed of the third ultraviolet ray hardening resin ($n_d$=1.513 and $v_d$=51.0). Reference symbol La is the center, that is, the optical axis of the diffractive optical element 1.

The diffraction grating 4 is formed of a serrated shape in which the grating thickness of the grating portion increases toward the periphery at one period, the diffraction grating 5 is formed of a serrated shape in which the grating thickness of the grating portion decreases toward the periphery at one period, and the diffraction grating 6 is formed of a serrated shape in which the grating thickness of the grating portion increases toward the periphery at one period, wherein these gratings are shaped so as to increase the diffraction efficiency of diffractive light of a specified order.

In the present embodiment, the grating side surfaces 401p and 401q of the p-th and q-th grating portions counting from the center axis La in the diffraction grating 4 are perpendicular to a surface 402 connecting edge lines at the emergent side of the respective grating portions in the diffraction grating 4. An angle $\phi_2(p)$ is formed by the normal line 601pa of a surface 602 connecting edge lines at the incident side of respective grating portions of the diffraction grating 6 and the grating side surface 501p at the peripheral side of the p-th grating portions 5p and 6p counting from the center La in the diffraction gratings 5 and 6 which contact with each other with no air layer therebetween. Further, an angle $\phi_2(q)$ is formed by the normal line 601qa of the same surface 602 and the grating side surface 501q at the peripheral side of the q-th grating portions 5q and 6q. The angle $\phi_2(p)$ and the angle $\phi_2(q)$ are different from each other in accordance with the incident angle or the emergent angle of a specified ray of light and change so as to decrease or increase while being distant from the optical axis La.

In addition, in the diffractive optical element according to the present embodiment, the edge (edge line) at the peripheral side of the grating portions that comprise the diffraction grating 4, and the edge at the peripheral side of the grating portions that comprise the diffraction gratings 5 and 6 adjacent thereto are caused to shift in the x direction in accordance with the incident angle or the emergent angle of the specified ray, and the shift amount is varied so as to increase or decrease while being distant from the optical axis La.

In detail, the shift amount $\Delta S_2(p)$ between the edge of the p-th grating portion of the first layer and the edges of the p-th grating portions of the second and third layers in the x direction, and the shift amount $\Delta S_2(q)$ between the edge of the grating portion of the q-th grating portion of the first layer and the edges of the q-th grating portions of the second and third layer in the x direction are different from each other in accordance with the incident angle or the emergent angle of the specified ray.

Thus, taking into consideration the incident angle/emergent angle distribution of all effective rays passing through each position of the grating portions, by optimally setting of the inclination angles of the grating side surfaces and the edge positions in the respective grating portions so that the eclipses of rays is reduced to suppress occurrence of harmful light which becomes a factor of flare and ghost, etc., over the entire field angle.

Figure 12:
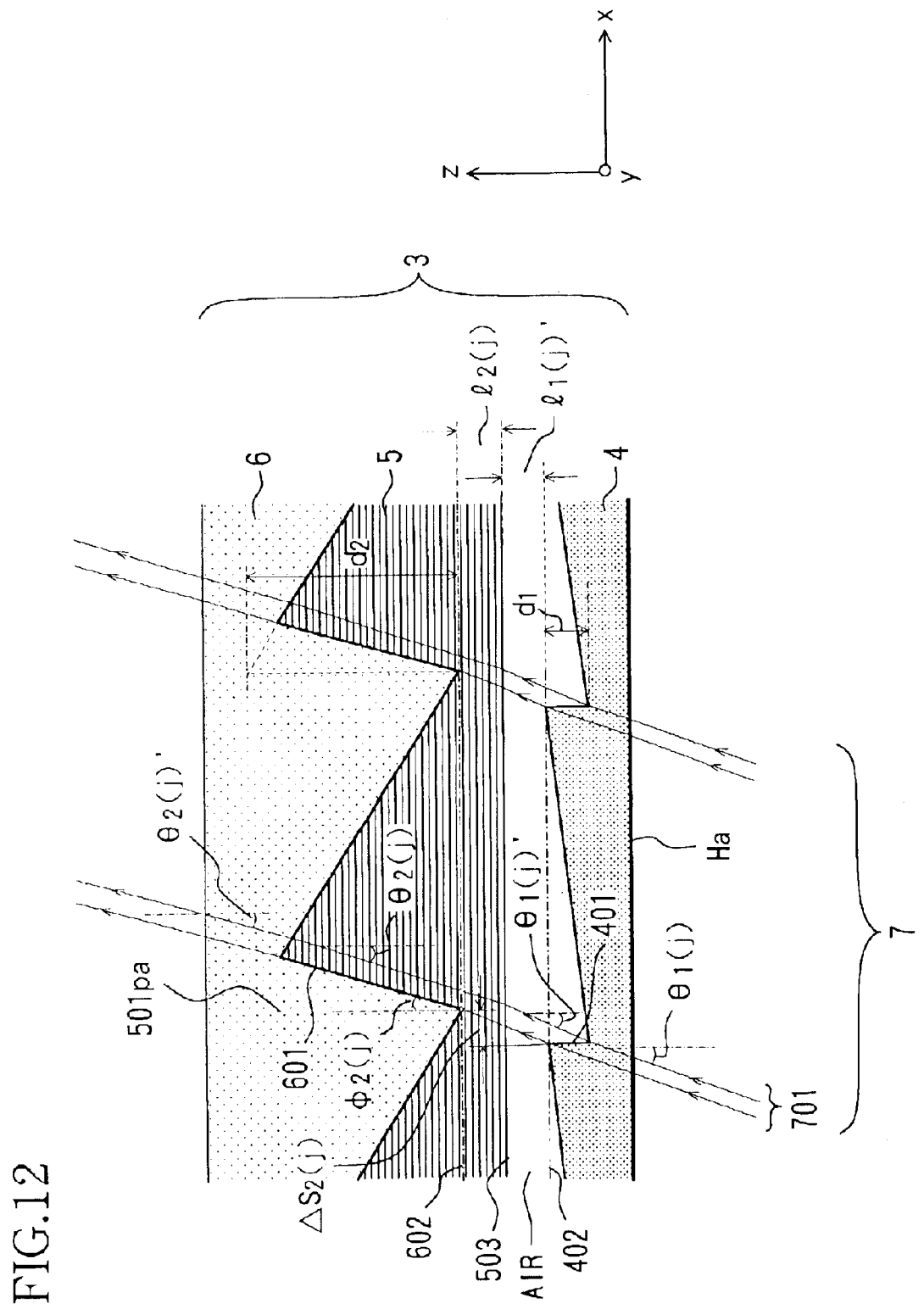
FIG. 12 is a descriptive view of the eclipse of rays in the diffractive optical element according to Embodiment 4.

FIG. 12 is an explanatory view showing a state of eclipse of rays when the rays (specified rays) are made incident into the diffractive optical element 1 according to Embodiment 4. By changing the inclination angles of the grating side surfaces and the shift amounts of the edges at the first layer and second layer diffraction gratings so that the eclipse of the rays is suppressed, the ratio of the eclipsed light flux 701 of the light flux (specified rays) 7 incident into the grating portions of one period is remarkably reduced.

In the present embodiment, the incident angle $\theta_1(j)$ of the specified ray is set to 10°, the grating thickness $d_1$ of the first layer diffraction grating 4 is set to 3.54 $\mu$m, the grating thickness $d_2$ of the second layer diffraction grating 5 and the third layer diffraction grating 6 is set to −19.50 $\mu$m, an interval $l_1(j)'$ from the surface 402 to a boundary surface 503 at the incident side of the second layer diffraction grating 5 is set to 1.5 $\mu$m, an interval $l_2(j)$ from the same surface 503 to the surface 602 is set to 1.5 $\mu$m, and a grating pitch of the respective diffraction gratins is set to 80 $\mu$m, the incident angle $\phi_1(j)$ of the first layer grating side surface 401 is set to 0°, and the incident angle $\phi_2(j)$ of the second layer and third layer grating side surface 601 is set to 11.2°, and the shift amount $\Delta S_2(j)$ of the edges is set to 0.79 $\mu$m. Thereby, the ratio of the eclipsed light flux 701 of the light flux 7 incident into the grating portion of one period becomes approx. 0.78%.

Thus, the ratio of the eclipsed light flux can be lowered to approx. less than one-eighth in comparison with the structure shown in FIG. 31.

When such a diffractive optical element 1 according to the present embodiment is used for a part of an optical system, a great effect for suppressing occurrence of harmful light such as flare and ghost light, etc., can be obtained. However, the ratio of eclipsed light flux shown herein is a ratio of the diffraction grating in the cross direction merely in view of the cross-sectional shape thereof.

In the present embodiment, the angle $\phi_2(j)$ is determined to be 11.2° on the basis of the emergent angle $\theta_2(j)'$ of the specified ray from the diffraction grating 5. However, it may be determined on the basis of the incident angle $\theta_2(j)$ of the specified ray into the grating portion. Also, it is not necessary to make the angle of the grating side surface strictly coincident with the incident angle or the emergent angle of the specified ray. The angle may be optionally determined between 0.2 times and 2.0 times of the incident angle or the emergent angle so that it satisfies at least one of the above-described conditional expressions (1) through (4).

Further, the shift amounts $\Delta S_2(j)$ are determined to be 0.79 $\mu$m from the sum of a value obtained by multiplying 1.5 $\mu$m by tan 18.3° and a value obtained by multiplying 1.5 $\mu$m by tan 11.3° on the basis of the intervals $l_1(j)'$, $l_2(j)$, the value of 18.3° of the emergent angle $\theta_1(j)'$ of the specified ray from the diffraction grating 4, and value of 11.3° of the incident angle $\theta_2(j)$ into the diffraction grating 5. However, it is not necessary to make the shift amount $\Delta S_2(j)$ strictly coincident with the value thus obtained, wherein it may be optionally set between 0.1 and 1.5 times of the value of $l_1(j)' \times \tan \theta_1(j)'$.

In detail, the position of the edge of the j-th grating portion counting from the center La at the diffraction grating of the i-th layer counting from the incident side and the position of the edge of the j-th grating portion counting from the center La at the diffraction grating adjacent thereto are shifted in the arranging direction of the grating portions so that the eclipse of the specified rays is reduced, and the shift amount $\Delta S_{i+1}(j)$ may be changed so as to satisfy the following expression:

$$\Delta S_{i+1}(j) = C_2 \cdot [l_i(j)' \tan \theta_i(j)' + l_{i+1}(j) \tan \theta_{i+1}(j)]$$

where $C_2$ is an optional real number between 0.1 or more and 1.5 or less ($0.1 \leq C_2 \leq 1.5$); $l_i(j)'$ is an interval at the j-th grating portion position from a surface connecting edge lines of the grating portion of an i-th layer diffraction grating to a boundary surface at the incident side of a (i+1)th layer diffraction grating; $\theta_i(j)'$ is an emergent angle of a specified ray from the j-th grating portion of the i-th layer diffraction grating; $l_{i+1}(j)$ is an interval at the j-th grating portion position from the boundary surface at the incident side of the (i+1)th layer diffraction grating to a surface connecting edge lines of the grating portion of the (i+1)the layer diffraction grating; $\theta_{i+1}(j)$ is an incident angle of a specified ray into the j-th grating portion of the (i+1)th layer diffraction grating.

In the present embodiment, a case where the inclination angles of the grating side surfaces of the diffraction gratings disposed as the second layer and third layer counting from the incident side are changed in a lamination type diffractive optical element composed of three layers is shown. Further, the inclination angle of the grating side surface of the first layer diffraction grating may be changed. However, when the inclination angle of the grating side surface in changed in only at least one layer, a considerable effect can be obtained.

Also, as shown in FIG. 10, in Embodiment 4, a case where the diffraction grating is concentrically provided is shown. However, similar effects can be brought about in a case where the diffraction grating is linearly provided.

(Embodiment 5)

Figure 13:
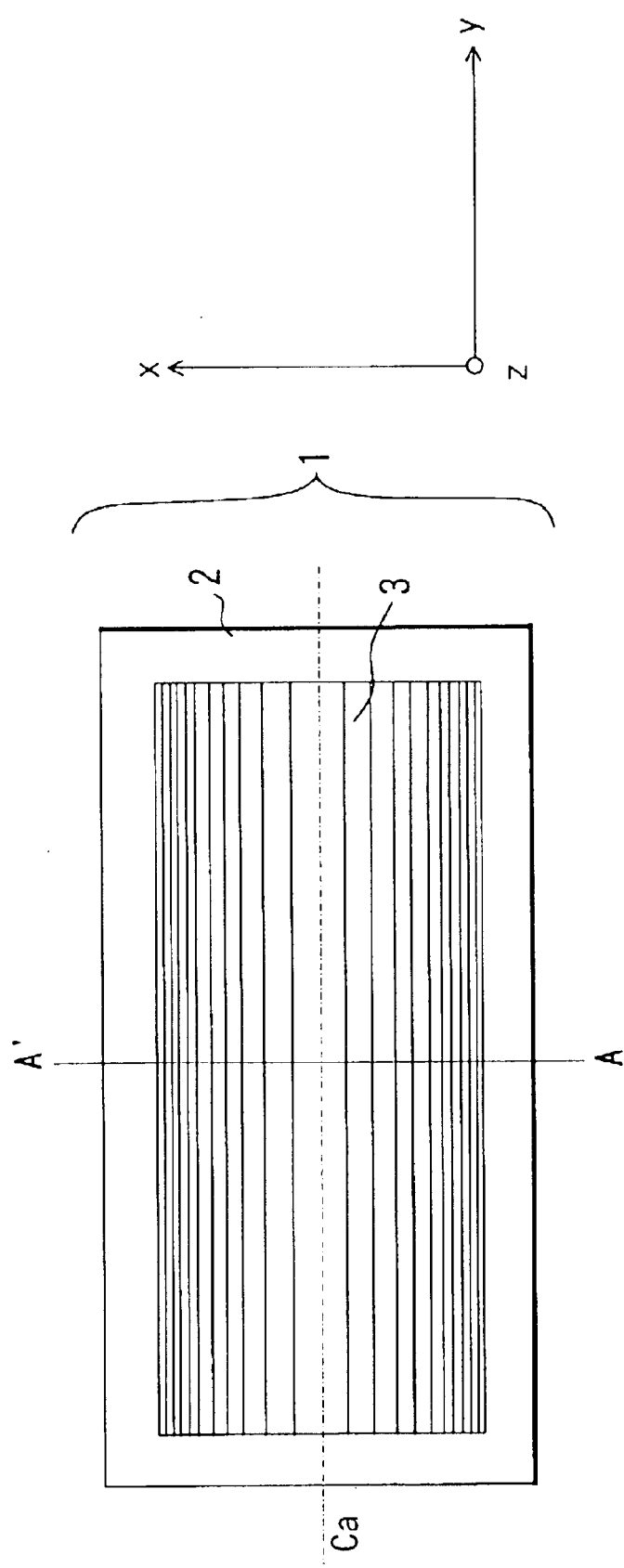
FIG. 13 is a front elevational view of a diffractive optical element according to Embodiment 5.
Figure 14:
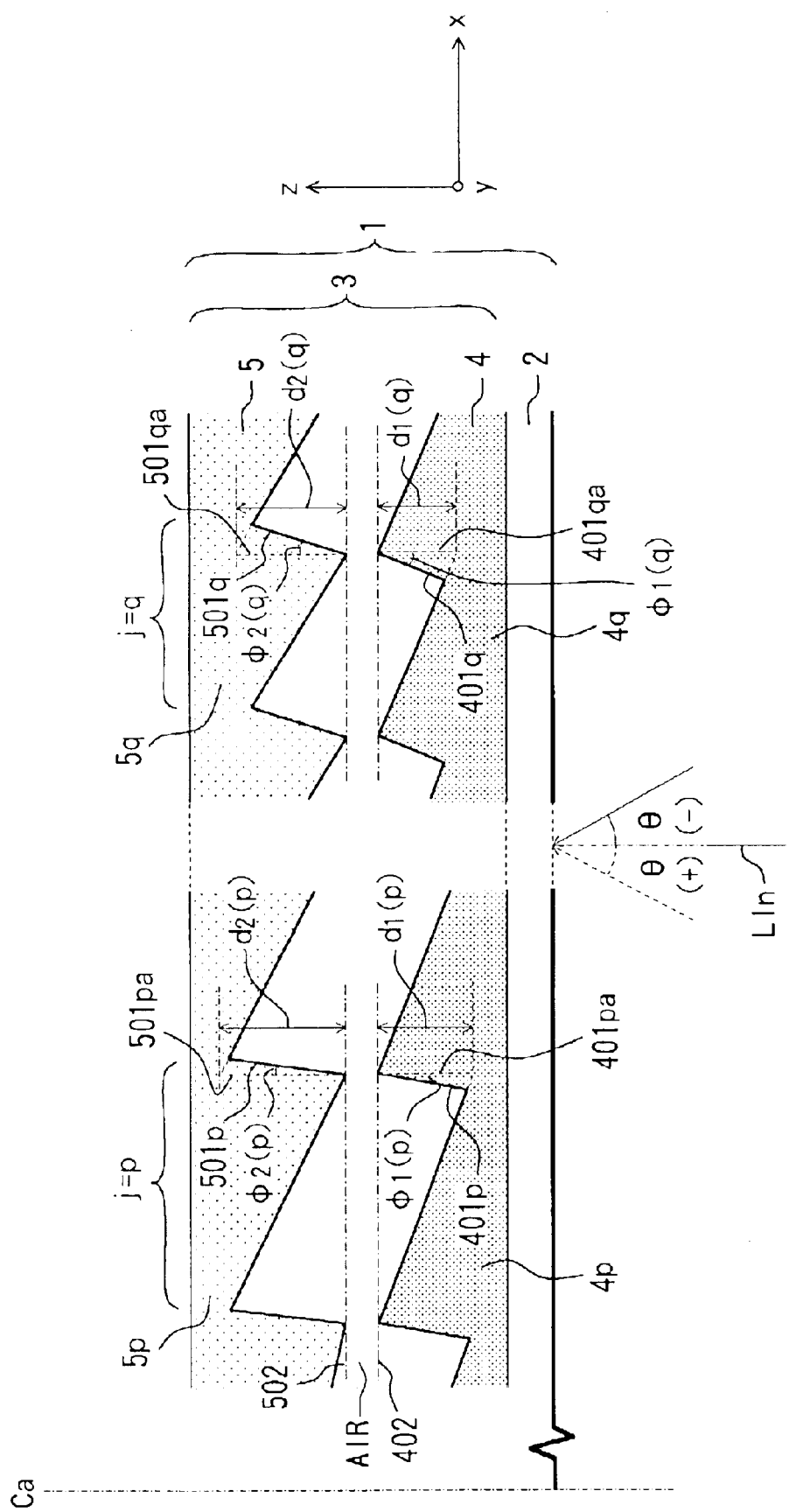
FIG. 14 is a cross-sectional view of the major parts of the diffractive optical element according to Embodiment 5.

FIG. 13 is a front elevational view of Embodiment 5 of a diffractive optical element according to the present invention. FIG. 14 shows a part of a cross-sectional shape of the diffractive optical element 1 in FIG. 13, which is taken along the line A–A' in the drawing. For easier understanding, the diffractive optical element is enlarged and deformed in the thickness direction of diffractive gratings (that is, the z direction) in FIG. 14.

In these drawings, the diffractive optical element 1 is composed so that a diffraction portion 3 having a plurality of diffraction gratings respectively made of different materials laminated is disposed on the surface of a substrate 2. The diffraction portion 3 is formed so that a diffraction grating 4 and a diffraction grating 5, each of which is a one-dimensional grating (linear grating) elongating in the y direction, are laminated with an air layer therebetween. The diffraction gratings 4 and 5 have grating periods which gradually become shorter toward the periphery along the x direction from the center (center axis) Ca.

The diffraction portion 3 is composed by laminating the diffraction gratings 4 and 5 on the substrate (transparent substrate) 2 with an air layer AIR, not being an optical material, therebetween. The diffraction grating 4 which is the first layer counting from the light incident side LIn is formed of the first ultraviolet ray hardening resin (whose refractive index is $n_d$=1.636 and Abbe number $v_d$ is 22.8), which is one of the energy-hardening materials, and the diffraction grating 5 which is the second layer is formed of the second ultraviolet ray hardening resin (whose refractive index is $n_d$=1.513 and Abbe number $v_d$ is 51.0).

The diffraction grating 4 is formed of a serrated shape in which the grating thickness of the grating portion is decreased from the center to the periphery at one period, and the diffraction grating 5 is also formed of a serrated shape in which the grating thickness of the grating portion is increased from the center toward the periphery at one period, wherein the diffraction gratings 4 and 5 are set to be shaped so as to increase the diffraction efficiency of a diffractive light having a specified order.

Here, the most characteristic feature of the diffractive optical element according to the present embodiment resides in that the grating thickness of respective grating portions and inclination of the grading side surface thereof comprising a diffraction grating are different from each other, depending on the position in an effective surface in accordance with the incidence angle or emergent angle of a specified ray of light described later (that is, having a region where the inclinations of the grating side surfaces are different).

In detail, as shown in FIG. 14, in the diffraction grading 4, the grating thickness $d_1(p)$ of the p-th grating portion 4p from the center axis Ca and the grating thickness $d_1(q)$ of the q-th grating portion 4q therefrom are different from each other in accordance with the incident angle or emergent angle of the specified ray. An angle $\phi_1(p)$ is formed by the normal line 401pa of a surface 402 (corresponding to the emergent surface of the diffraction grating 4) which connects edge lines at the emergent sides of the respective grating portions of the diffraction grating 4 and the grating side surface 401p at the peripheral side (right side in the drawing) of the p-th grating portion 4p counting from the center axis Ca. Further, an angle $\phi_1(q)$ is formed by the normal line 401qa of the same surface 402 and the grating side surface 401q at the peripheral side of the q-th grating portion 4q. And the angle $\phi_1(p)$ and the angle $\phi_1(q)$ are different from each other in accordance with the incident angle or emergent angle of the specified ray. Both the grating thickness and inclination of the grating side surfaces change in the direction in which grating portions are arranged (that is, the periodic direction of gratings, the x direction in the drawing).

Similarly, in the diffraction grading 5, the grating thickness $d_2(p)$ of the p-th grating portion 5p from the center axis Ca and the grating thickness $d_2(q)$ of the q-th grating portion 5q therefrom are different from each other in accordance with the incident angle or emergent angle of the specified ray. An angle $\phi_2$ (p) is formed by the normal line 501pa of a surface 502 (corresponding to the incident surface of the diffraction grating 5) which connects edge lines at the incident side of respective grating portions in the diffraction grating 5 and the p-th grating side surface 501p at the peripheral side. Further, an angle $\phi_2(q)$ is formed by the normal line 501qa of the same surface 502 and the grating side surface 501q at the peripheral side of the q-th grating portion 5q. And, the angle $\phi_2(p)$ and the angle $\phi_2(q)$ are different from each other in accordance with the incident angle or emergent angle of the specified ray. Both the grating thickness and inclination of the grating side surfaces change in the direction in which grating portions are arranged. The change in the inclination angle of the grating side surfaces sequentially increases or decreases while being distant from the center axis Ca. The grating thickness of the grating portions changes so that it sequentially increases or decreases while being distant from the center axis Ca.

That is, as in achromatism in a common refraction type optical system, by composing a diffractive optical element of a plurality of diffraction gratings in which materials having different dispersion are combined, the wavelength dependence of diffraction efficiency can be lowered, and a high diffraction efficiency can be obtained over the entire use wavelength region. At the same time, taking into consideration the incident and emergent angle distribution of the entire effective ray passing through respective positions of the grating portions, the grating thickness of the grating portions and inclination of the grating side surfaces are changed so that an eclipse of rays at the respective grating portions decreases, whereby occurrence of harmful light such as flare and ghost light, etc., which are unnecessary for picking up and observing of an image, is suppressed over the entire field angle.

Figure 25:
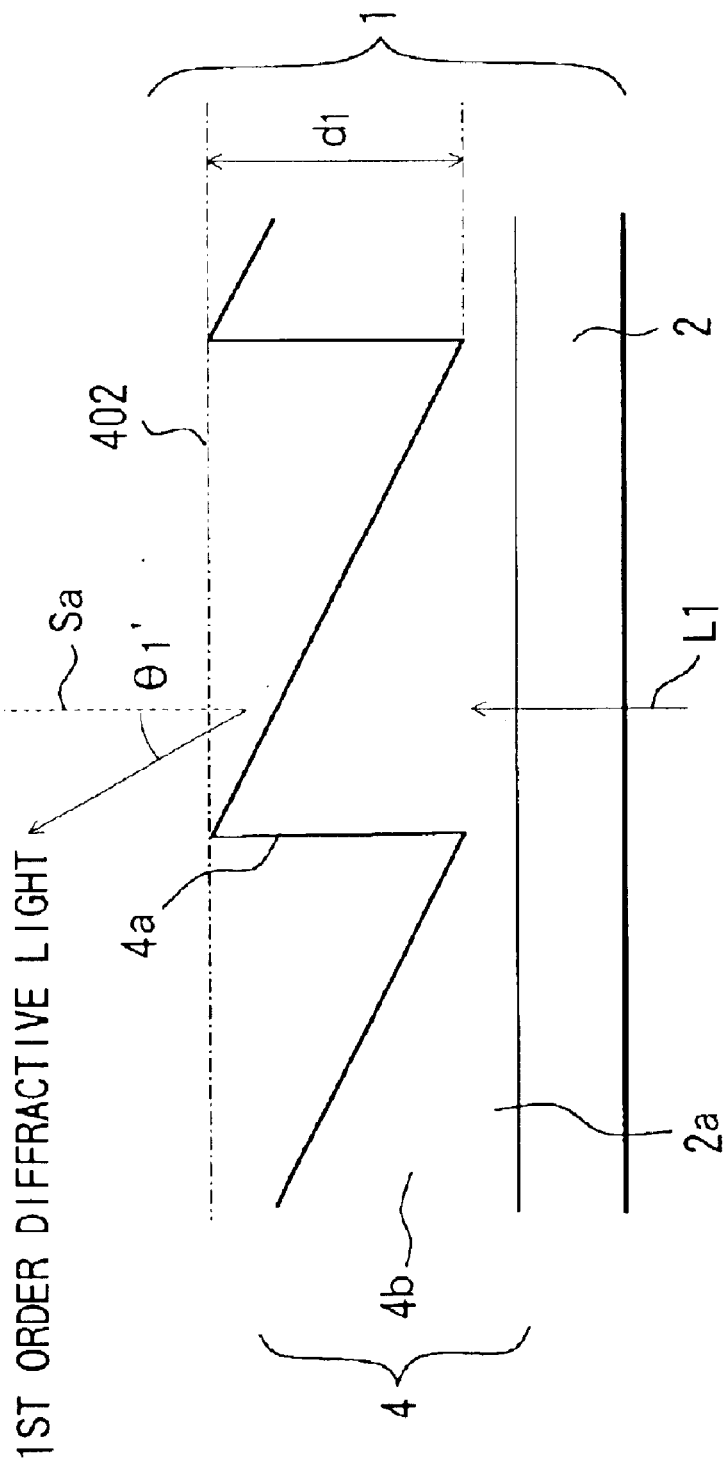
FIG. 25 is a sectional view of a diffractive optical element (one layer) in order to describe the incident angle dependence of diffraction efficiency.

Next, a description is given of incident angle dependence of the diffraction efficiency to determine the optimal grating thickness of the grating portions of the diffraction gratings 4 and 5. FIG. 25 is a cross-sectional view of the major parts of the diffractive optical element composed of a single layer diffraction grating.

In the diffractive optical element 1 composed of the single layer diffraction grating 4 as shown in FIG. 25, the condition that the diffraction efficiency is maximized at design wavelength $\lambda_0$ is in that, at the grading side surface 4a of the diffraction grating 4, a difference in the optical path length may become integral (design order) multiplication of the design wavelength $\lambda_0$. Commonly, it is expressed by $$(n_1-n_1')d_1=m\lambda_0 \tag{6}$$

Herein, $n_1$ and $n_1'$ are refractive indices of media at the incident side (light incident side) and emergent side (light emergent side) at the wavelength $\lambda_0$. $d_1$ is the grating thickness of the grating portion 4b, and m is the design diffraction order.

However, strictly, the expression (6) is set only when both the incident angle and emergent angle of an incident ray are 0° or where there is no problem if these can be approximated to 0°. That is, where the emergent angle of the ray appears at an angle that cannot be approximated to 0°, it becomes difficult to obtain a high diffraction efficiency at the grating thickness $d_1$ determined so as to satisfy expression (6), and it becomes necessary to use an expression in which the emergent angle is taken into consideration.

The conditional expression that maximizes the diffraction efficiency with the emergent angle taken into consideration becomes:

$$(n_1-n_1' \cos \theta_1')d_1=m\lambda_0 \tag{7}$$

Herein, $\theta_1'$ is an emergent angle after a ray incident at an angle 0° is bent by an optical action on the diffractive surface. However, the emergent angle $\theta_1'$ is an angle with respect to the normal line Sa of the surface 402 where the grating portions are provided, and it is not an angle with respect to the grating surface such as a blaze profile observed microscopically. This is the same with respect to the incident angle and emergent angle described later.

Also, taking into consideration cases where a diffractive optical element is used as one of the optical components included in an optical system such as a common image-pickup optical system and observation optical system, rays are not always made incident into diffraction gratings at all positions at the incident angle that is zero or can be approximated to zero.

The conditional expression that maximizes the diffraction efficiency with respect to a ray having a wavelength $\lambda_0$, which is made incident into a diffraction grating at an incident angle $\theta_1$ becomes:

$$(n_1 \cos \theta_1 - n_1' \cos \theta_1')d_1 = m\lambda_0 \quad (8)$$

In a lamination type diffractive optical element in which a plurality (two or more) of diffraction gratings are laminated as shown FIG. 14, the method of thought is the same as in the condition that maximizes the diffraction efficiency with the incident angle and emergent angle of a ray taken into consideration. That is, where the design diffraction order is the m-th order by an N-layer laminated diffraction gratings, the conditional expression that maximizes the diffraction efficiency becomes:

$$\sum_{i=1}^{N} (n_i \cos\theta_i - n_i' \cos\theta_i') \, d_i = m\lambda_0 \quad (9)$$

where $n_i$ and $n_i'$ are, respectively, the refractive index of a material at the incident side with respect to light of wavelength $\lambda_0$ at an i-th layer diffraction grating counting from the incident side and the refractive index of a material at the emergent side with respect to the same. $d_1$ is the thickness (grating thickness) of a grating portion measured along the normal line of a surface where the i-th layer diffraction grating is provided.

Herein, the refractive index $n_i$ of a material at the incident side and the refractive index $n_i'$ of a material at the emergent side are defined as follows in a case where a diffraction optical element includes two diffraction gratings laminated with no air layer therebetween as described Embodiment 3 (FIG. 8) and Embodiment 4 (FIG. 11). In other words, with respect to the diffraction grating at the incident side among the diffraction gratings with no air layer therebetween, the refractive index $n_i$ is the refractive index of a material thereof and the refractive index $n_i'$ of a non-existent layer is 1. With respect to the diffraction grating at the emergent side, the refractive index $n_i$ of a non-existent layer is 1 and the refractive index $n_i'$ is the refractive index of a material therof.

Further, the thicknesses of both diffraction gratings are equal to each other, and the emergent angle of rays from the diffraction grating at the incident side and the incident angle of rays from the diffraction grating at the emergent side are equal to each other. For example, when the abovementioned definition is applied to the diffraction optical element in Embodiment 3 (FIG. 8), the following is obtained.

N=3;

$n_1$ is the refractive index of the material of the diffraction grating 4;

$n_1'=1$ (the refractive index of the air layer);

$n_2$ is the refractive index of the medium of the diffraction grating 5;

$n_2'=1$ (the refractive index of a non-existent layer);

$n_3=1$ (the refractive index of a non-existent layer);

$n_3'$ is the refractive index of the medium of the diffraction grating 6;

$d_2=d_3$, and $\theta_2'=\theta_3$

By these settings, since, in the expression (9), the items ($n_2' \cos \theta_2' \cdot d_2$ and $n_3 \cos \theta_3 \cdot d_3$) of the non-existent layers at the boundaries of the second layer diffraction grating and the third layer diffraction grating, having the refractive index 1, the expression (9) can be used for a diffraction optical element including two diffraction gratings with no air layer therebetween without any contradiction.

And, in the present embodiment, taking into consideration the incident angle distribution of rays of design wavelength $\lambda_0$ incident into the j-th grating portion counting from the center axis Ca in the i-th later diffraction grating, the diffraction grating is formed by calculating the optimal grating thickness on the basis of expression (9) from incident angle of specified ray whose incident angle is the average value, gravity value, maximum value or minimum value thereof.

For a description of optical effects obtained by changing the grating thickness of the grating portion with reference to detailed numeral values, a case shown in FIG. 14 is taken for instance.

Where, in the grating portion in which the incident angle of incident specified rays is 0°, the design wavelength $\lambda_0$ is 587.56 nm, and the design diffraction order is the positive first order, the grating thickness at which the maximum diffraction efficiency is obtained is −7.90 $\mu$m for the grating thickness of the grating portion of the first layer diffraction grating 4, and −10.93 $\mu$m for the grating thickness of the grating portion of the second layer diffraction grating 5, as one combination, on the basis of an expression where the incident angle and emergent angle of rays are not taken into consideration, that is, an expression in which the incident angle $\theta_1$ and emergent angle $\theta_1'$ are 0° in expression (9).

Table 1 shows diffraction efficiencies of the diffraction light of the 1st order, 0th order and 2nd order, which are the design orders with respect to rays, whose wavelength is 587.56 nm, incident into a diffraction grating at a grating pitch 80 $\mu$m at incident angles −20°, −15°, −10°, −5°, 0°, 5°, 10°, 15°, and 20°. Herein, with respect to the incident angles, the incident angles of incident rays from the downward left side on the paper surface of FIG. 14 are made into positive incident angles, and the incident angles of incident rays from the downward right side are made into negative incident angles.

In the present embodiment, the diffraction optical element is set so that energy is concentrated on the −1st order diffraction light. In FIG. 14, the −1st order diffraction light of incident light perpendicular to the diffraction optical element emerges in the direction of the center axis Ca. In other words, the sign of the incident angle is defined as positive in a case where the design order diffraction light incident perpendicular to the diffraction optical element is made incident thereto on the same side from which the light emerges, and as negative in a case where the design order diffraction light is made incident thereto on the opposite side.

TABLE 1

| Incident angle | Grating thickness (μm) | | Diffraction efficiency η (λ₀) (%) | | |
|---|---|---|---|---|---|
| (°) | $d_1$ | $d_2$ | 1st order | 0th order | 2nd order |
| −20 | −7.90 | −10.93 | 28.8864 | 3.8553 | 53.1422 |
| −15 | | | 67.9974 | 4.2963 | 17.3741 |
| −10 | | | 90.0218 | 2.0517 | 4.2103 |
| −5 | | | 98.4030 | 0.4200 | 0.5557 |
| 0 | | | 99.9955 | 0.0014 | 0.0014 |
| 5 | | | 99.1393 | 0.2891 | 0.2355 |
| 10 | | | 98.0781 | 0.6774 | 0.4980 |
| 15 | | | 97.8538 | 0.7626 | 0.5509 |
| 20 | | | 98.7311 | 0.4353 | 0.3392 |

The diffraction efficiency $\eta(\lambda_o)$ shown herein is a value calculated by the following expression:

$$\eta(\lambda_0) = \sin c^2[\pi[m - \phi(\lambda_0)/\lambda_0]] \quad (10)$$

where m is a desired diffraction order for calculating the diffraction efficiency, and $\phi(\lambda_0)$ is:

$$\phi(\lambda_0) = \sum_{i=1}^{N} (n_i \cos\theta_i - n_i' \cos\theta_i') d_i \quad (11)$$

in the present embodiment, $$\phi(\lambda_0) = (n_1 \cos\theta_1 - n_1' \cos\theta_1')d_1 + (n_2 \cos\theta_2 - n_2' \cos\theta_2')d_2 \quad (12)$$

Also, as has been made clear from the expression, the diffraction efficiency shown herein is that in which light reflection generated on respective boundary surfaces and eclipse due to the grating side surfaces are not taken into consideration.

Based on Table 1, it is understood that, with respect to the diffraction grating composed of a single grating thickness, the diffraction efficiency of the 1st order diffractive light, which is the design order, decreases in accordance with an increase in the absolute value of the incident angle, and the diffraction efficiency of 0th and 2nd order diffractive light, which are different from the design order, increases in accordance therewith. Since diffractive light other than these design orders becomes harmful light, it is recommended that these order diffractive light is decreased.

In the present embodiment in the above-described structure, the grating thickness of the grating portions is respectively changed according to positions in the xy plane so as to obtain the maximum diffraction efficiency in accordance with the incident angle of incident light, so that expression (9) is satisfied. The diffraction efficiencies in this case are shown in Table 2.

TABLE 2

| Incident angle | Grating thickness (μm) | | Diffraction efficiency η (λ₀) (%) | | |
|---|---|---|---|---|---|
| (°) | $d_1$ | $d_2$ | 1st order | 0th order | 2nd order |
| −20 | −6.68 | −8.99 | 99.9852 | 0.0046 | 0.0044 |
| −15 | −7.13 | −9.69 | 99.9983 | 0.0005 | 0.0005 |
| −10 | −7.49 | −10.24 | 99.9724 | 0.0085 | 0.0082 |
| −5 | −7.74 | −10.65 | 99.9847 | 0.0047 | 0.0046 |
| 0 | −7.9 | −10.93 | 99.9955 | 0.0014 | 0.0014 |
| 5 | −7.96 | −11.06 | 99.9942 | 0.0018 | 0.0017 |
| 10 | −7.93 | −11.05 | 99.9824 | 0.0054 | 0.0053 |

TABLE 2-continued

| Incident angle | Grating thickness (μm) | | Diffraction efficiency η (λ₀) (%) | | |
|---|---|---|---|---|---|
| (°) | $d_1$ | $d_2$ | 1st order | 0th order | 2nd order |
| 15 | −7.78 | −10.87 | 99.9971 | 0.0009 | 0.0009 |
| 20 | −7.53 | −10.53 | 99.9999 | 0.0000 | 0.0000 |

The grating thickness of the respective grating portions is one example of values obtained by varying the grating thickness according to position in the xy plane so as to satisfy expression (9).

As has been made clear from Table 2, a remarkably high diffraction efficiency can be obtained with respect to a wide range of incident angles by applying an appropriate grating thickness in accordance with the incident angle, wherein it is understood that the diffraction efficiency can be clearly improved in the case of Table 2 in comparison with Table 1 that relates to a case where the grating thickness of grating portions is optimized when the incident angle and emergent angle are 0° as in the prior art example.

Where a diffractive optical element is used for an actual optical system, it is common that a rays having a certain incident angle distribution is made incident into a diffraction grating which is located at an optional position from the optical axis center. In such a case, taking the incident angle distribution into consideration, a grating thickness, which is optimized with respect to rays having the incident angle of the average value, gravity value or maximum value of the absolute value, etc., obtained from the incident angle distribution of all the rays passing through the diffraction grating, and aperture center rays in use of the diffractive optical element in an optical system may be applied so that a high diffraction efficiency can be obtained in the entire field angle.

Also, as has been understood in Table 1, a lowering in the diffraction efficiency in a lamination type diffractive optical element of a blaze profile as shown in FIG. 14 is further remarkable in the case where the incident angle moves to the negative side than in the case where the incident angle moves to the positive side. Judging therefrom, optimization of the grating thickness of the grating portion is not merely carried out for the incident angle of a ray having an average value obtained from the incident angle distribution and of an aperture center ray in use of a diffractive optical element in an optical system, but it is preferable that the optimization thereof is carried out for a ray whose incident angle is at a slightly negative side.

In the present embodiment, a considerable effect can be brought about only by changing the grating thickness of the grating portions in one of two layers of the diffraction gratings 4 and 5.

Next, a description is given of inclination angles of the grating side surfaces 401p and 401q (501p and 501q) of the diffraction gratings.

Figure 15:
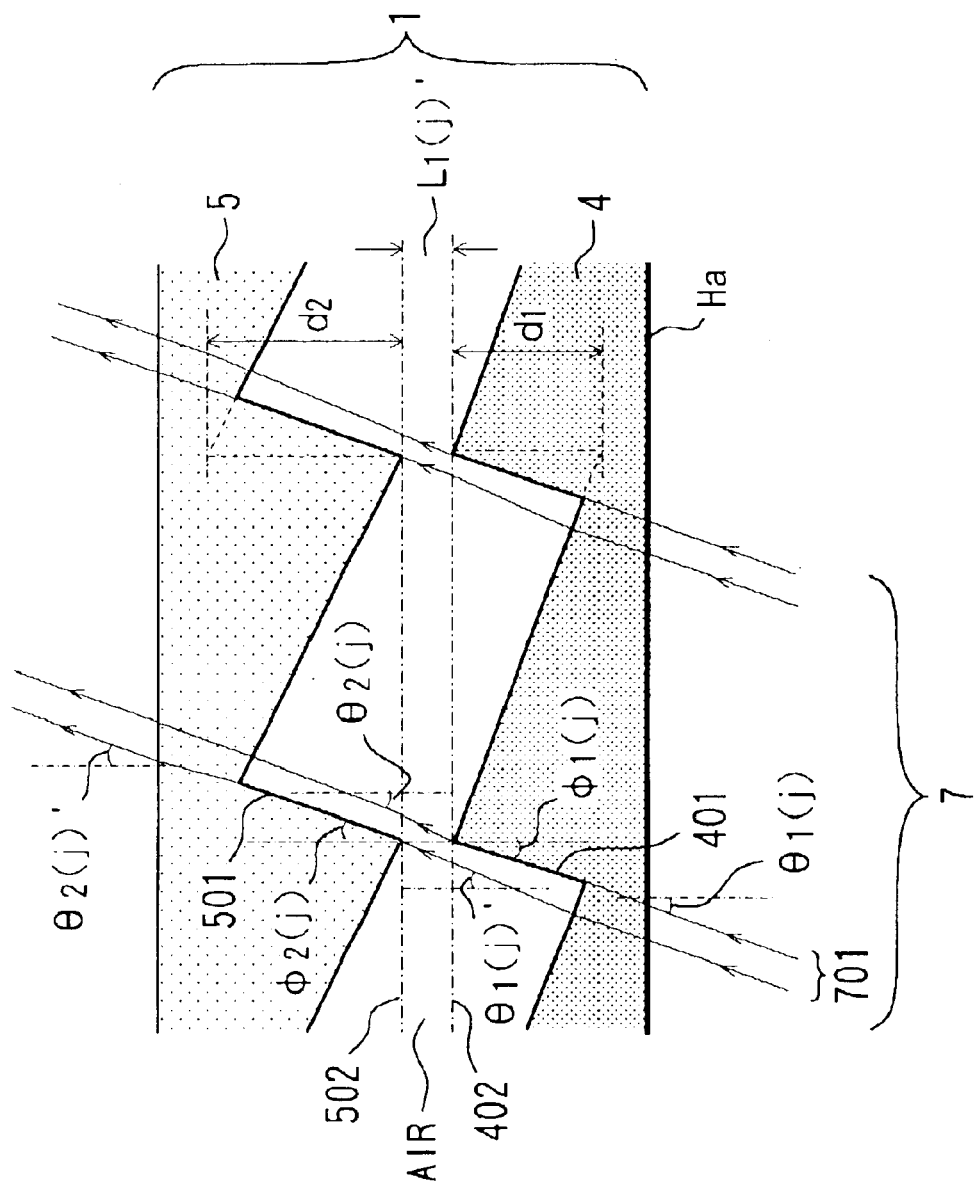
FIG. 15 is a descriptive view of the eclipse of rays in the diffractive optical element according to Embodiment 5.

FIG. 15 is a view describing a state of eclipse of rays when the rays (specified rays) are made incident into the diffractive optical element 1 according to Embodiment 5.

If the inclination angle $\phi_i(j)$ of the side surface of the respective grating portions of the diffraction gratings 4 and 5 is changed in the surface (xy plane) so that the eclipse of the rays is decreased, the ratio of the eclipsed light flux 701 of the light flux 7 incident into the grating portion of one period is reduced.

In the present embodiment, the incident angle $\theta_i(j)$ with respect to an incident surface Ha of a diffractive optical element 1 of the light flux (specified rays) 701 is set to 10°, the grating thickness $d_1$ of the first layer diffraction grating 4 is set to −7.93 μm, the grating thickness $d_2$ of the second layer diffraction grating 5 is set to −11.05 μm, an interval $L_1(j)'$ from the surface 402 to the surface 502 is set to 1.5 μm, a grating pitch of the respective diffraction gratings is set to 80 μm, the angle $\phi_1(j)$ of the grating side surface 401 with respect to the normal line of the surface 402 is set to 10°, and the angle $\phi_2(j)$ of the grating side surface 501 with respect to the normal line of the surface 502 is set to 12.8°. Thereby, the ratio of the eclipsed light flux 701 of the light flux 7 incident into the grating portion of one period of the diffraction portion 3 becomes approx. 0.9%. In comparison with the structure of the comparative example shown in FIG. 30, the eclipse ratio of the eclipsed rays is reduced to approx. one-sixth.

If such a diffractive optical element 1 according to the present embodiment is used in a part of an optical system, a great effect for suppressing occurrence of harmful light which becomes a factor of flare and ghost, etc., can be obtained.

Herein, although the angle $\phi_1(j)$ of the grating side surface 401 and the angle $\phi_2(j)$ of the grating side surface 501 are, respectively, determined to be 10° and 12.8° on the basis of the incident angles $\theta_1(j)$ and $\theta_2(j)$ of the specified ray incident into the diffraction gratings 4 and 5, either one or both may be determined on the basis of $\theta_1(j)'$ and $\theta_2(j)'$ of the specified ray from the respective gratings. Also, when the angle of the grating side surface is set to an optional angle from 0.2 times and 2.0 times the incident angle or the emergent angle of the specified ray, so that at least one of the above-described conditional expressions (1) through (4) can be satisfied, without strictly making the angle of the grating side surface coincident with the incident angle or the emergent angle of the specified ray, the same effects as those described above can be obtained.

In the present embodiment, with respect to a lamination type diffractive optical element composed of two layers, a case where the inclinations of the grating side surfaces of both layers change is shown. However, in a case where the inclination changes in only either layer, a considerable effect can be obtained. Also, even in a lamination type diffractive optical element composed of diffraction gratings of more than two layers, in a case where the inclination changes in one or more layers, a considerable effect can be obtained.

Further, in Embodiment 5, as shown in FIG. 13, a case where grating portions that compose respective diffraction gratings are provided to be linear is shown. However, effects which are the same as those in the above can be brought about even in a case where the grating portions are concentrically provided.

(Embodiment 6)

Figure 16:
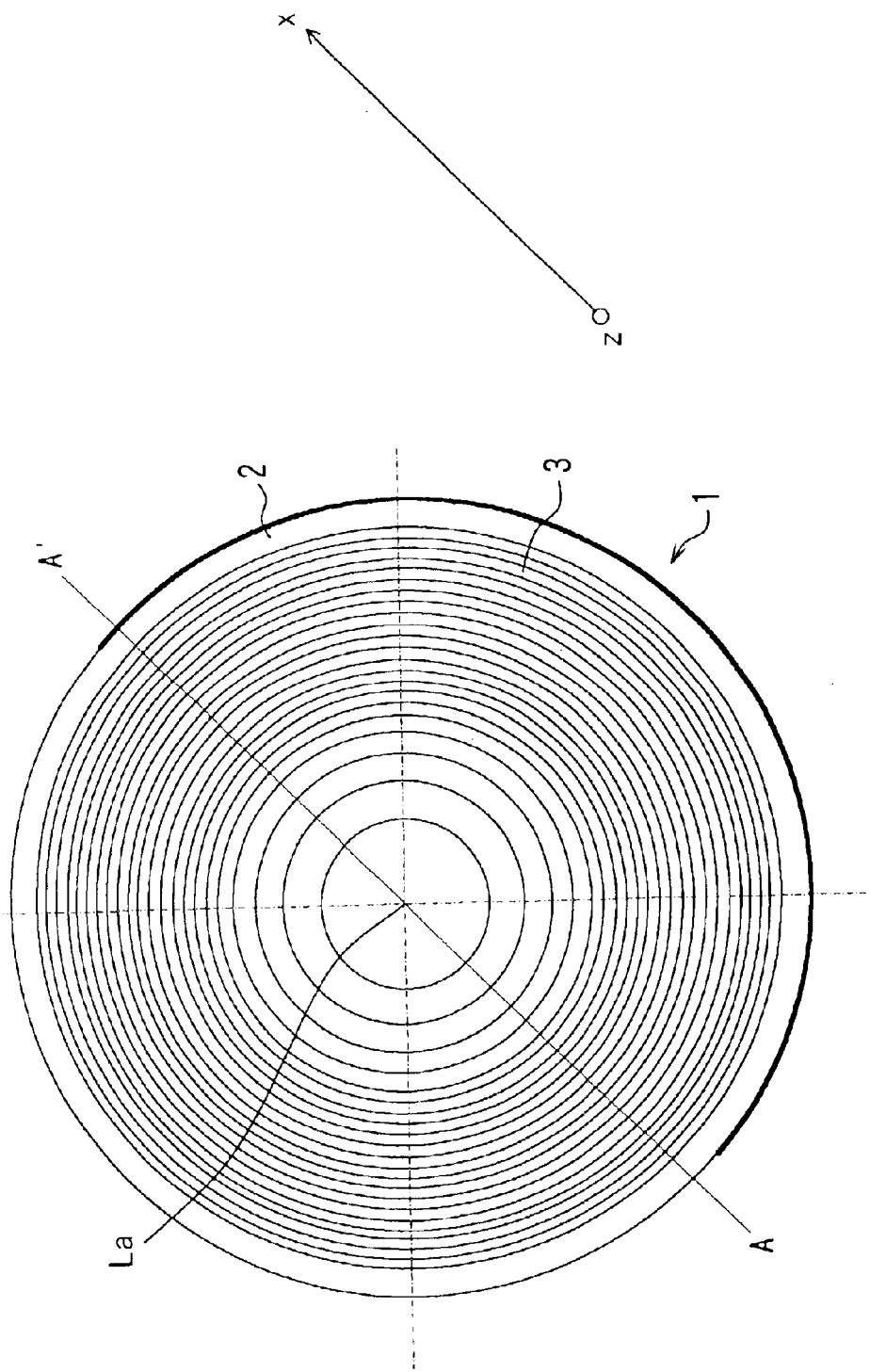
FIG. 16 is a front elevational view of a diffractive optical element according to Embodiment 6.
Figure 17:
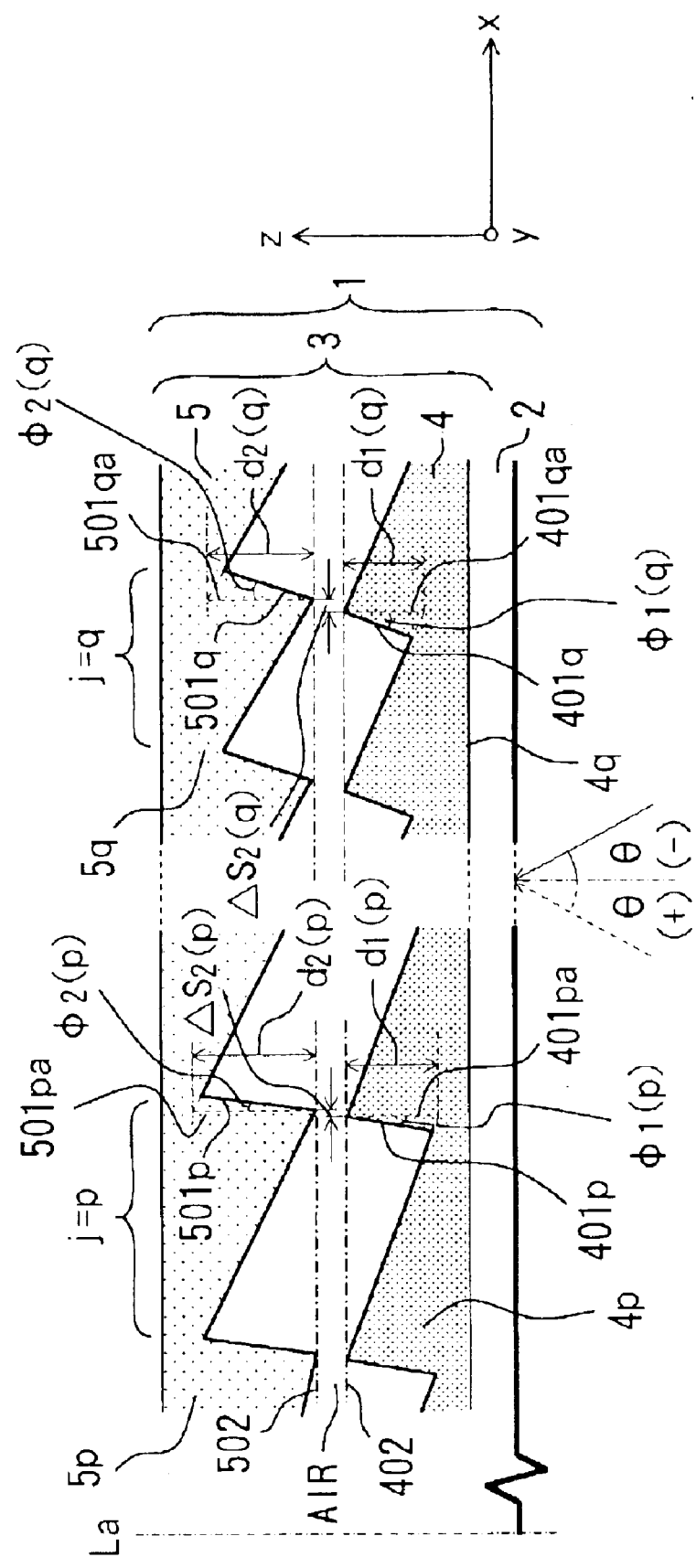
FIG. 17 is a cross-sectional view of the major parts of the diffractive optical element according to Embodiment 6.

FIG. 16 is a front elevational view of a diffractive optical element according to Embodiment 6 of the present invention. FIG. 17 shows a part of a cross-sectional shape of the diffractive optical element 1 according to Embodiment 6, which is taken along the line A–A' in FIG. 16. In these drawings, the diffractive optical element 1 is composed so that a diffraction portion 3 having a plurality of diffraction gratings respectively made of different materials laminated is disposed on the surface of a substrate 2. The diffraction portion 3 is formed so that concentric diffraction gratings 4 and 5 are laminated with an air layer formed therebetween. In the diffraction gratings 4 and 5, the grating periods gradually decrease from the center toward the periphery along the x direction.

The diffraction grating 4 which is the first layer counting from the incident side is formed of the first ultraviolet ray hardening resin (whose refractive index is $n_d$=1.636 and Abbe number $v_d$ is 22.8), which is one of the energy-hardening materials, and the diffraction grating 5 which is the second layer is formed of the second ultraviolet ray hardening resin (whose refractive index is $n_d$=1.513 and Abbe number $v_d$ is 51.0). La refers to the center of the diffractive optical element 1, that is, an optical axis. The diffraction grating 4 is formed of a serrated shape in which the grating thickness of the grating portion is decreased from the center to the periphery at one period, and the diffraction grating 5 is also formed of a serrated shape in which the grating thickness of the grating portion is increased from the center toward the periphery at one period, wherein the diffraction gratings 4 and 5 are set to be shaped so as to increase the diffraction efficiency of a diffractive light having a specified order.

In the present embodiment, as in Embodiment 5, in the diffraction gratings 4, the grating thickness $d_1(p)$ of the p-th grating portion 4p from the center La and the grating thickness $d_1(q)$ of the q-th grating portion 4q therefrom are different from each other in accordance with the incident angle or emergent angle of a specified ray of light. And, the angle $\phi_1(p)$ is formed by the normal line 401pa of a surface 402 which connects edge lines at the emergent sides of the respective grating portions in the diffraction grating 4 and the grating side surface 401p at the peripheral side of the p-th grating portion 4p counting from the optical axis La. Further, an angle $\phi_1(q)$ is formed by the normal line 401qa of the same surface 402 and the grating side surface 401q at the peripheral side of the q-th grating portion 4q. The angle $\phi_1(p)$ and the angle $\phi_1(q)$ are different from each other in accordance with the incident angle or emergent angle of the specified rays. Also, both the grating thickness of the grating portions and inclination of the grating side surfaces sequentially change greatly or slightly while being distant from the optical axis La.

Similarly, in the diffraction grating 5, the grating thickness $d_2(p)$ of the p-th grating portion 5p from the center La and the grating thickness $d_2(q)$ of the q-th grating portion 5q are different from in accordance with the incident angle or emergent angle of the specified rays. And, the angle $\phi_2(p)$ is formed by the normal line 501pa of a surface 502 which connects edge lines at the incident side of respective grating portions in the diffraction grating 5 and the grating side surface 501p at the peripheral side of the p-th grating portion 5p counting from the optical axis La. Further, an angle $\phi_2(q)$ is formed by the normal line 501qa of the same surface 502 and the grating side surface 501q at the peripheral side of the q-th grating portion 5q. The angle $\phi_2(p)$ and the angle $\phi_2(q)$ are different from each other in accordance with the incident angle or emergent angle of the specified ray.

Further characteristics of the present embodiment reside in that the position of edge (edge line) of grating comprising the respective layer diffraction gratings shifts in the x direction in accordance with the incident angle or emergent angle of the specified rays, and changes so that the amount of shift increases or decreases while being distant from the optical axis La. In detail, a shift amount $\Delta S_2(p)$ of the edge at the peripheral side of the p-th grating portion of the first layer and the edge at the peripheral side of the p-th grating portion of the second layer adjacent to the former edge in the x direction, and a shift amount $\Delta S_2(q)$ of the edge at the peripheral side of the q-th grating portion of the first layer and the edge at the peripheral side of the q-th grating portion of the second layer adjacent to the former edge in the x direction are made different from each other in accordance with the incident angle or emergent angle of the specified rays.

Thus, taking into consideration the incident angle and emergent angle distribution of all effective rays passing through respective positions of the grating portion, the inclination angle of the grating side surface and the edge positions are set to be optimal so that the eclipsed rays are reduced at the respective grating portions, wherein occurrence of harmful light which becomes a factor of flare and ghost, etc., is suppressed over the entire field angle.

Figure 18:
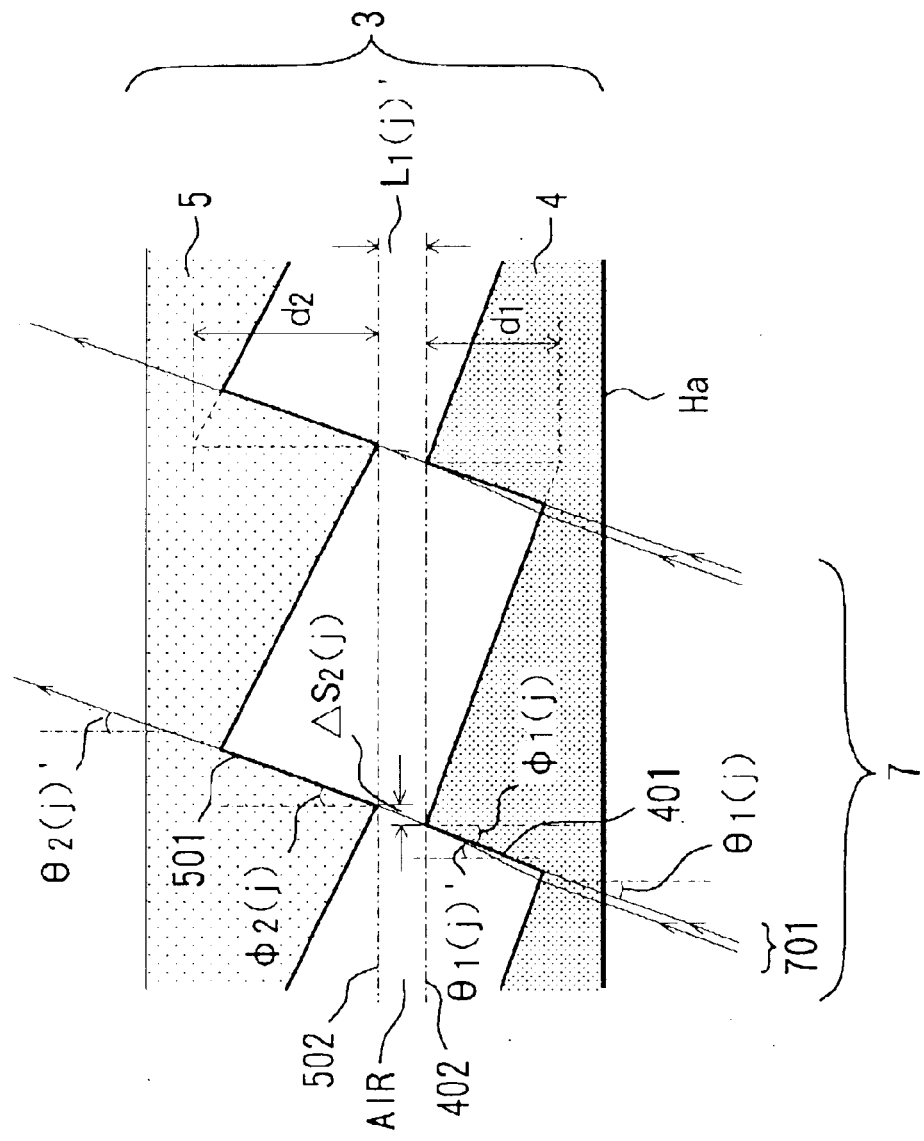
FIG. 18 is a descriptive view of the eclipse of rays in the diffractive optical element according to Embodiment 6.

FIG. 18 is a view describing a state of eclipse of rays when the rays (specified rays) are made incident into a diffractive optical element 1 according to Embodiment 6. By changing at least one of the inclination angle of the grating side surface and the shift amounts of the edges at the grating portions of respective layers so that the eclipse of the rays is decreased, it is possible to remarkably decrease the ratio of the eclipsed light flux (specified rays) 701 of the light flux 7 incident into the grating portion of one period.

In the present embodiment, the incident angle $\theta_1(j)$ of the specified ray is set to 10°, the grating thickness $d_1$ of the first layer diffraction grating 4 is set to −7.93 μm, the grating thickness $d_2$ of the second layer diffraction grating 5 is set to −11.05 μm, an interval $L_1(j)'$ from the surface 402 to the surface 502 is set to 1.5 μm, a grating pitch of the respective diffraction gratings is set to 80 μm, the inclination angle $\phi_1(j)$ of the grating side surface 401 is set to 10°, and the inclination angle $\phi_2(j)$ of the grating side surface 501 is set to 12.8°, and the shift amount $\Delta S_2(j)$ of the edges is 0.34 μm. Thereby, the ratio of the eclipsed light flux 701 of the light flux 7 incident into the grating portion of one period becomes approx. 0.42%. In comparison with the structure of a comparative example shown in FIG. 30, the ratio of the eclipsed rays is lowered to approx. one-twelfth.

If such a diffractive optical element 1 according to the present embodiment is used in a part of an optical system, a great effect for suppressing occurrence of harmful light which becomes a factor of flare and ghost, etc., can be obtained. However, the ratio of the eclipsed light flux shown herein is a ratio in the cross direction where the diffraction grating is considered in view of the cross-sectional shape.

In the present embodiment, although the angles $\phi_1(j)$ and $\phi_2(j)$ are, respectively, determined to be 10° and 12.8° on the basis of the incident angles $\theta_1(j)$ and $\theta_2(j)$ of a specified ray into the diffraction gratings 4 and 5, either one or both may be determined on the basis of the emergent angles $\theta_1(j)'$ and $\theta_2(j)'$ of the specified ray from the respective diffraction gratings.

Also, it is not necessary that the inclination angles of the grating side surfaces 401 and 501 are made strictly coincident with the incident or emergent angle of the specified ray, and the angles of the grating side surfaces may be set to optional angles from 0.2 times to 2.0 times of the incident angle or the emergent angle of the specified ray, so that these satisfy at least one of the above-described conditional expressions (1) through (4).

Further, the shift amounts $\Delta S_2(j)$ of the edges of the grating portions of the respective layers is determined to be 0.34 μm from a value obtained by multiplying the interval 1.5 μm by tan 12.8° on the basis of the interval $L_1(j)'$ and the value of 12.8° of the emergent angle $\theta_1(j)'$ of the specified ray from the diffraction grating 4. However, it is not necessary that the shift amount is made strictly coincident with the value thus obtained. It may be optionally set to a value between 0.1 times and 1.5 times of a value obtained by the following expression:

$$L_1(j)' \times \tan \theta_1(j)$$

so as to satisfy the above-described conditional expression (5).

Also, Embodiment 6 shows a case where a diffraction grating is concentrically provided as shown in FIG. 16. However, similar effects can be brought about even in a case where the diffraction grating is linearly provided.

In FIG. 17 and FIG. 18, in a lamination type diffractive optical element composed of two layers, a state is shown where the inclination of the grating side surfaces are changed in the diffraction gratings of both layers. However, a considerable effect can be obtained by changing the inclination only in one of these diffraction gratings. Further, in a lamination type diffractive optical element composed of diffraction gratings of more than two layers, a considerable effect can be obtained by changing the inclination only in one or more layers.

(Embodiment 7)

Figure 19:
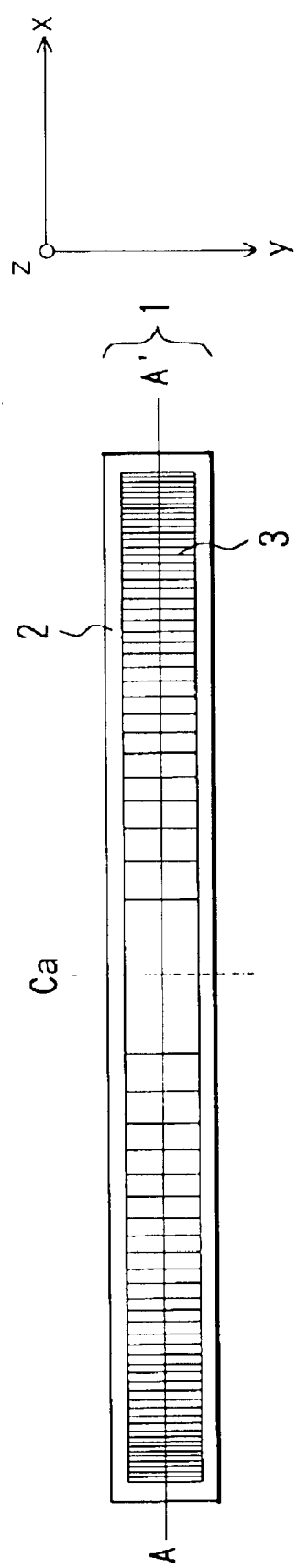
FIG. 19 is a front elevational view of a diffractive optical element according to Embodiment 7.
Figure 20:
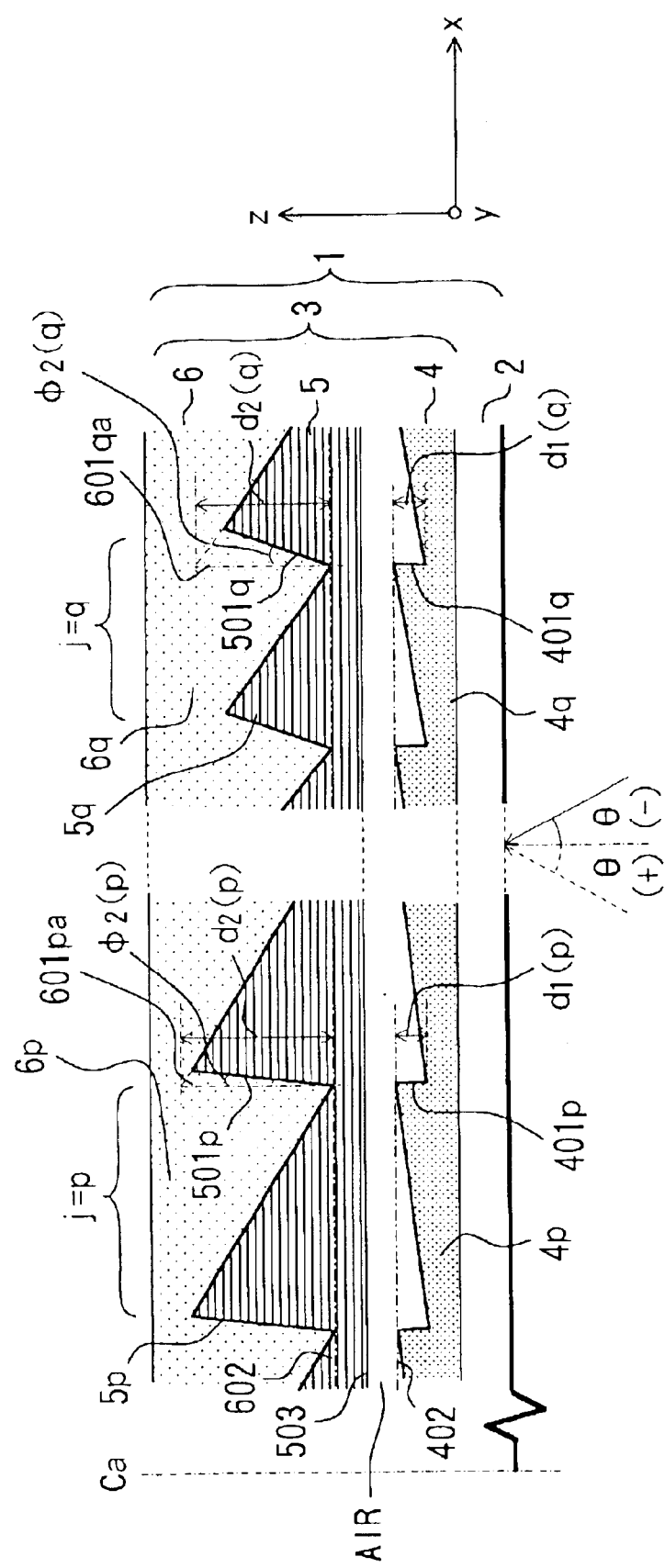
FIG. 20 is a cross-sectional view of the major parts of the diffractive optical element according to Embodiment 7.

FIG. 19 is a front elevational view of a diffractive optical element according to Embodiment 7 of the present invention. FIG. 20 shows a part of the cross-sectional shape of a diffractive optical element 1 according to Embodiment 7, which is taken along the line A–A' in FIG. 19.

In these drawings, the diffractive optical element 1 is composed so that a diffraction portion 3 having a plurality of diffraction gratings respectively made of different materials laminated is disposed on the surface of a substrate 2. The diffraction portion 3 is formed so that a diffraction grating 4 and a diffraction grating 5, each of which is a one-dimensional grating (linear grating) elongating in the y direction, are laminated with an air layer therebetween, and the diffraction grating 5 and a diffraction grating 6 are laminated with no air layer therebetween. The diffraction gratings 4, 5 and 6 have grating periods which gradually become shorter toward the periphery along the x direction from the center axis Ca.

The diffraction grating 4, air layer AIR, diffraction grating 5 and diffraction grating 6 are laminated from the incident side on a substrate 2 in order.

The diffraction grating 4 which is the first layer counting from the light incident side is formed of the first ultraviolet ray hardening resin (whose refractive index is $n_d$=1.636 and Abbe number $\nu_d$ is 22.8), which is one of the energy-hardening materials, and the diffraction grating 5 which is the second layer is formed of the second ultraviolet ray hardening resin (whose refractive index is $n_d$=1.598 and Abbe number $\nu_d$ is 28.0). The diffraction grating 6 which is the third layer is formed of the third ultraviolet ray hardening resin (whose refractive index is $n_d$=1.513 and Abbe number $\nu_d$ is 51.0). The diffraction grating 4 is formed of a serrated shape in which the grating thickness of the grating portion is increased toward the periphery at one period, the diffraction grating 5 is also formed of a serrated shape in which the grating thickness of the grating portion is decreased towawrd the periphery at one period, and the diffraction grating 6 is also formed of a serrated shape in which the grating thickness of the grating portion is increased toward the periphery at one period, wherein the diffraction gratings 4, 5 and 6 are set to be shaped so as to increase the diffraction efficiency of a diffractive light having a specified order.

Here, FIG. 20 shows a state where the grating thickness $d_2(p)$ of the p-th grating portions 5p and 6p counting from the center axis Ca in the diffraction gratings 5 and 6, and the grating thickness $d_2(q)$ of the q-th grating portions 5q and 6q change. An angle $\phi_2(p)$ is formed by the normal line 601pa of a surface 602 connecting edge lines at the incident side of respective grating portions in the diffraction grating 6 and the grating side surface 501p at the peripheral side of the p-th grating portions 5p and 6p counting from the center axis Ca in the diffraction gratings 5 and 6 which make contact with each other, with no air layer therebetween. Further, an angle $\phi_2(q)$ is formed by the normal line 601$qa$ of the same surface 602 and the grating side surface 501$q$ at the peripheral side of the q-th grating portions 5$q$ and 6$q$. And, the angle $\phi_2(p)$ and the angle $\phi_2(q)$ are different from each other in accordance with the incident angle or emergent angle of specified rays. And, both the grating thickness and inclination of the grating side surface change along the x direction. The grating side surfaces 401$p$ and 401$q$ of the grating portions in the diffraction grating 4 are perpendicular to a surface connecting the edge lines at the emergent side of the diffraction grating 4.

In a case where, in the diffraction grating in which the incident angle of incident specified rays is 0°, the design wavelength $\lambda_0$ is 587.56 nm, and the design diffraction order is the positive first order, the grating thickness at which the maximum diffraction efficiency is obtained is 3.54 $\mu$m for the grating thickness of the first layer diffraction grating 4, and −19.64 $\mu$m for the grating thickness of the second layer diffraction grating 5, as one combination obtained, on the basis of an expression where the incident angle and emergent angle of rays are not taken into consideration, that is, an expression in which $\theta_i$ and $\theta_i'$ are 0° in the expression (9).

Table 3 shows diffraction efficiencies of the diffraction light of the 1st order, 0th order and 2nd order, which are the design orders with respect to rays, whose wavelength is 587.56 nm, incident into a diffraction grating which has composed by a combination of a single grating thickness, obtained by above-described expression, and which is a grating pitch 80 $\mu$m, at incident angles −20°, −15°, −10°, −5°, 0°, 5°, 10°, 15°, and 20°. Herein, with respect to the incident angles, the incident angles of incident rays from the downward left side on the paper surface of FIG. 20 are made into positive incident angles, and the incident angle of incident rays from the downward right side are made into negative incident angles.

TABLE 3

| Incident angle | Grating thickness ($\mu$m) | | Diffraction efficiency $\eta$ ($\lambda_0$) (%) | | |
|---|---|---|---|---|---|
| (°) | $d_1$ | $d_2$ | 1st order | 0th order | 2nd order |
| −20 | 3.54 | −19.64 | 89.0726 | 4.6791 | 2.2000 |
| −15 | | | 90.8825 | 3.7939 | 1.9120 |
| −10 | | | 94.4523 | 2.1592 | 1.2729 |
| −5 | | | 98.1682 | 0.6434 | 0.4766 |
| 0 | | | 100.0000 | 0.0000 | 0.0000 |
| 5 | | | 96.9255 | 0.7617 | 1.1254 |
| 10 | | | 84.6553 | 2.8175 | 6.9846 |
| 15 | | | 59.0317 | 4.6410 | 24.0574 |
| 20 | | | 22.9809 | 3.3560 | 60.4071 |

As in the description in connection to Embodiment 5, with respect to the diffraction efficiency shown in Table 3, reflection of light generated on respective boundary surfaces and eclipse, etc., due to the grating side surfaces of the grating portions or the like are not taken into consideration.

Based on Table 3, it is understood that, with respect to the diffraction grating composed of a single grating thickness, the diffraction efficiency of the 1st order diffractive light, which is the design order, decreases in accordance with an increase in the absolute value of the incident angle, and the diffraction efficiency of 0th and 2nd order diffractive light, which are different from the design order, increases in accordance therewith. Since diffractive light other than these design orders becomes flare light, it is recommended that the diffractive light is decreased.

Then, in the present embodiment in the above-described structure, the grating thickness of the grating portions is respectively changed so as to obtain the maximum diffraction efficiency in accordance with the incident angle of incident light, so that expression (9) is satisfied. The diffraction efficiencies in this case are shown in Table 4.

TABLE 4

| Incident angle | Grating thickness ($\mu$m) | | Diffraction efficiency $\eta$ ($\lambda_0$) (%) | | |
|---|---|---|---|---|---|
| (°) | $d_1$ | $d_2$ | 1st order | 0th order | 2nd order |
| −20 | 3.26 | −16.91 | 99.9955 | 0.0014 | 0.0013 |
| −15 | 3.40 | −17.77 | 99.9926 | 0.0023 | 0.0022 |
| −10 | 3.50 | −18.52 | 99.9926 | 0.0022 | 0.0023 |
| −5 | 3.54 | −19.15 | 99.9998 | 0.0000 | 0.0000 |
| 0 | 3.54 | −19.64 | 100.0000 | 0.0000 | 0.0000 |
| 5 | 3.50 | −19.99 | 99.9934 | 0.0020 | 0.0020 |
| 10 | 3.41 | −20.17 | 99.9961 | 0.0012 | 0.0012 |
| 15 | 3.27 | −20.18 | 99.9935 | 0.0020 | 0.0020 |
| 20 | 3.09 | −20.00 | 99.9962 | 0.0012 | 0.0012 |

The grating thickness of each of the grating portions is one example of values obtained by changing the grating thickness so as to satisfy expression (9).

As has been made clear from Table 4, a high diffraction efficiency can be obtained with respect to a wide range of incident angles by applying an appropriate grating thickness in accordance with the incident angle, wherein it is understood that the diffraction efficiency can be clearly improved in the case of Table 4 in comparison with Table 1 that relates to a case where the grating thickness is optimized when the incident angle and emergent angle are 0° as in the prior art example.

In a case where a diffractive optical element is used for an actual optical system, it is common that rays having a certain incident angle distribution is made incident into a diffraction grating which is located at an optional position from the optical axis center. In such a case, taking the incident angle distribution into consideration, a grating thickness, which is optimized with respect to rays having the incident angle of the average value, gravity value or maximum value of the absolute value, etc., obtained from the incident angle distribution of all the rays passing through the diffraction grating, and a ray passing through the center of an aperture-stop in use of the diffractive optical element in an optical system may be applied so that an optimal diffraction efficiency can be obtained in the entire field angle.

Also, as has been understood in Table 3, a lowering in the diffraction efficiency in a lamination type diffractive optical element of a blaze profile as shown in FIG. 20 is further remarkable in the case where the incident angle moves to the positive side than in the case where the incident angle moves to the negative side. Judging therefrom, optimization of the grating thickness of the grating portion is not merely carried out for the incident angle of a ray having an average value obtained from the incident angle distribution and of a ray passing through the center of an aperture-stop in use of a diffractive optical element in an optical system, but it is preferable that the optimization thereof is carried out for a ray whose incident angle is at a slightly positive side.

Figure 21:
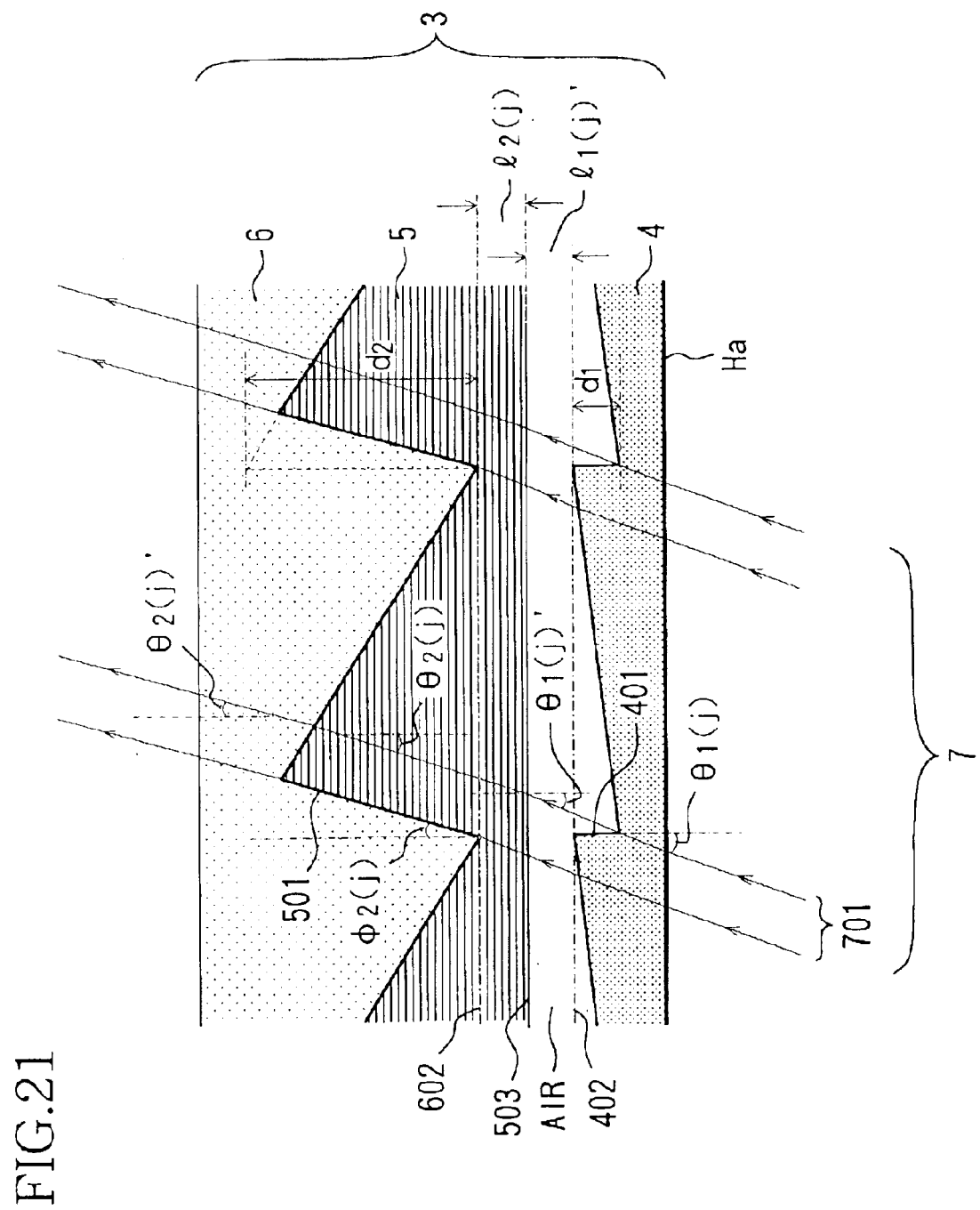
FIG. 21 is a descriptive view of the eclipse of rays in the diffractive optical element according to Embodiment 7.

FIG. 21 is an explanatory view describing an eclipse state of rays when the rays (specified rays) 7 are made incident into the diffractive optical element 1 according to Embodiment 7. It is understood that by changing the inclination angle $\phi_i(j)$ of the side surface 501 of the respective grating portions of the diffraction gratings 5 and 6 in the x direction in the xy plane so that the ratio of the eclipsed light flux 701 of the light flux 7 incident into the grating portion of one period is clearly reduced in comparison with the diffractive optical element of a comparative example shown in FIG. 31.

In the present embodiment, the incident angle $\theta_1(j)$ with respect to an incident plane Ha of the diffractive optical element 1 of the specified rays is 10°, the grating thickness $d_1$ of the first layer diffraction grating 4 is set to 3.54 μm, the grating thickness $d_2$ of the second layer diffraction grating 5 and the third layer diffraction grating 6 is set to −20.17 μm, the interval $l_1(j)'$ from the surface 402 to a boundary surface 503 at the incident side of the second layer diffraction grating 5 is set to 1.5 μm, an interval $l_2(j)$ from the same surface 503 to the surface 602 is set to 1.5 μm, and a grating pitch of the respective diffraction gratings is 80 μm, the angle $\phi_1(j)$ of the grating side surface 401 with respect to the normal line of the surface 402 is set to 0°, and the angle $\phi_2(j)$ of the grating side surface 601 with the normal line of the surface 602 is set to 11.3°.

Thereby, the ratio of the eclipsed light flux 701 of the light flux 7 incident into the grating portion of one period of the diffraction portion 3 becomes approx. 2.4%, wherein the ratio of the eclipsed rays can be lowered to approx. one-third in comparison with the comparative example shown in FIG. 31. If such a diffractive optical element 1 according to the present embodiment is used for a part of an optical system, a great effect for suppressing occurrence of harmful light such as flare and ghost light can be obtained.

Herein, the angle $\phi_2(j)$ of the grating side surface 601 is determined to be 11.3° which is the same as the emergent angle $\theta_2(j)'$ of the specified rays from the diffraction grating 5. However, it may be determined on the basis of the incident angle $\theta_2(j)$ of the specified rays into the diffraction grating 6. In addition, it is not necessary that the angle of the grating side surface is made strictly coincident with the incident angle or the emergent angle of the specified rays, wherein it may be optionally set at angle between 0.2 times and 2.0 times the incident angle or the emergent angle, so that it satisfies at least one of the above-described conditional expressions (1) through (4).

Also, in the present embodiment, a case where the inclination angles of the grating side surfaces of diffraction gratings disposed on the second layer and third layer counting from the incident side are changed in the lamination type diffractive optical element composed of three layers. However, the inclination angles of the grating side surfaces of the first layer diffraction grating may be further changed. However, even if the inclination angles are changed in only at least one layer in the lamination type diffractive optical element, a considerable effect can be brought about.

In addition, as shown in FIG. 19, a case where the grating portions that composed the respective diffraction gratings are linearly provided is shown in Embodiment 7. However, similar effects can be brought about in a case where the grating portion is concentrically provided.

(Embodiment 8)

Figure 22:
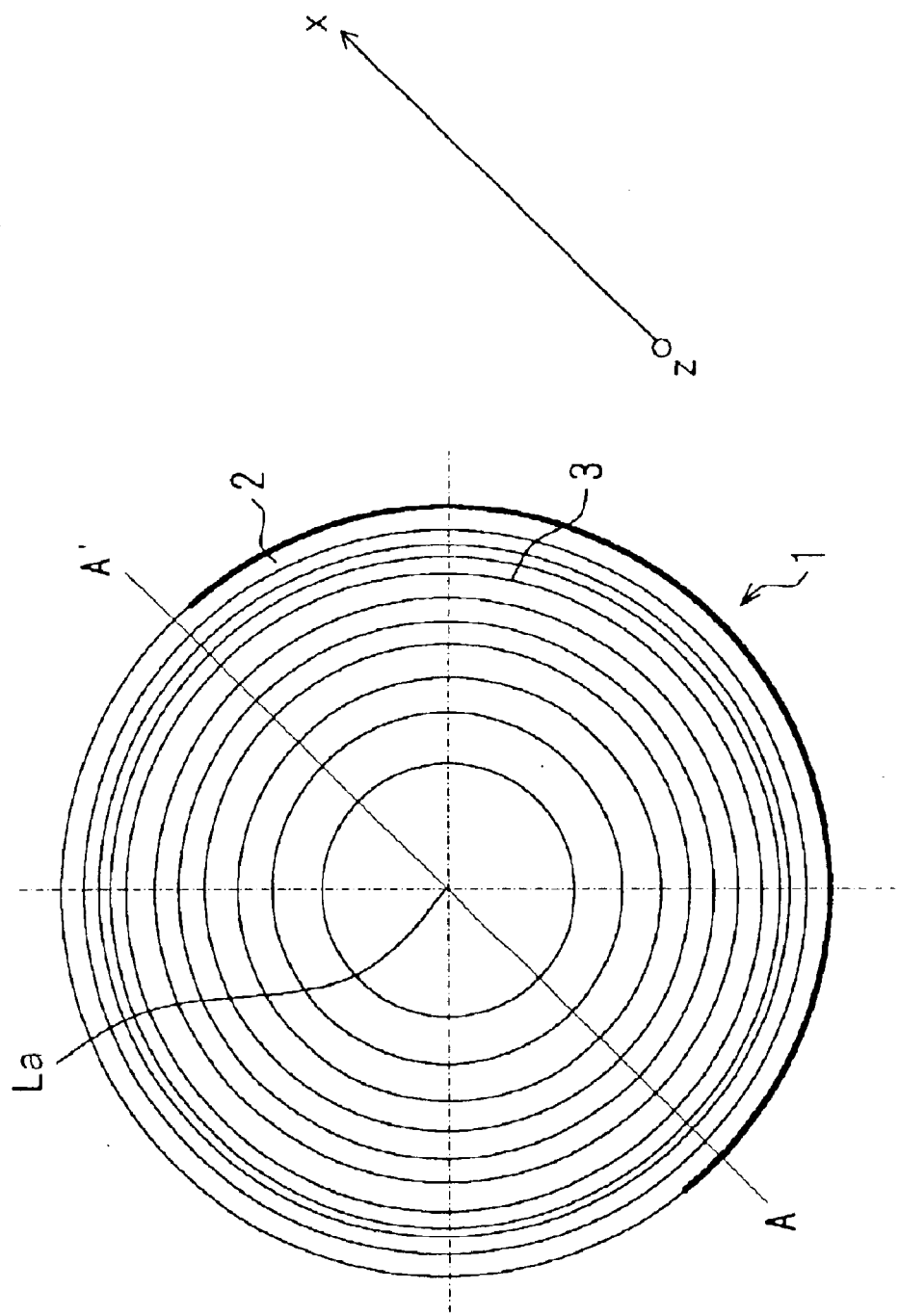
FIG. 22 is a front elevational view of a diffractive optical element according to Embodiment 8.
Figure 23:
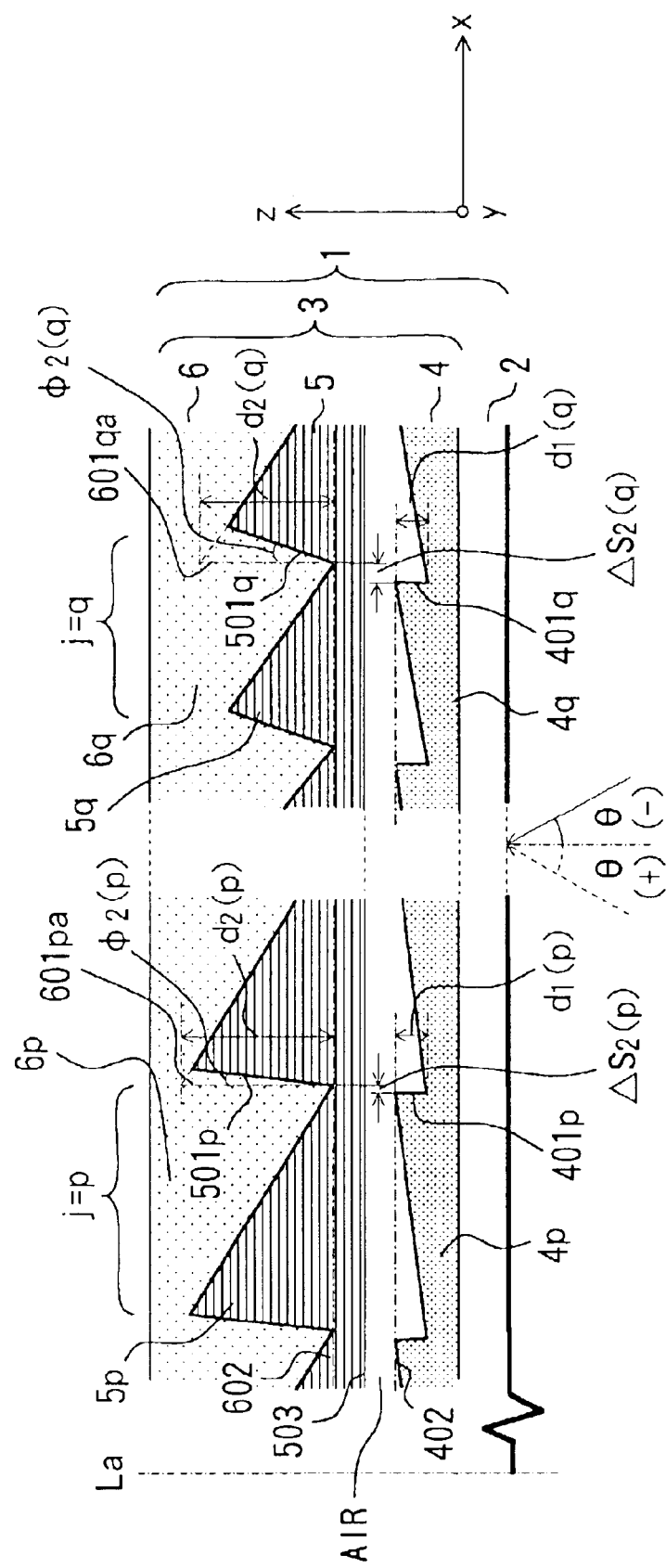
FIG. 23 is a cross-sectional view of the major parts of the diffractive optical element according to Embodiment 8.

FIG. 22 is a front elevational view of a diffractive optical element according to Embodiment 8 of the present invention. FIG. 23 shows a part of a cross-sectional shape of a diffractive optical element 1 according to Embodiment 8, which is taken along the line A–A' in FIG. 22.

In these drawings, the diffractive optical element 1 is structured so that a diffraction portion 3 in which diffraction gratings, respectively, comprised of different materials are laminated on the surface of the substrate 2. Concentric diffraction gratings 4, 5 and 6 are laminated in the diffraction portion 3, wherein the respective diffraction gratings have a period which becomes smaller and smaller from the center La toward the periphery along the x direction.

In the diffractive optical element 1, the diffraction grating 4, the diffraction grating 5, and the diffraction grating 6 are laminated from the incident side on the substrate 2. An air layer AIR is formed between the diffraction gratings 4 and 5. The diffraction grating 6 makes contact with the diffraction grating 5. And, the first layer diffraction grating 4 counting from the incident side is formed of the first ultraviolet ray hardening resin ($n_d$=1.636 and $v_d$=22.8), the second layer diffraction grating 5 is formed of the second ultraviolet ray hardening resin ($n_d$=1.598 and $v_d$=28.0), and the third layer diffraction grating 6 is formed of the third ultraviolet ray hardening resin ($n_d$=1.513 and $v_d$=51.0). Reference symbol La is the center, that is, the optical axis of the diffractive optical element 1. And, the diffraction grating 4 is formed of a serrated shape in which the grating thickness of the grating portion increases toward the periphery at one period, the diffraction grating 5 is formed of a serrated shape in which the grating thickness of the grating portion decreases toward the periphery at one period, and the diffraction grating 6 is formed of a serrated shape in which the grating thickness of the grating portion increases toward the periphery at one period, wherein these diffraction gratings are shaped so as to increase the diffraction efficiency of diffractive light of a specified order.

Here, in FIG. 23, the grating thickness $d_2(p)$ of the p-th grating portions 5p and 6p counting from the optical axis La in the diffraction gratings 5 and 6, and the grating thickness $d_2(q)$ of the q-th grating portions 5q and 6q therefrom change. An angle $\phi_2(p)$ is formed by the normal line 601pa of a surface 602 connecting edge lines at the incident side of respective grating portions of the diffraction grating 6 and the grating side surface 501p at the peripheral side of the p-th grating portions 5p and 6p counting from the center La in the diffraction gratings 5 and 6 which make contact with each other, with no air layer therebetween. Further, an angle $\phi_2(q)$ is formed by the normal line 601qa of the same surface 602 and the grating side surface 501q at the peripheral side of the q-th grating portions 5q and 6q. The angle $\phi_2(p)$ and the angle $\phi_2(q)$ are different from each other in accordance with the incident angle or emergent angle of specified rays. And, both the grating thickness of the grating portions and inclination of the grating side surface change while being distant from the optical axis La. All of the grating side surface 401p and 401q o the grating portions 4p and 4q are perpendicular to a surface 402 connecting edge lines at emergent side of the diffractions grating 4.

Further, in the diffractive optical element according to the present embodiment, the edge (edge line) at the peripheral side of the grating portions that compose the diffraction grating 4, and the edge at the peripheral side of the grating portions that compose the diffraction gratings 5 and 6 adjacent thereto are shifted in accordance with the incident angle or the emergent angle of a specified ray of light, and the shift amount is varied so as to increase or decrease while being distant from the optical axis La.

In detail, the shift amount $\Delta S_2(p)$ between the edge of the p-th grating portion of the first layer and the edges of the p-th grating portions of the second and third layers in the x direction, and the shift amount $\Delta S_2(q)$ between the edge of the grating portion of the q-th grating portion of the first layer and the edges of the q-th grating portions of the second and third layer are different from each other in accordance with the incident angle or the emergent angle of the specified ray.

Thus, taking into consideration the incident angle/emergent angle distribution of all the effective rays passing through the positions of the grating portions, by optimally setting of the inclination angle of the grating side surface and the positions of the edges so that the eclipse of rays are reduced at the respective grating portions, occurrence of harmful light which becomes a factor of flare and ghost, etc., is suppressed over the entire field angle.

Figure 24:
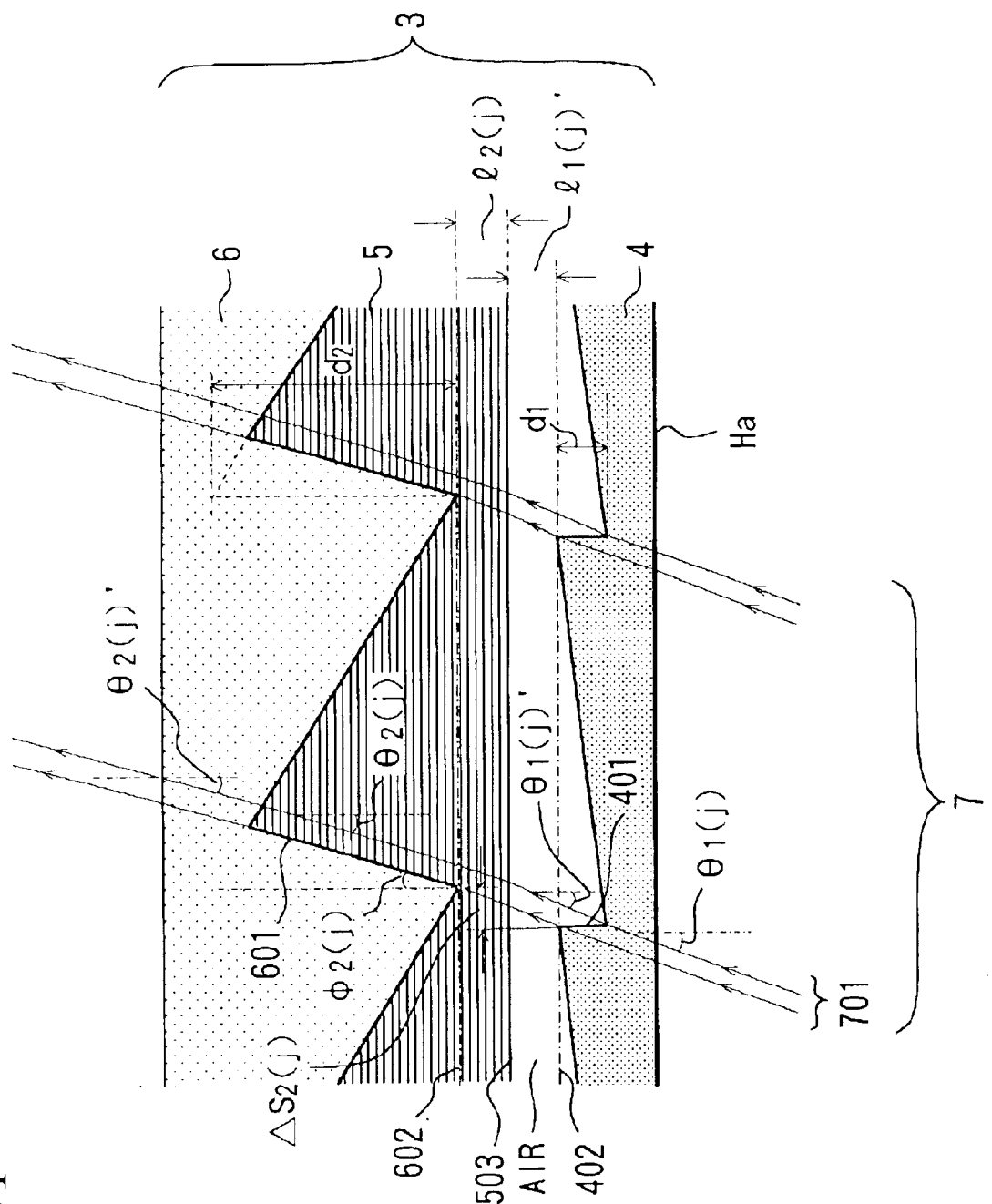
FIG. 24 is a descriptive view of the eclipse of rays in the diffractive optical element according to Embodiment 8.

FIG. 24 is an explanatory view showing a state of eclipse of rays when the rays (specified rays) are made incident into the diffractive optical element 1 according to Embodiment 8. By changing the inclination angle of the grating side surfaces and the shift amount of the edges of grating portions of the first layer and second layer diffraction grating so that the eclipse of the rays is reduced, the ratio of the eclipsed light flux 701 of the light flux 7 incident into the grating portions of one period is remarkably reduced.

In the present embodiment, the incident angle $\theta_1(j)$ of the specified ray is set to 10°, the grating thickness $d_1$ of the first layer diffraction grating 4 is set to 3.41 μm, the grating thickness $d_2$ of the second layer diffraction grating 5 and the third layer diffraction grating 6 is set to −20.17 μm, an interval $l_1(j)'$ from the surface 402 to a boundary surface 503 at the incident side at the second layer diffraction grating 5 is set to 1.5 μm, an interval $l_2(j)$ from the same surface 503 to the surface 602 is set to 1.5 μm, and a grating pitch of the respective refraction gratins is set to 80 μm, the incident angle $\phi_1(j)$ of the first layer grating side surface 401 is set to 0°, and the incident angle $\phi_2(j)$ of the second layer and third layer grating side surface 601 is set to 11.3°, and the shift amount $\Delta S_2(j)$ of the edges is set to 0.79 μm. Thereby, the ratio of the eclipsed light flux 701 of the light flux 7 incident into the grating portion of one period becomes approx. 1.4%, wherein the ratio of the eclipsed rays can be lowered to approx. one-eighth in comparison with the structure of the comparative example shown in FIG. 31.

Further, when such a diffractive optical element 1 according to the present embodiment is used for a part of an optical system, a great effect for suppressing occurrence of harmful light such as flare and ghost light, etc., can be obtained. However, the ratio of eclipsed light flux shown herein is a ratio of the diffraction grating in the cross direction merely in view of the cross-sectional shape thereof.

In the present embodiment, the angle $\phi_2(j)$ is determined to be 11.3° on the basis of the emergent angle $\theta_2(j)'$ of the specified ray from the diffraction grating 5. However, it may be determined on the basis of the incident angle $\theta_2(j)$ of the specified ray into the grating portion. Also, it is not necessary to make the angle of the grating side surface strictly coincident with the incident angle or the emergent angle of the specified ray. The angle may be optionally determined between 0.2 times and 2.0 times of the incident angle or the emergent angle so that it satisfies at least one of the above-described conditional expressions (1) through (4).

Further, the shift amount $\Delta S_2(j)$ is determined to be 0.79 μm from the sum of a value obtained by multiplying 1.5 μm by tan 18.3° and a value obtained by multiplying 1.5 μm by tan 11.3° on the basis of the intervals $l_1(j)'$, $l_2(j)$, the value of 18.2° of the emergent angle $\theta_1(j)'$ of the specified ray from the diffraction grating 4, and the value of 11.3° of the incident angle $\theta_2(j)$ into the diffraction grating 5. However, it is not necessary to make the shift amount $\Delta S_2(j)$ strictly coincident with the value thus obtained, wherein it may be optionally set between 0.1 and 1.5 times of the value of $l_1(j)' \times \tan \theta_1(j)'$.

In detail, the position of the edge of the j-th grating portion counting from the center in the diffraction grating disposed at the i-th layer counting from the incident side and the position of the edge of the j-th grating portion counting from the center in the diffraction grating adjacent thereto are disposed so as to shift in the arranging direction of the grating portions so that the eclipse of the specified ray is reduced, and the shift amount $\Delta S_{i+1}(j)$ may be changed so as to satisfy the following expression:

$$\Delta S_{i+1}(j) = C_2 \cdot [l_i(j)' \tan \theta_i(j)' + l_{i+1}(j) \tan \theta_{i+1}(j)]$$

where $C_2$ is an optional real number between 0.1 or more and 1.5 or less (0.1≦$C_2$≦1.5); $l_i(j)'$ is an interval at a j-th grating portion position from a plane connecting edge lines of the grating portion of an i-th layer diffraction grating to a boundary surface at the incident side of a (i+1)th layer diffraction grating; $\theta_i(j)'$ is an emergent angle of a specified ray from the j-th grating portion at the i-th layer diffraction grating; $l_{i+1}(j)$ is an interval at the j-th grating portion position from the boundary surface at the incident side of the (i+1)th layer diffraction grating to a plane connecting edge lines of the grating portion thereof; $\theta_{i+1}(j)$ is an incident angle of the specified ray into the j-th grating portion at the (i+1)th layer diffraction grating.

In the present embodiment, a case where the inclination angles of the grating side surfaces in diffraction gratings which are the second layer and third layer counting from the incident side are varied in a lamination type diffractive optical element composed of three layers is shown. Further, the inclination angle of the grating side surface of the first layer diffraction grating may be varied. However, even if the inclination of the grating side surface is changed in at least one layer in a lamination type diffractive optical element, a considerable effect can be obtained.

Also, the grating thickness of the grating portions of the first layer diffraction grating 4 may change from the center toward the periphery. Further, even if the grating thickness of the grating portion of only one of the diffraction gratings is changed, a considerable effect can be obtained.

Also, as shown in FIG. 22, in Embodiment 8, a case is shown, in which the diffraction grating is concentrically provided. However, similar effects can be brought about in a case where the diffraction grating is linearly provided.

As shown in the above-described Embodiments 1 through 8, (a) the inclination of the grating side surfaces of the diffraction portions that composes a lamination type diffractive optical element is changed with the incident angle or emergent angle of a specified ray taken into consideration, or (b) the shift amount of the edge positions adjacent thereto in the respective layers is changed with the incident angle or the emergent angle of the specified ray taken into consideration, and (c) the grating thickness is changed with the incident angle or emergent angle of the specified ray taken into consideration in addition to (a) and (b), wherein the eclipse of rays can be remarkably reduced, and it is possible to suppress occurrence of harmful light, which becomes a factor of flare and/or ghost, etc., when the lamination type diffractive optical element is used in an optical system.

Herein, where the diffractive optical element is used for a real optical system, it is common that the incident angle of effective light is varied in accordance with the distance from the center (optical axis), and the incident angle is not a single value but has in a constant distribution. Therefore, in the diffractive optical element shown in Embodiments 1 through 8, rays in which the eclipse becomes the least among rays having an average value, gravity value, maximum value or minimum value, which are obtained from a distribution of the incident angle and emergent angle of incident rays, and rays passing through the center of an aperture-stop when the diffractive optical element is used in an optical system, are set to "specified rays (or a specified ray)." Based thereon, the inclination angle of the grating side surfaces and shift amount of the edge positions are set.

In addition, in the descriptions of Embodiments 1 through 8, a case where diffraction gratings 4 and 5 (further, and 6 in some embodiments) are provided on a flat substrate 2 is shown in order to make understanding thereof easier. However, similar effects can be obtained in a case where the diffraction gratings are provided on a substrate having a curved surface.

Further, in each of the above-described embodiments, the diffractive optical element may only have a region that the edge position of one layer diffraction grating and the edge position of another layer diffraction grating adjacent thereto on the incident side or the emergent side, are shifted in the arranging direction of the grating portion. According to this, it is possible to reduce the eclipse of rays to some degree.

Also, a reflection type diffractive optical element may be brought about by making the emergent surface into a reflection surface in Embodiments 1 through 8. In such a case, similar effects can be also obtained.

(Embodiment 9)

Next, an example in which a diffractive optical element described in Embodiments 1 through 8 is used in a part of an optical system is shown as Embodiment 9 of the present invention.

Figure 26:
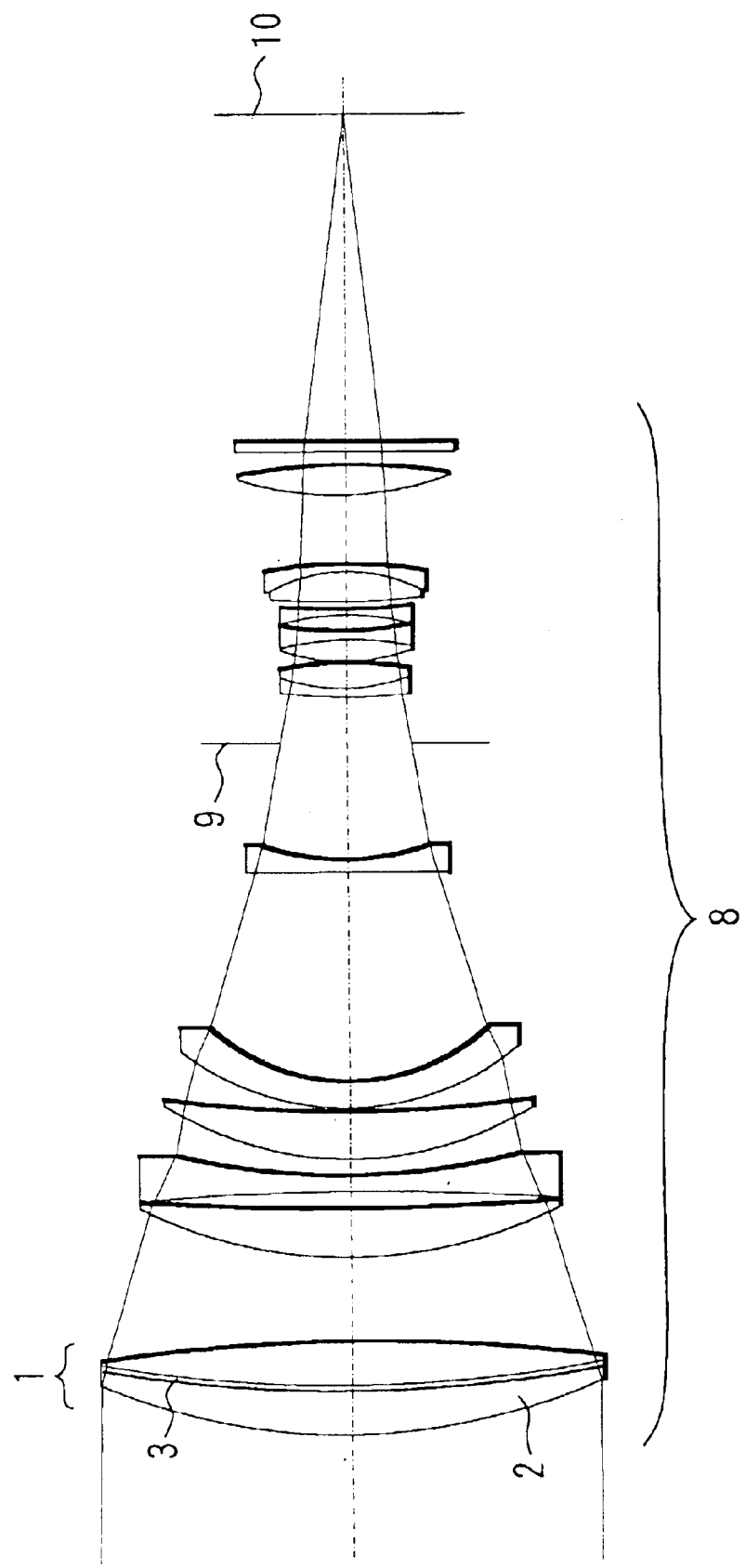
FIG. 26 is a sketch of an embodiment of an image-pickup optical system having a diffractive optical element.

FIG. 26 shows a cross section of an image-taking optical system used in a camera, etc. In the same drawing, reference numeral 8 denotes an image-taking lens, in which a diffractive optical element 1 according to the present invention is provided on a surface of a lens as a substrate 2. In addition, the refractive optical elements composed of normal lenses, etc. are provided inside the image-taking lens 8. Reference numeral 9 denotes an aperture-stop, and 10 denotes a film or a solid-state image pickup element (photo-electric converting element) such as a CCD sensor and a CMOS sensor which is disposed on an image-forming plane.

By composing the diffractive optical element 1 of a laminated structure of a plurality of diffraction gratings formed of materials having different dispersion, the wavelength dependence of the diffraction efficiency can be remarkably improved. Further, by appropriately setting the inclination angles of the grating side surfaces and shift amounts of the edges of the adjacent grating portions of respective layers from the incident angle distribution in accordance with the position in the effective surface of the diffraction gratings, the ratio of rays eclipsed by the grating side surfaces can be remarkably reduced. Thereby, an image-taking lens having high resolution and high performance over the entire image area, in which harmful light such as flare and ghost light, etc. is less, can be realized.

Such an image-taking optical system according to the present embodiment may be preferably used for exchangeable lenses of a single flex camera, image-taking lenses of video cameras and digital cameras, etc.

(Embodiment 10)

Next, a case where a diffractive optical element described in Embodiments 1 through 8 is used in a part of an observation optical system is shown as Embodiment 10 of the present invention.

Figure 27:
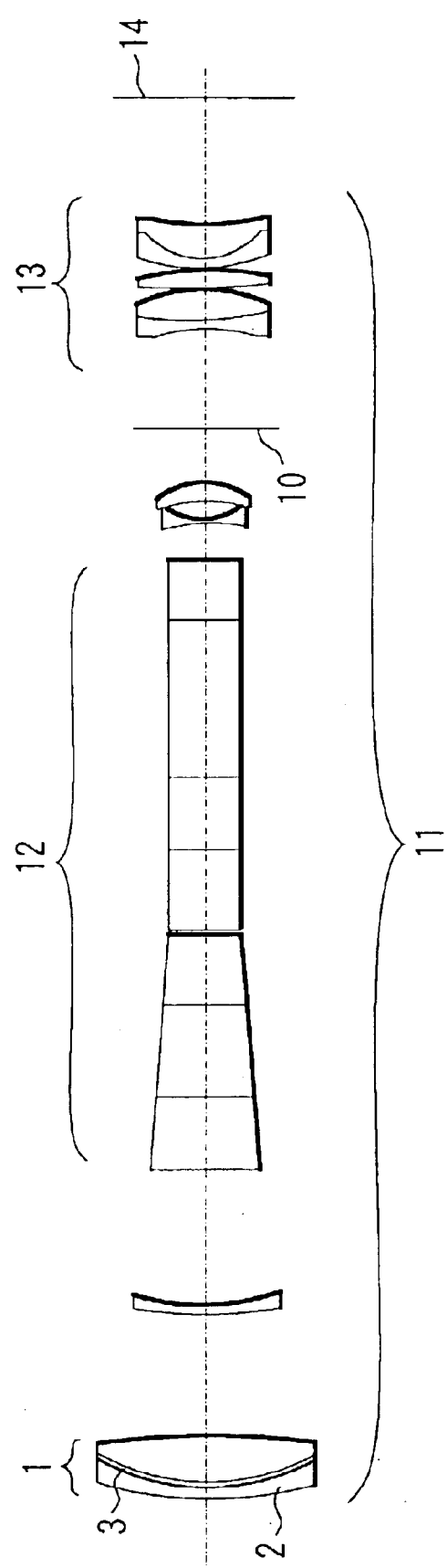
FIG. 27 is a sketch of an embodiment of an observation optical system having a diffractive optical element.
Figure 28:
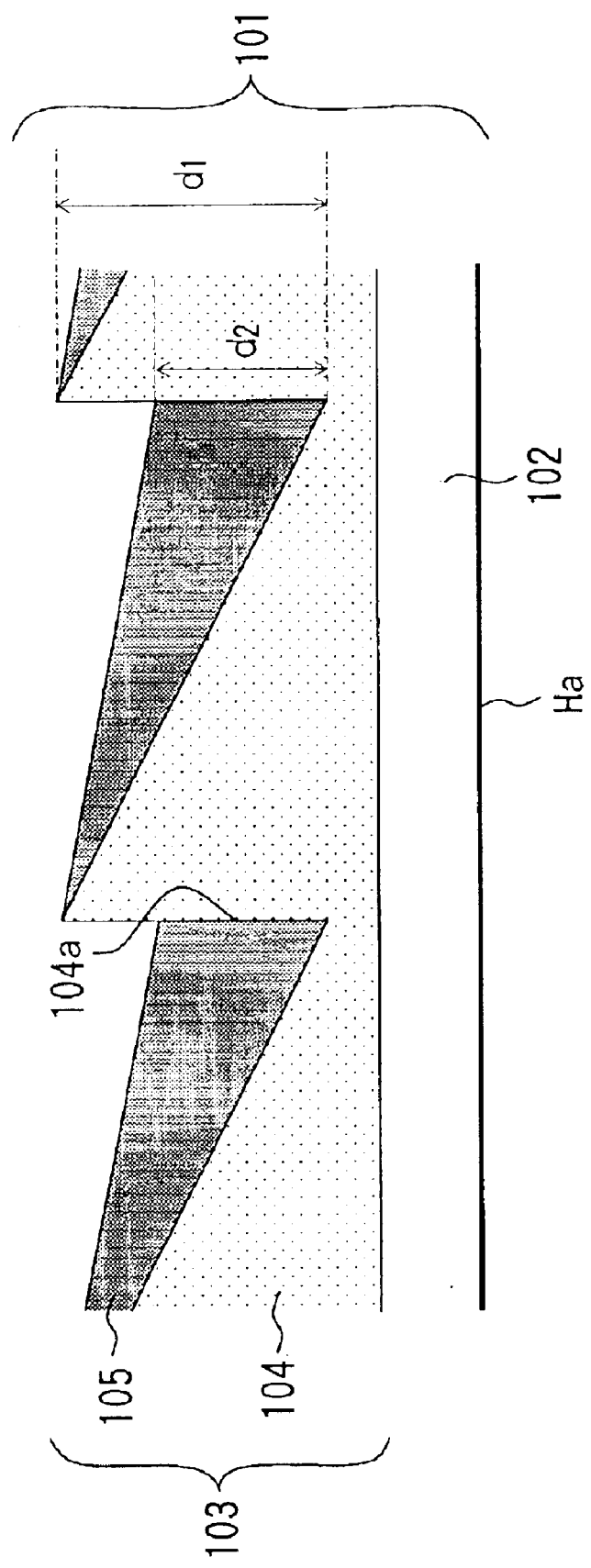
FIG. 28 is a sectional view of a prior art diffractive optical element (two layers)
Figure 29:
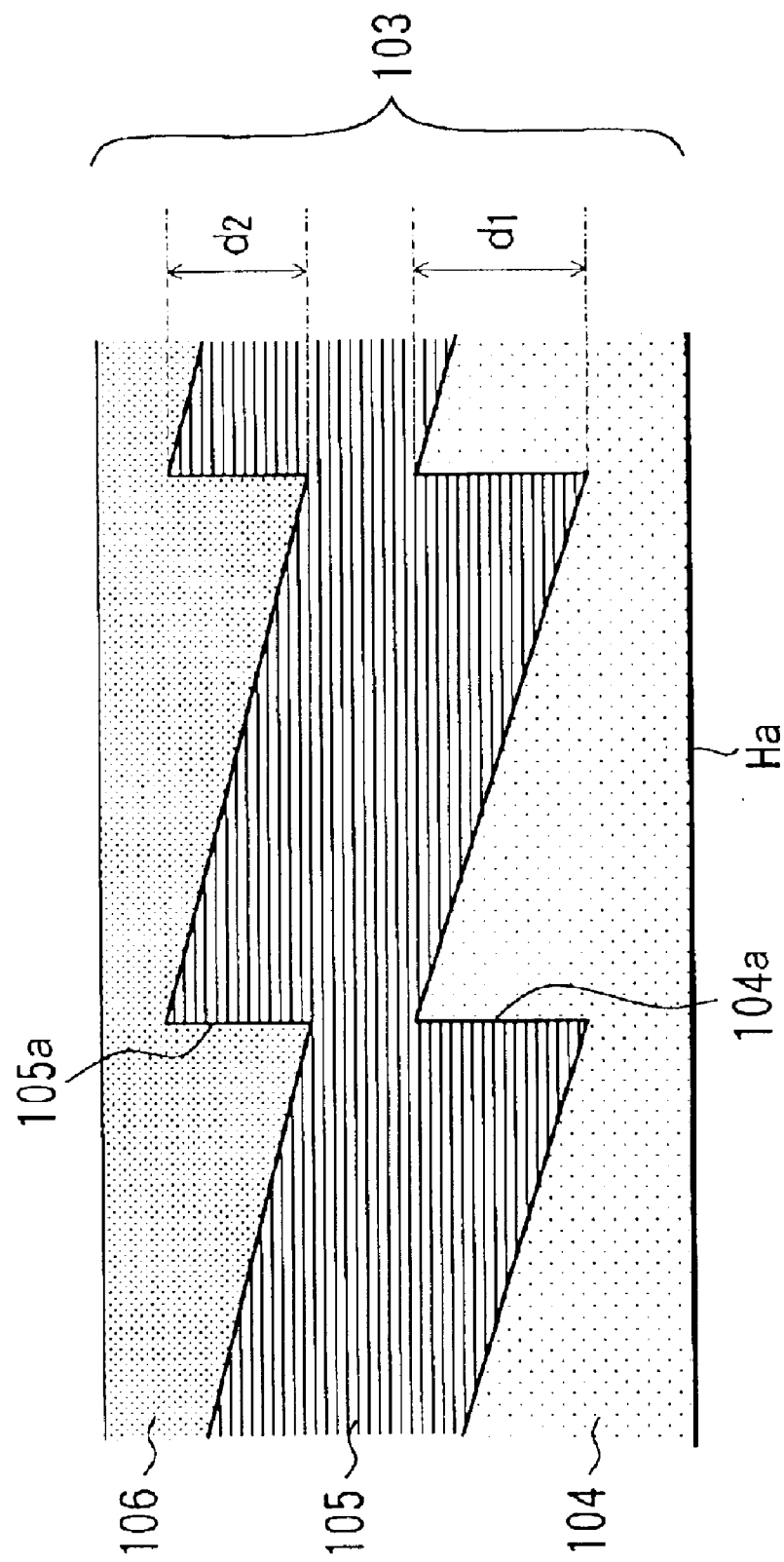
FIG. 29 is a sectional view of a prior art diffractive optical element (three layers)

FIG. 27 shows the cross-section of one side of a pair of optical systems of binoculars. In the same drawing, reference numeral 11 denotes an objective lens that forms an observation image, 12 denotes a prism (image reversing member) for reversing an image, 13 denotes an eyepiece lens, and 14 denotes an evaluation plane (pupil plane). In the drawing, reference numeral 1 denotes a diffractive optical element according to the present invention which composes a part of the objective lens 11 together with the refractive optical element composed of normal lenses, etc. The diffractive optical element 1 is provided to correct a chromatic aberration on an image-forming plane 10 of the objective lens 11.

By composing the diffractive optical element 1 of a laminated structure of a plurality of diffraction gratings formed of materials having different dispersion, the wavelength dependence of the diffraction efficiency can be remarkably improved. Further, by appropriately setting the inclination angles of the grating side surfaces and shift amounts of the adjacent grating portions of respective layers from the incident angle distribution in accordance with the position in the effective plane of the diffraction gratings, the ratio of rays eclipsed by the grating side surfaces can be remarkably reduced. Thereby, an observation optical system having high resolution and high performance over the entire image area, in which harmful light such as flare and ghost light, etc. is less, can be obtained.

Although, in the present embodiment, a case where the objective lens 11 in the observation optical system has a diffractive optical element 1, is shown, the invention is not limited thereto. The diffractive optical element may be provided on the surface of the prism 12 and on the eyepiece lens 13. However, since an effect of lowering chromatic aberration can be expected at only the objective lens side if it is provided at the objective side from the image plane 10, it is preferable that, in a case of an observation optical system for the naked eye, at least one of the diffractive optical elements is provided at the objective lens side from the image plane 10.

In addition, a description is given of a mode of binoculars in the present embodiment. However, the embodiment is not limited thereto. It may be a terrestrial telescope, an astronomical telescope, a microscope, etc. Also, where it may be also an optical finder such as for a lens shutter camera, video camera, etc., similar effects can be obtained.

While preferred embodiments have been described, it is to be understood that modification and variation of the present invention may be made without departing from the sprit or scope of the following claims.

What is claimed is:

1. A diffractive optical element comprising:
   a plurality of diffraction gratings including two diffraction gratings made of different materials from each other, wherein at least one of said plurality of diffraction gratings includes a region in which grating side surfaces are inclined, and inclinations thereof are different according to positions thereof and in accordance with an incident angle or emergent angle of a specified ray of light, and
   wherein at least one of said diffraction grating is a diffraction grating disposed in an i-th layer counting from an incident side of said plurality of diffraction gratings, and includes a region in which an inclination angle $\phi_i(j)$ of said grating side surface is changed so as to satisfy at least one of the following expressions:

$$\phi_i(j)=C_i \cdot \theta_i(j)$$

$$\phi_i(j)=C_i \cdot \theta_i(j)'$$

where the incident angle of the specified ray incident into a j-th grating portion counting from a center portion of the i-th layer diffraction granting is $\theta_i(j)$, the emergent angle thereof is $\theta_i(j)$, and C1 is an optional real number which is 0. 2 or more and 2.0 or less.

2. The diffractive optical element according to claim 1, wherein said specified ray is a ray having an average incident angle which is obtained from an incident angle distribution, or an average emergent angle which is obtained from an emergent angle distribution, of all effective rays passing through respective grating portions in at least one of said diffraction gratings.

3. The diffractive optical element according to claim 1, wherein said specified ray is a ray having a maximum incident angle or maximum emergent angle of all effective rays passing through respective grating portions in at least one of said diffraction gratings.

4. The diffractive optical element according to claim 1, wherein said specified ray is a ray having a minimum incident angle or minimum emergent angle of all effective rays passing through respective grating portions in at least one of said diffraction gratings.

5. The diffractive optical element according to claim 1, wherein said specified ray is a ray passing through a center of an aperture-stop in an optical system provided with said diffractive optical element.

6. The diffractive optical element according to claim 1, wherein at least one of said diffraction gratings includes a region in which positions of grating edges are shifted in an arranging direction of grating portions with respect to positions of grating edges of another diffraction grating adjacent thereto, and shift amounts thereof are different according to the positions thereof and in accordance with the incident angle or emergent angle of the specified ray.

7. The diffractive optical element according to claim 6, including a region in which the shift amount $\Delta S_{i+1}(j)$ between the position of the grating edge of a j-th grating portion, counting from a center portion of the diffractive optical element t, in an i-th layer diffraction grating and the position of the grating edge of a j-th grating portion, counting from the center portion, in a (i+1)th layer diffraction grating is changed so as to satisfy the following expression:

$$\Delta S_{i+1}(j) = C_2 \cdot L_i(j)' \tan \theta_i(j)'$$

where an interval from a surface connecting edge lines at an emergent side of the i-th layer diffraction grating to a surface connecting edge lines at an incident side of the (i+1)th layer diffraction grating at the position of the j-th grating portions is $L_i(j)'$, the emergent angle of the specified ray from the j-th grating portion in the i-th layer diffraction grating is $\theta_i(j)'$, and $C_2$ is an optional real number which is 0.1 or more and 1.5 or less.

8. The diffractive optical element according to claim 6, the including a region in which the shift amount $\Delta S_{i+1}(j)$ between the position of the grating edge of a j-th grating portion, counting from a center portion of the diffractive optical element, in an i-th layer diffraction grating and the position of the grating edge of a j-th grating portion, counting from the center portions, in a (i+1)th layer diffraction grating is changed so as to satisfy the following expression:

$$\Delta S_{i+1}(j) = C_2 \cdot [l_i(j)' \tan \theta_i(j)' + l_{i+1}(j) \tan \theta_{i+1}(j)]$$

where an interval from a surface connecting edge lines at an emergent side of the i-th layer diffraction grating to a boundary surface at an incident side of the (i+1)th layer diffraction grating at a position of the j-th grating portions is $l_i(j)'$; the emergent angle of the specified ray from the j-th grating portion in the i-th layer diffraction grating is $\theta_i(j)'$; the incident angle of the specified ray into the j-th grating portion in the (i+1)th layer diffraction grating is $\theta_{i+1}(j)$; an interval from the boundary surface to a surface connecting edge lines at the incident side of the (i+1)th layer diffraction grating at the positions of the j-th grating portion is $l_{i+1}(j)$, and $C_2$ is an optional real number which is 0.1 or more and 1.5 or less.

9. The diffractive optical element according to claim 1, wherein, in at least one of said diffraction gratings, a grating thickness of respective grating portions is different according to positions thereof and in accordance with the incident angle or emergent angle of said specified ray.

10. The diffractive optical element according to claim 1, wherein at least two of said plurality of diffraction gratings are disposed opposite to each other with an interval therebetween.

11. An optical system comprising: a diffractive optical element according to claim 1, and a refractive optical element, wherein light incident into said optical system passes through both said diffractive optical element and said refractive optical element.

12. A diffractive optical element comprising:
a plurality of diffraction gratings including two diffraction gratings made of different materials from each other, wherein at least one of said plurality of diffraction gratings includes a region in which positions of grating edges thereof are shifted with respective to positions of grating edges of another diffraction grating adjacent thereto in an arranging direction of the grating portions and shift amounts thereof are different according to the positions thereof and in accordance with an incident angle or emergent angle of a specified ray; and
wherein the diffractive optical element includes a region in which the shift amount $\Delta S_{i+1}(j)$ between the position of the grating edge of a j-th grating portion, counting from a center portion of the diffractive optical element, in an i-th layer diffraction grating and the position of the grating edge of a j-th grating portion, counting from the center portion, in a (i+1)th layer diffraction grating is changed so as to satisfy the following expression:

$$\Delta S_{i+1}(j) = C_2 \cdot L_i(j)' \tan \theta_i(j)'$$

where an interval from a surface connecting edge lines at an emergent side of the i-th layer diffraction grating to a surface connecting edge lines at an incident side of the (i+1)th layer diffraction grating at a position of the j-th grating portions is $L_i(j)'$, and the emergent angle of the specified ray from the j-th grating portion in the i-th layer diffraction grating is $\theta_i(j)'$, and $C_2$ is an optional real number which is 0.1 or more and 1.5 or less.

13. The diffractive optical element according to claim 12, wherein said specified ray is a ray having an average incident angle which is obtained from an incident angle distribution or an average emergent angle, which is obtained from an emergent angle distribution, of all effective rays passing through the respective grating portions in at least one of said diffraction gratings.

14. The diffractive optical element according to claim 12, wherein said specified ray is a ray having a maximum incident angle or maximum emergent angle of all effective rays passing through the respective grating portions in at least one of said diffraction gratings.

15. The diffractive optical element according to claim 12, wherein said specified ray is a ray having a minimum incident angle or minimum emergent angle of all effective rays passing through the respective grating portions in at least one of said diffraction gratings.

16. The diffractive optical element according to claim 12, wherein said specified ray is a ray passing through a center of an aperture-stop in an optical system provided with said diffractive optical element.

17. The diffractive optical element according to claim 12, including a region in which the shift amount $\Delta S_{i+1}(j)$ between the position of the grating edge of a j-th grating, counting from a center portion of the diffractive optical element in an i-th layer diffraction grating and the position of the grating edge of a j-th grating portion, counting from the center portion, in a (i+1)th layer diffraction grating is changed so as to satisfy the following expression:

$$\Delta S_{i+1}(j)=C_2 \cdot [l_i(j)' \tan \theta_i(j)'+l_{i+1}(j)\tan \theta_{i+1}(j)]$$

where an interval from a surface connecting edge lines at an emergent side of the i-th layer diffraction grating to a boundary surface at an incident side of the (i+1)th layer diffraction grating at a position of the j-th grating portions is $l_i(j)'$; the emergent angle of the specified ray from the j-th grating portion in the i-th layer diffraction grating is $\theta_i(j)'$; the incident angle of the specified ray into the j-th grating portion in the (i+1)th layer diffraction grating is $\theta_{i+1}(j)$; an interval from the boundary surface to a surface connecting edge lines of the incident side of the (i+1)th layer diffraction grating at the position of the j-th grating portions is $l_{i+1}(j)$, and $C_2$ is an optional real number which is 0.1 or more and 1.5 or less.

18. An optical system comprising: a diffractive optical element according to claim 12, and a refractive optical element, wherein light incident into said optical system passes through both said diffractive optical element and said refractive optical element.

19. A diffractive optical element comprising:

a plurality of diffraction gratings including two diffraction gratings made of different materials from each other, wherein at least one of said plurality of diffraction gratings includes a region in which positions of grating edges thereof are shifted with respect to positions of grating edges of another diffraction grating adjacent thereto in an arranging direction of the grating portions and shift amounts thereof are different according to the positions thereof and in accordance with an incident angle or emergent angle of a specified ray, and wherein the diffractive optical element including a region in which the shift amount $\Delta S_{i+1}(j)$ between the position of the grating edge of the j-th grating, counting from a center portion of the diffractive optical element in an i-th layer diffraction grating and the position of the grating edge of a j-th grating portion counting from the center portion, in an (i+1)th layer diffraction grating is changed so as to satisfy the following expression:

$$\Delta S_{i+1}(j)=C_2 \cdot [l_i(j)' \tan \theta_i(j)'+l_{i+1}(j)\tan \theta_{i+1}(j)]$$

where an interval from a surface connecting edge lines at an emergent side of the i-th layer diffraction grating to a boundary surface at an incident side of the (i+1)th layer diffraction grating at a position of the j-th grating portions is $l_i(j)'$; the emergent angle of the specified ray from the j-th grating portion in the i-th layer diffraction grating is $\theta_i(j)'$; the incident angle of the specified ray into the j-th grating portion in the (i+1)th layer diffraction grating is $\theta_{i+1}(j)$; an interval from the boundary surface to a surface connecting edge lines of the incident side of the (i+1)th layer diffraction grating at the position of the j-th grating portions is $l_{i+1}(j)$, and $C_2$ is an optional real number which is 0.1 or more and 1.5 or less.

20. An optical system comprising:

a diffractive optical element according to claim 19, and a refractive optical element, wherein light incident into said optical system passes through both said diffractive optical element and said refractive optical element.

* * * * *